United States Patent
Kim et al.

(10) Patent No.: US 11,942,026 B2
(45) Date of Patent: Mar. 26, 2024

(54) DISPLAY APPARATUS

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Jongsu Oh, Suwon-si (KR); Eun Ho Kim, Suwon-si (KR); Seungran Park, Suwon-si (KR); Sara Hong, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 39 days.

(21) Appl. No.: 17/897,768

(22) Filed: Aug. 29, 2022

(65) Prior Publication Data

US 2023/0012927 A1 Jan. 19, 2023

Related U.S. Application Data

(63) Continuation of application No. PCT/KR2022/009292, filed on Jun. 29, 2022.

(30) Foreign Application Priority Data

Jul. 14, 2021 (KR) .......... 10-2021-0092508
Mar. 14, 2022 (KR) .......... 10-2022-0031709

(51) Int. Cl.
 *G09G 3/32* (2016.01)

(52) U.S. Cl.
 CPC ....... *G09G 3/32* (2013.01); *G09G 2310/0267* (2013.01); *G09G 2310/061* (2013.01);
 (Continued)

(58) Field of Classification Search
 CPC ..... G09G 2310/0267; G09G 2310/061; G09G 2310/08; G09G 2320/0233; G09G 2320/0276; G09G 2330/021
 (Continued)

(56) References Cited

U.S. PATENT DOCUMENTS 8,508,431 B2 8/2013 Kim et al.
10,159,135 B2 12/2018 Ikeda et al.
(Continued)

FOREIGN PATENT DOCUMENTS

CN 112652267 A 4/2021
EP 4064359 A1 9/2022
(Continued)

OTHER PUBLICATIONS

Search Report (PCT/ISA/210) dated Oct. 21, 2022 by the International Searching Authority for International Patent Application No. PCT/KR2022/009292.
(Continued)

*Primary Examiner* — Thomas J Lett
(74) *Attorney, Agent, or Firm* — Sughrue Mion, PLLC

(57) ABSTRACT

Provided is a display apparatus including a modular display panel that includes a plurality of displays disposed in a matrix form and respectively including a display panel including a pixel array in which pixels including a plurality of inorganic light emitting elements are disposed in a plurality of row lines, sub-pixel circuits respectively corresponding to inorganic light emitting elements of the pixel array, a driver configured to drive the sub-pixel circuits, a sensor configured to sense a current flowing in a driving (Continued)

transistor included in the sub-pixel circuits and output sensing data corresponding to the sensed current, and a processor configured to correct the image data voltage applied to the sub-pixel circuits based on the sensing data, and a timing controller configured to provide a first start signal to a driver of a first display and a second start signal to a driver of a second display.

17 Claims, 34 Drawing Sheets

(52) U.S. Cl.
CPC . *G09G 2310/08* (2013.01); *G09G 2320/0233* (2013.01); *G09G 2320/0276* (2013.01); *G09G 2330/021* (2013.01)

(58) Field of Classification Search
USPC .......................................................... 345/467
See application file for complete search history.

(56) References Cited

U.S. PATENT DOCUMENTS

| | | | |
|---|---|---|---|
| 10,198,999 B2 | 2/2019 | Pyeon | |
| 10,516,077 B2 | 12/2019 | Chung et al. | |
| 10,764,973 B2 | 9/2020 | Ikeda et al. | |
| 10,818,240 B2 | 10/2020 | Park | |
| 11,018,158 B2 | 5/2021 | Chung et al. | |
| 11,210,995 B2 | 12/2021 | Kim et al. | |
| 11,398,181 B2 | 7/2022 | Kim et al. | |
| 11,551,605 B2 | 1/2023 | Kim et al. | |
| 2005/0078104 A1* | 4/2005 | Matthies | H10K 50/86 345/204 |
| 2009/0015513 A1 | 1/2009 | Kim et al. | |
| 2016/0037608 A1 | 2/2016 | Ikeda et al. | |
| 2017/0193922 A1 | 7/2017 | Pyeon | |
| 2018/0351035 A1 | 12/2018 | Chung et al. | |
| 2019/0008014 A1 | 1/2019 | Ikeda et al. | |
| 2020/0075801 A1 | 3/2020 | Chung et al. | |
| 2020/0160789 A1 | 5/2020 | Park | |
| 2020/0396807 A1 | 12/2020 | Ikeda et al. | |
| 2021/0210002 A1 | 7/2021 | Kim et al. | |
| 2021/0210003 A1 | 7/2021 | Kim et al. | |
| 2021/0217777 A1 | 7/2021 | Chung et al. | |
| 2022/0327995 A1 | 10/2022 | Kim et al. | |
| 2023/0101460 A1 | 3/2023 | Kim et al. | |
| 2023/0107775 A1* | 4/2023 | Kim | G09G 3/2003 345/83 |
| 2023/0253441 A1* | 8/2023 | Yee | H01L 33/24 257/89 |

FOREIGN PATENT DOCUMENTS

| | | |
|---|---|---|
| KR | 10-1394926 B1 | 5/2014 |
| KR | 10-2017-0040205 A | 4/2017 |
| KR | 10-2017-0079408 A | 7/2017 |
| KR | 10-2018-0133192 A | 12/2018 |
| KR | 10-2020-0058702 A | 5/2020 |
| KR | 10-2020-0114868 A | 10/2020 |
| KR | 10-2021-0050384 A | 5/2021 |
| KR | 10-2021-0063056 A | 6/2021 |
| KR | 10-2021-0087867 A | 7/2021 |
| KR | 10-2021-0087873 A | 7/2021 |

OTHER PUBLICATIONS

Written Opinion (PCT/ISA/237) dated Oct. 21, 2022 by the International Searching Authority for International Patent Application No. PCT/KR2022/009292.

* cited by examiner

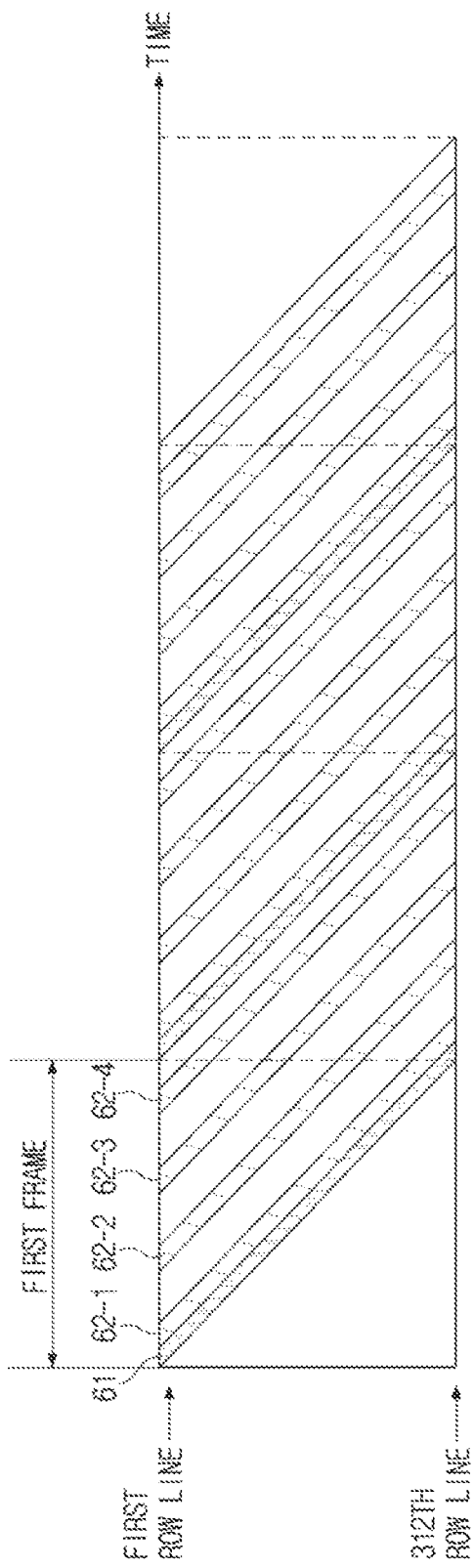

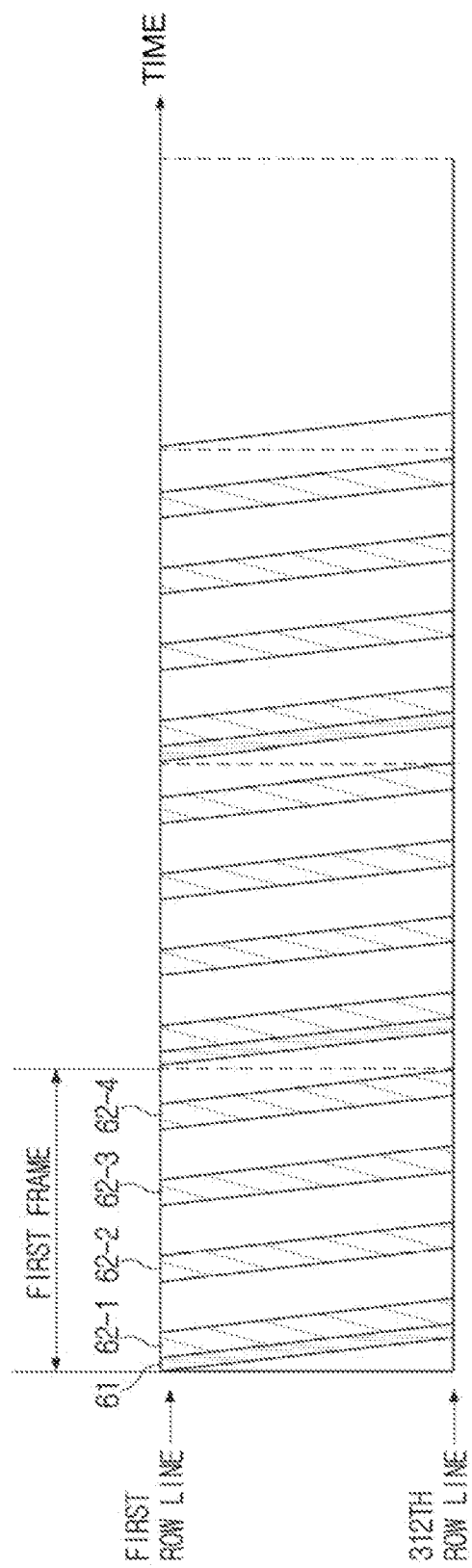

FIG. 10A
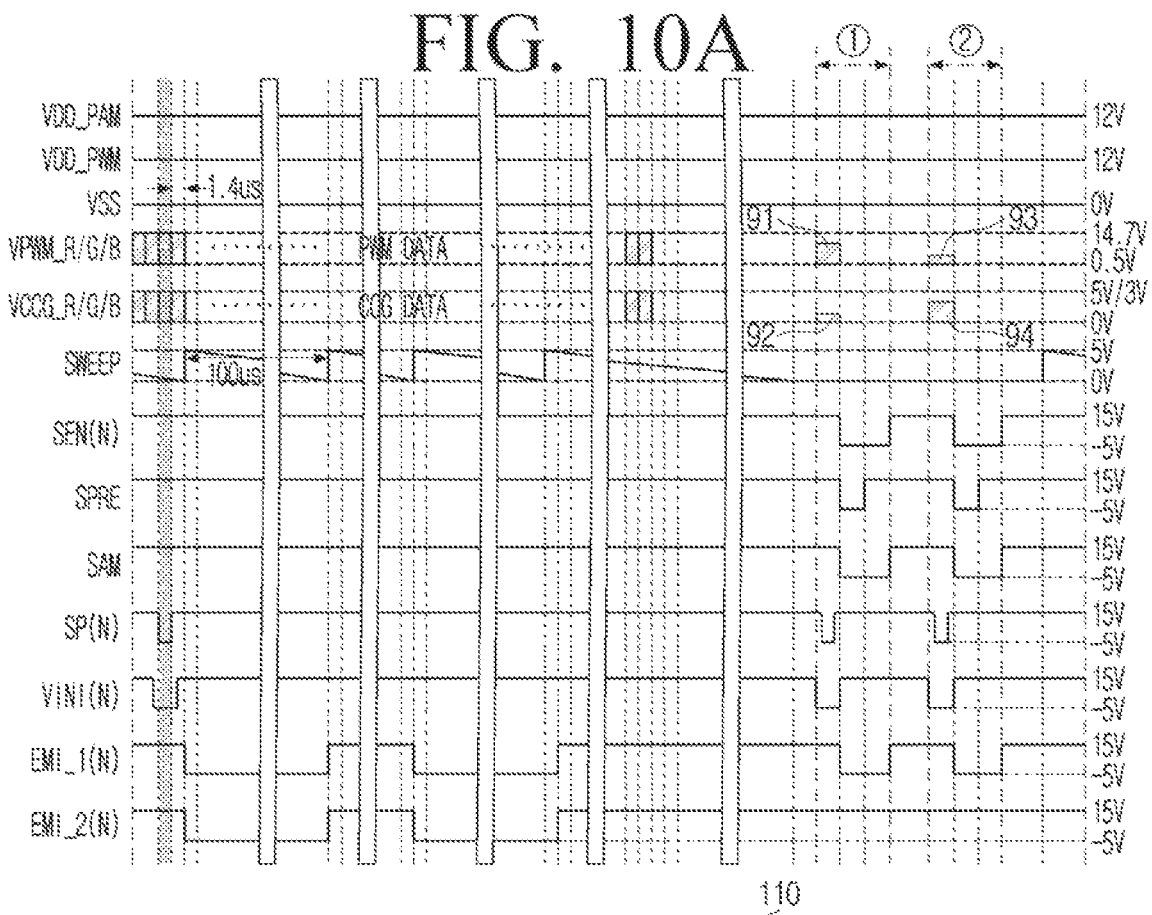
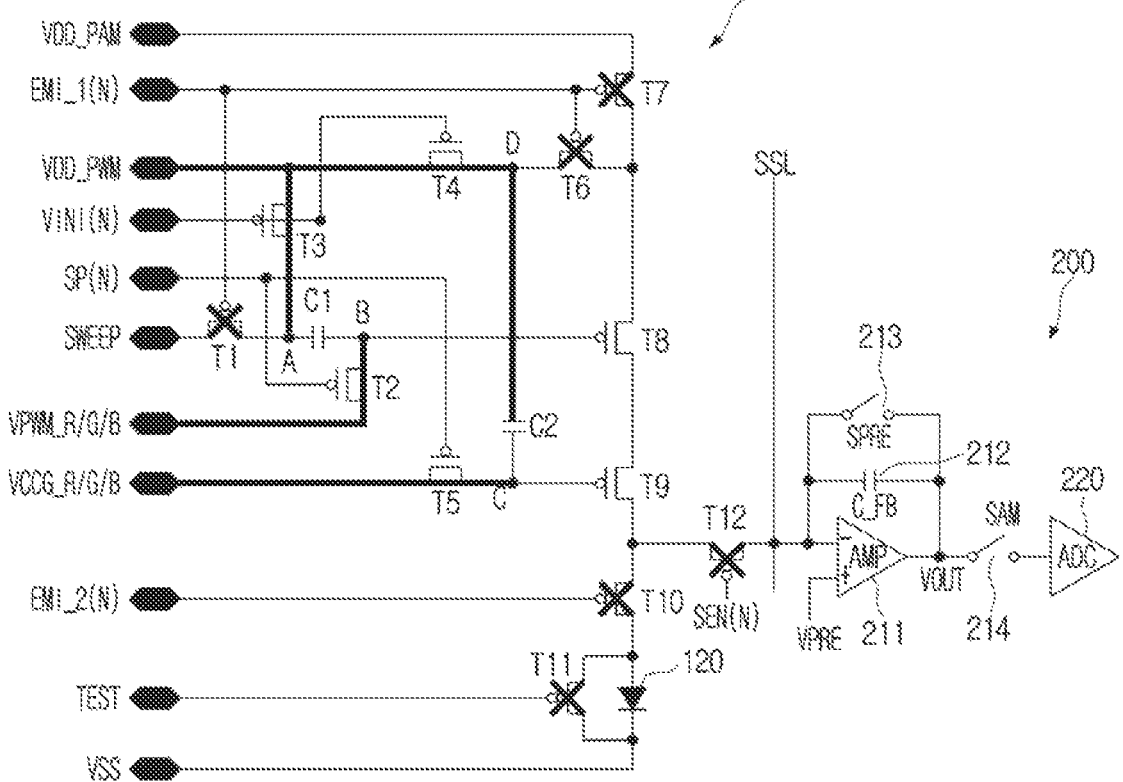

FIG. 10B
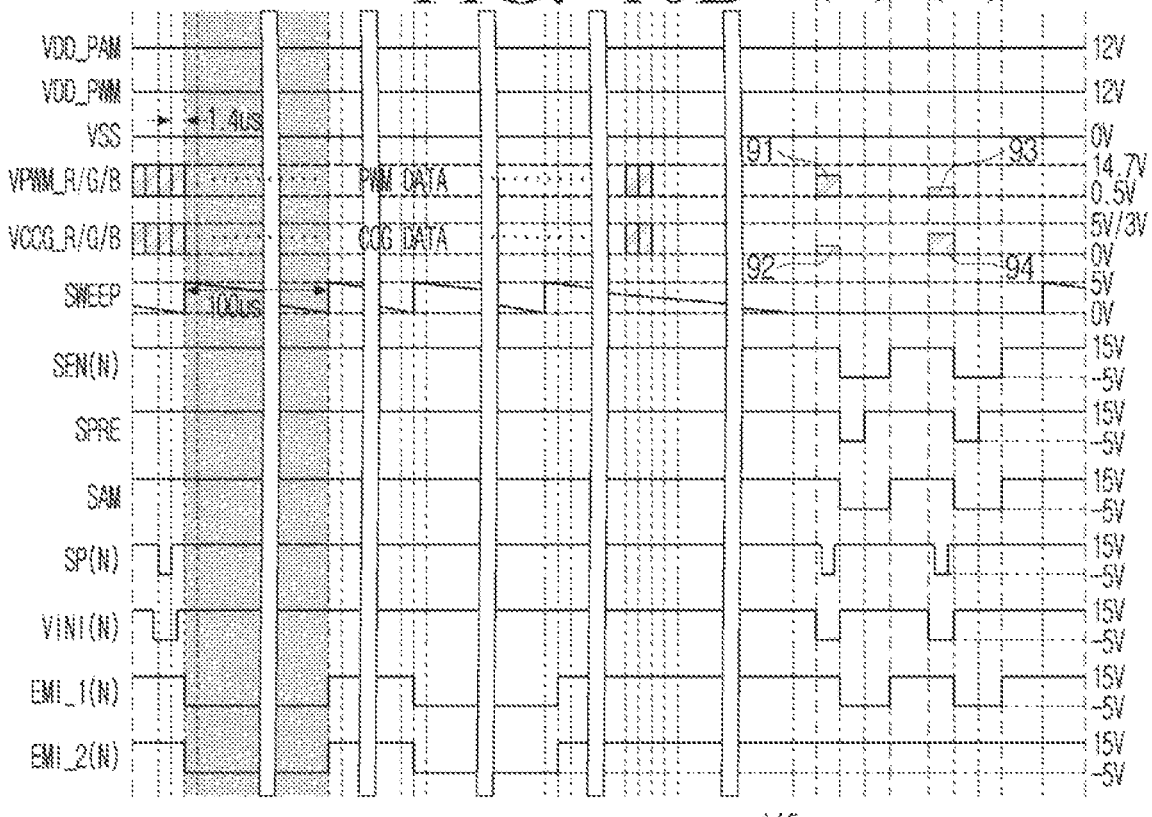
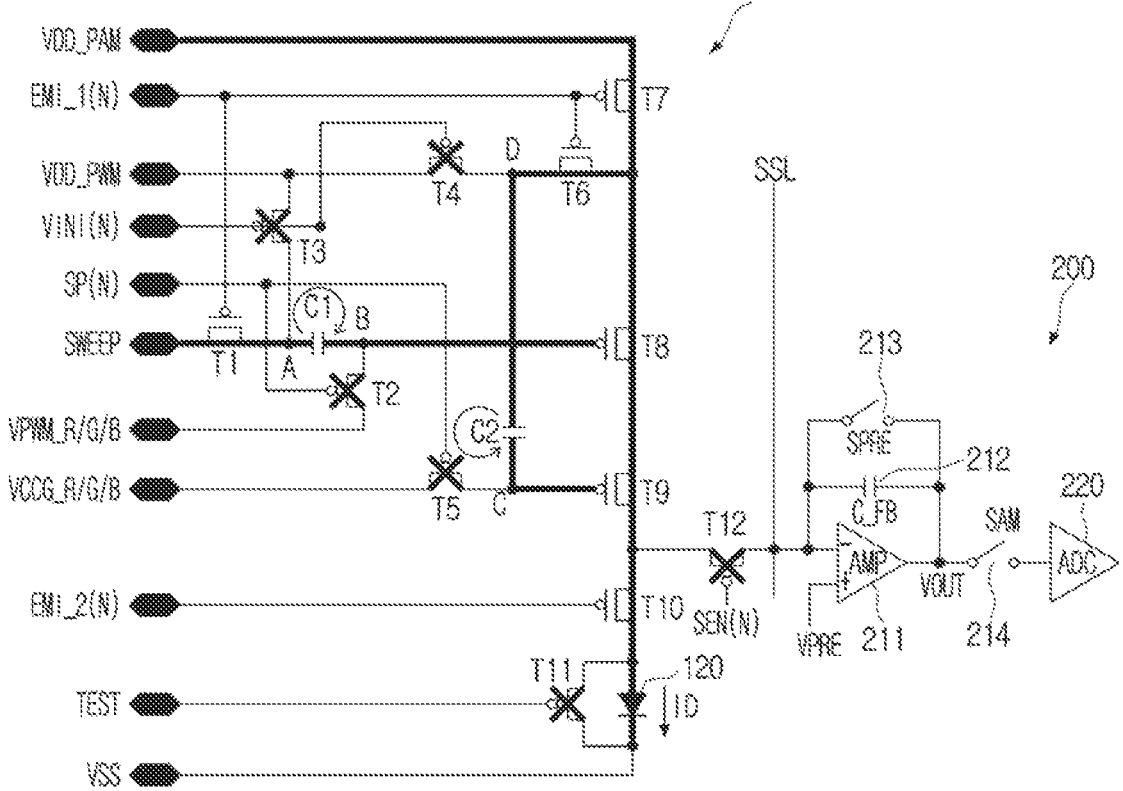

FIG. 10C
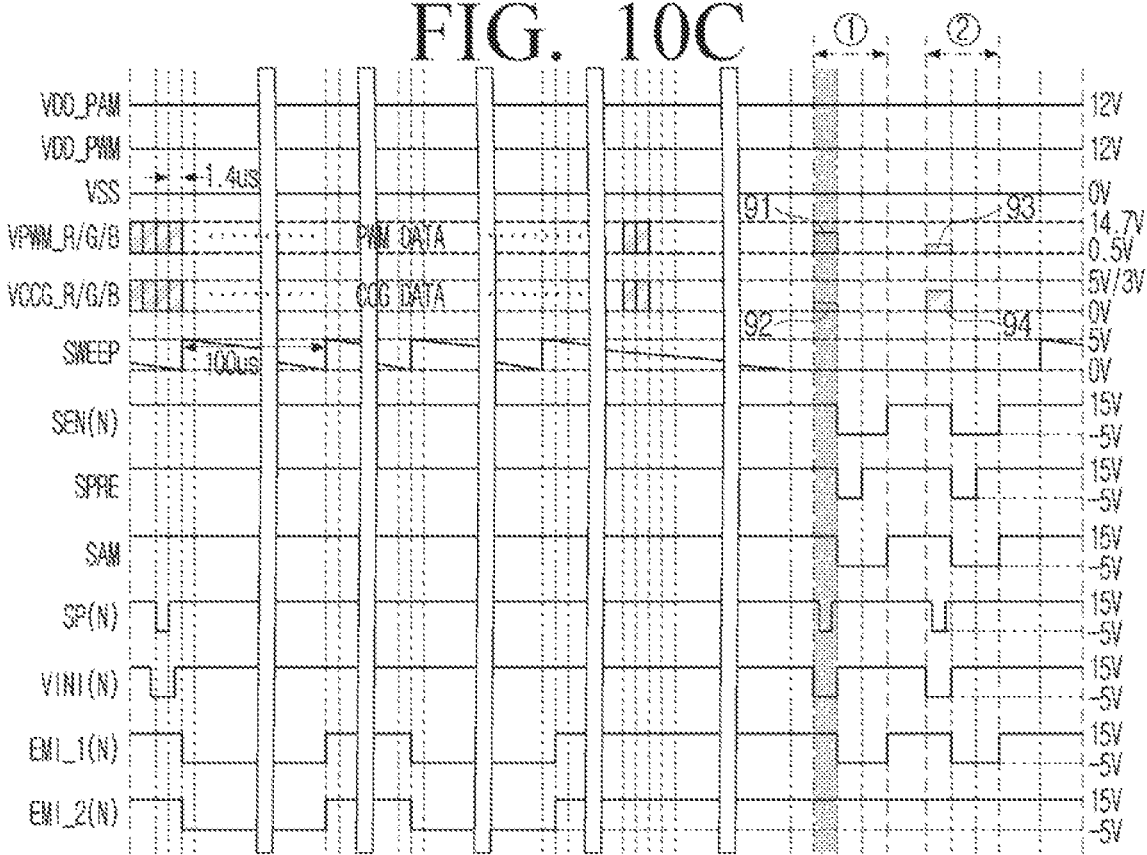
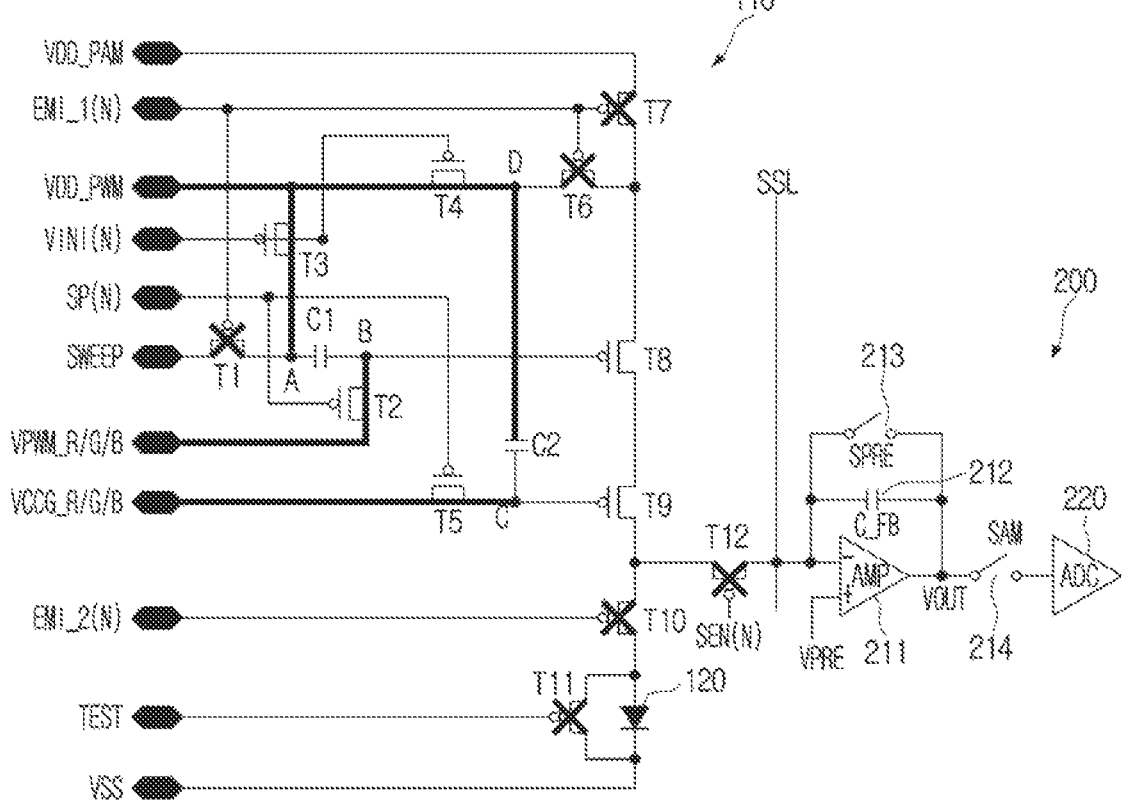

FIG. 10D
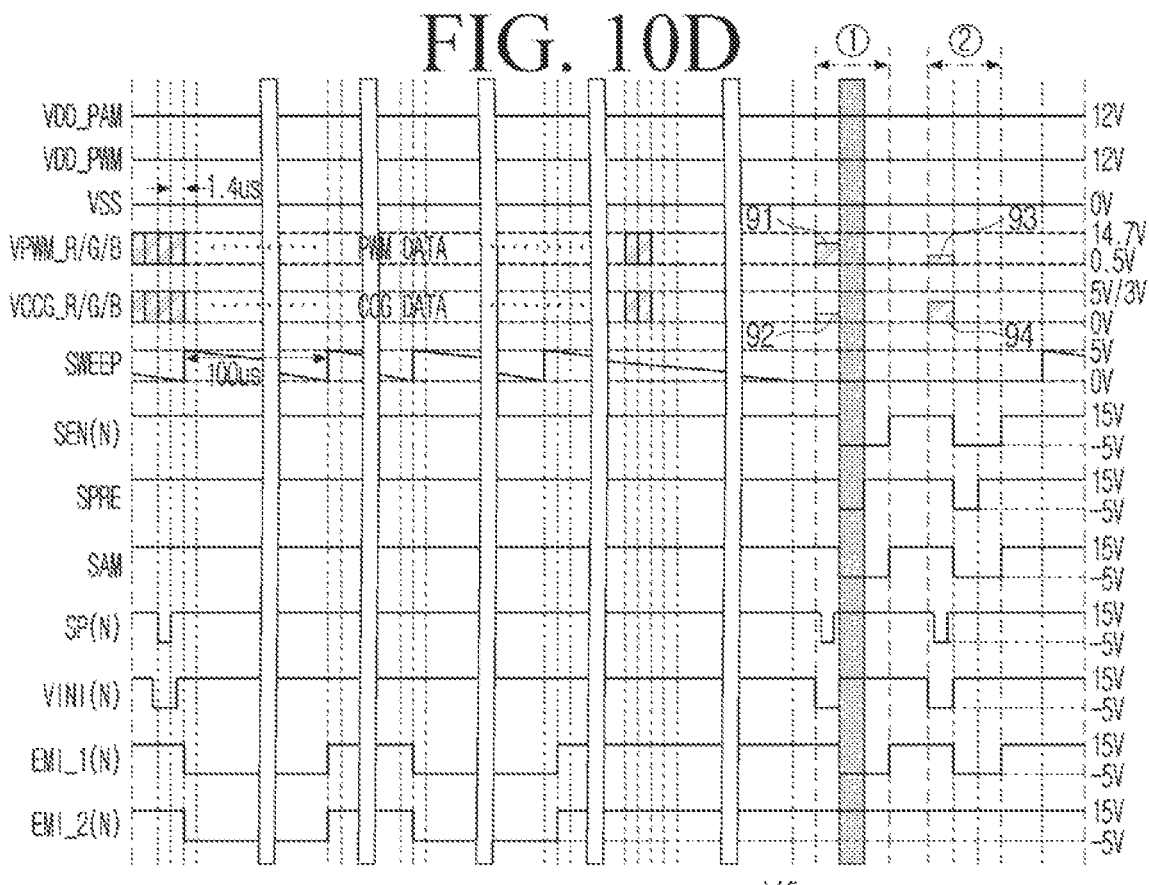
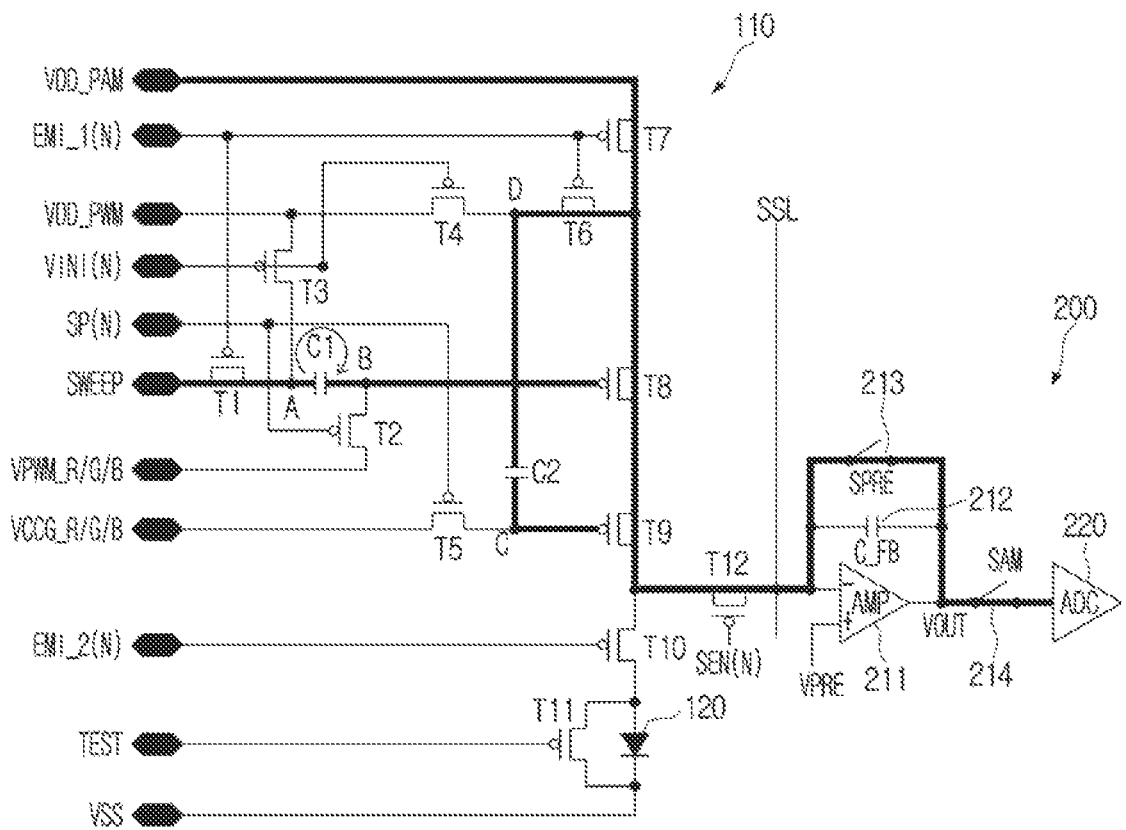

FIG. 10E
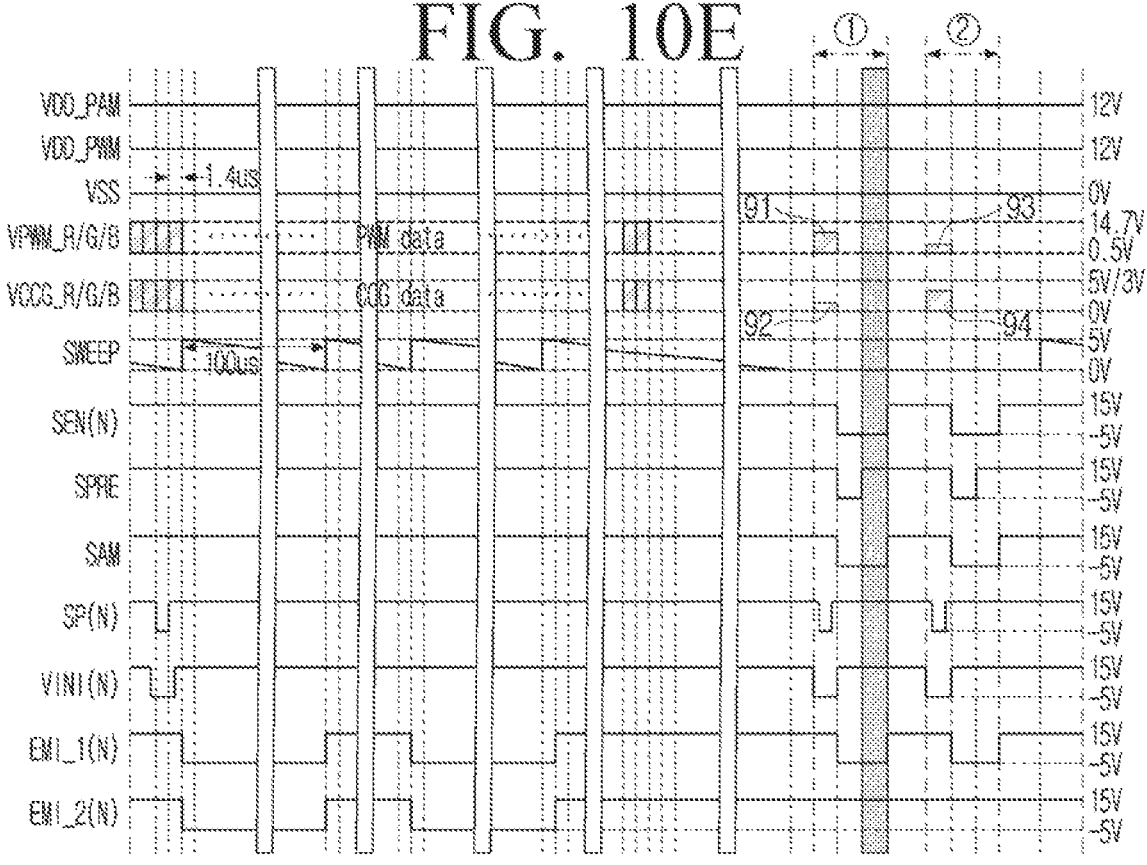
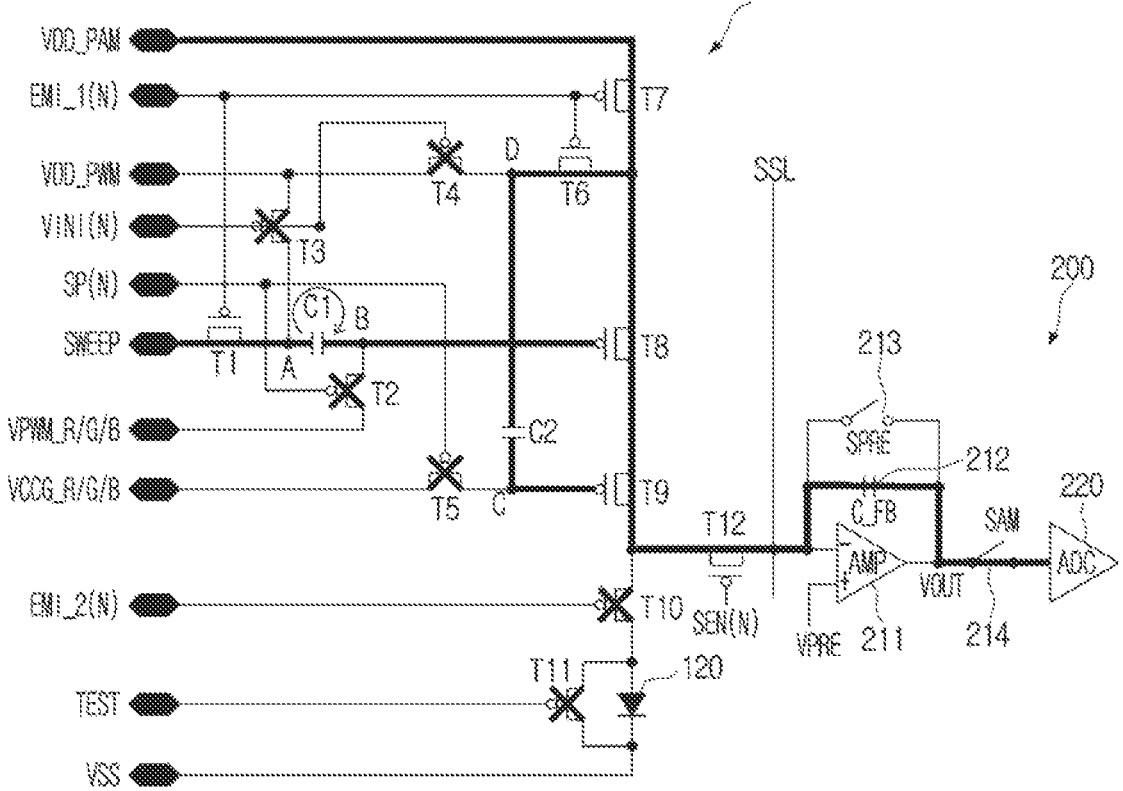

FIG. 10F
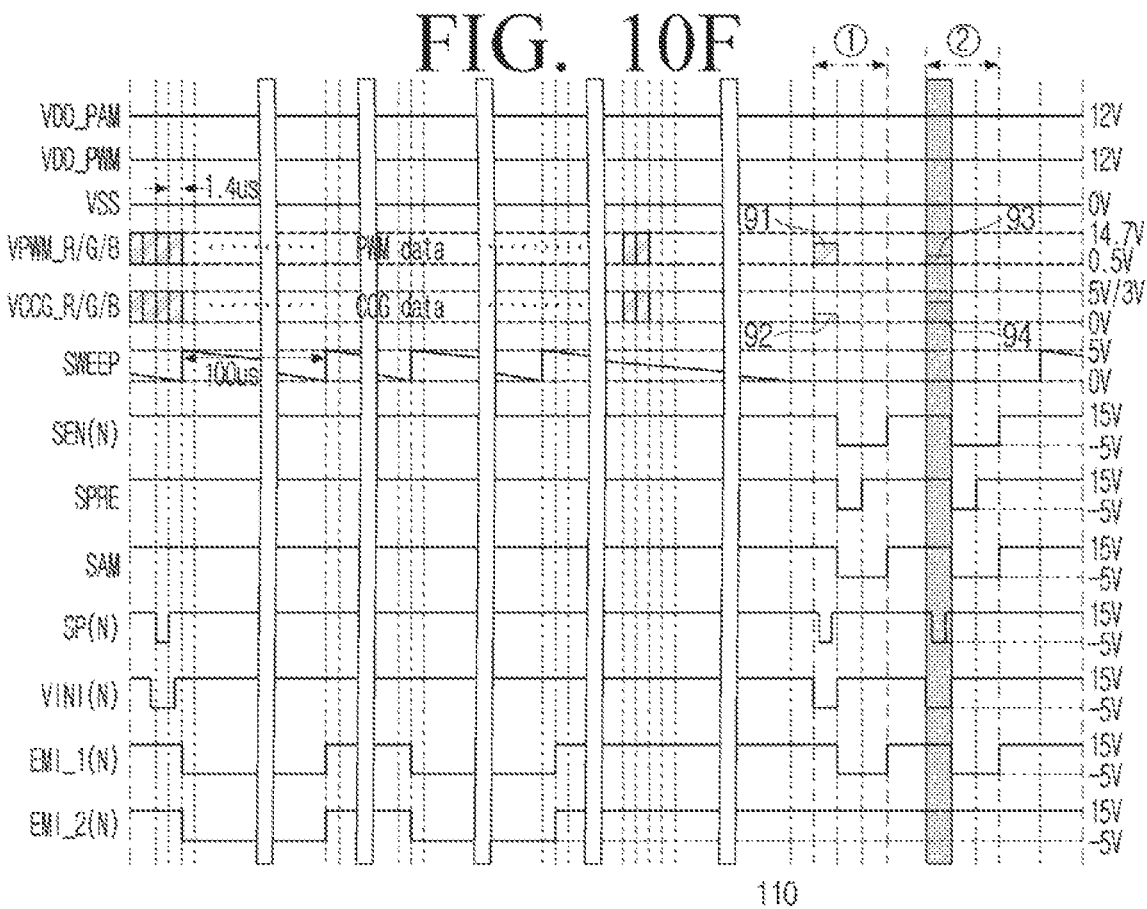
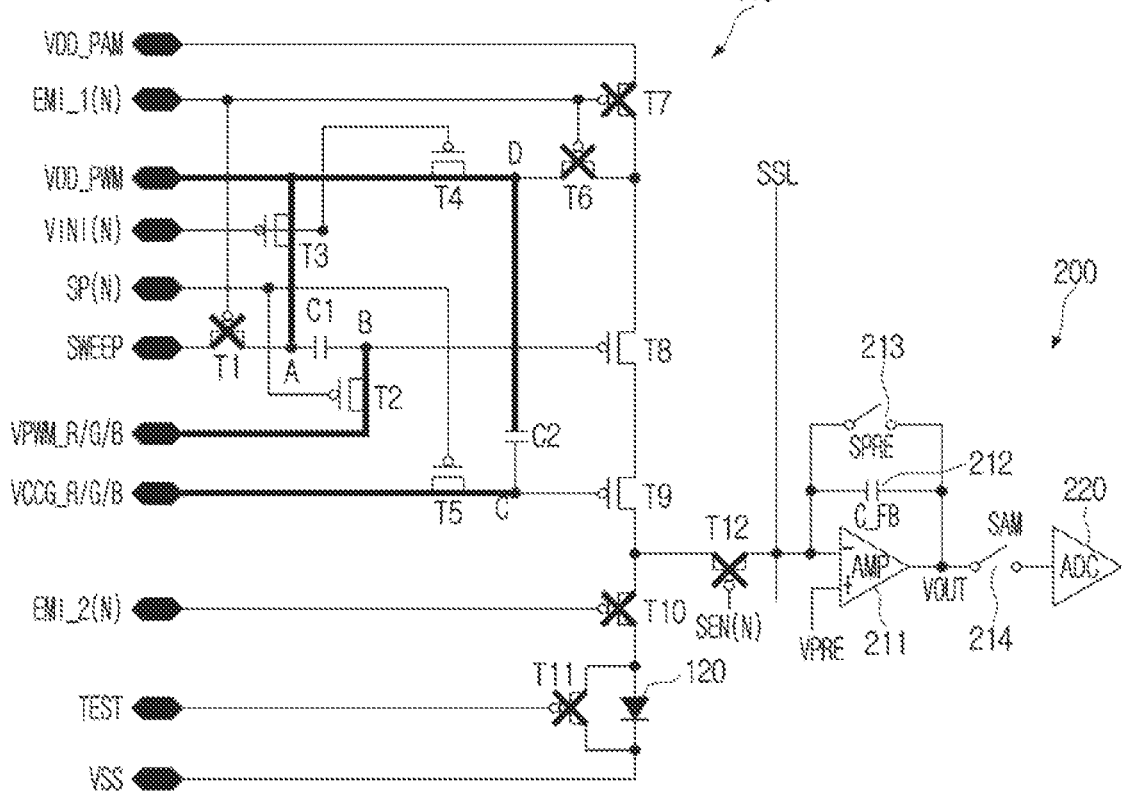

FIG. 10G
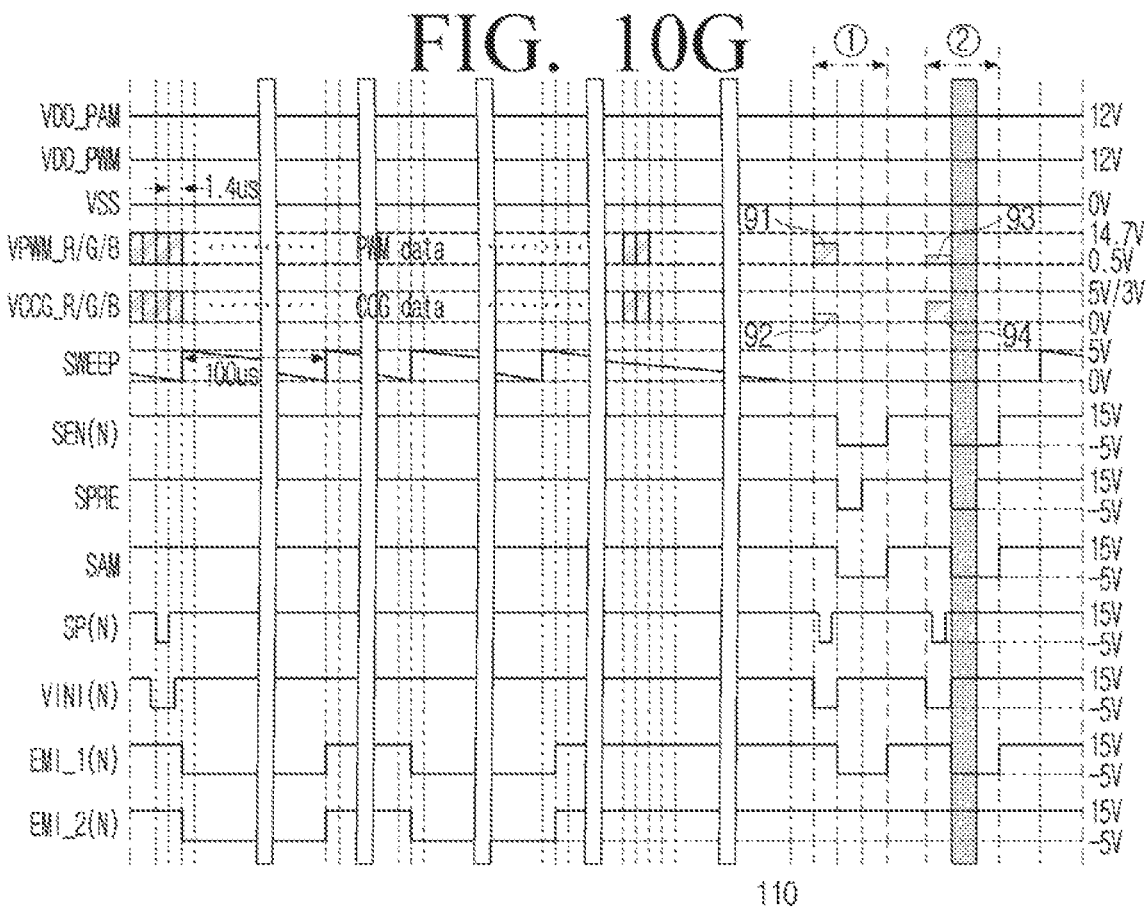
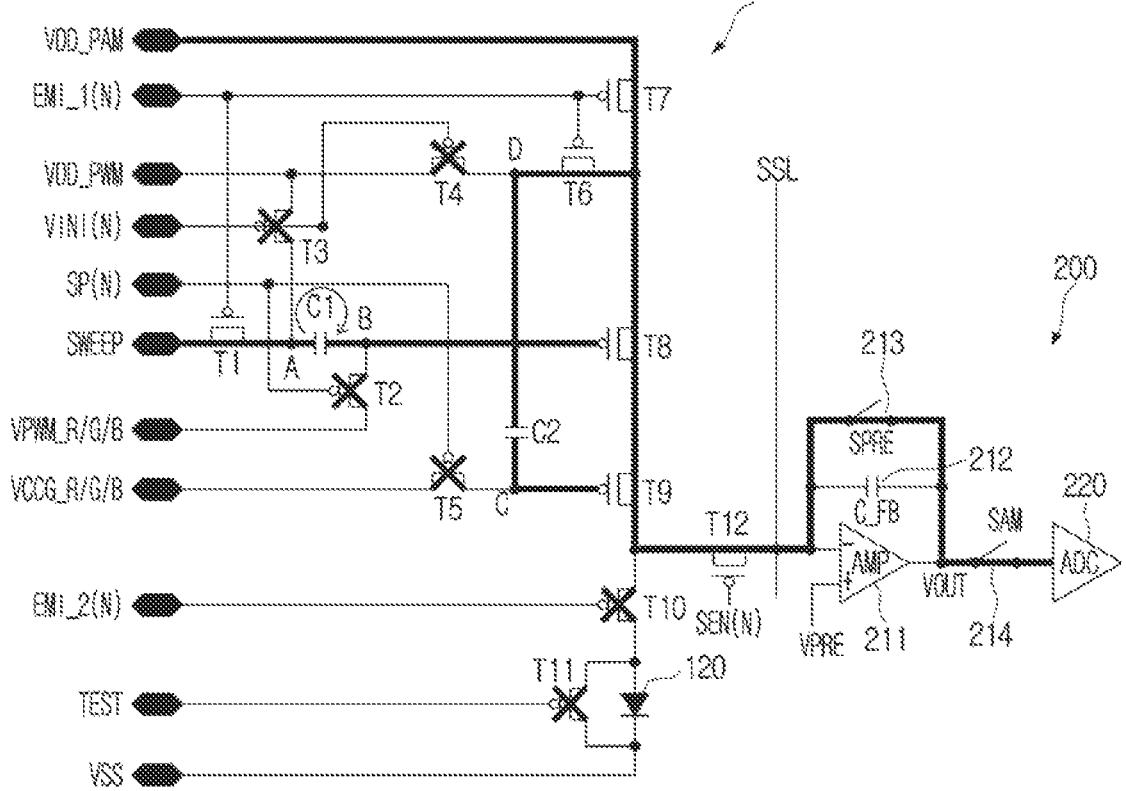

FIG. 10H
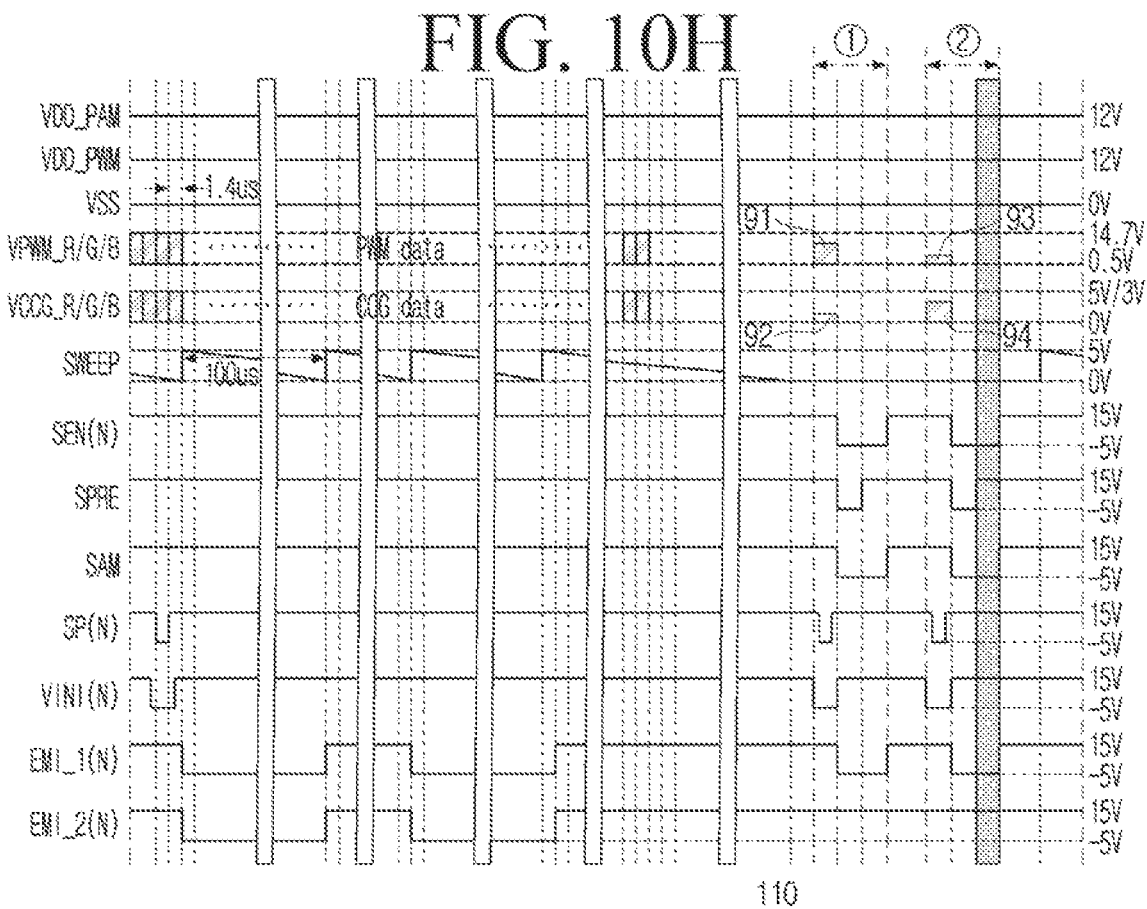
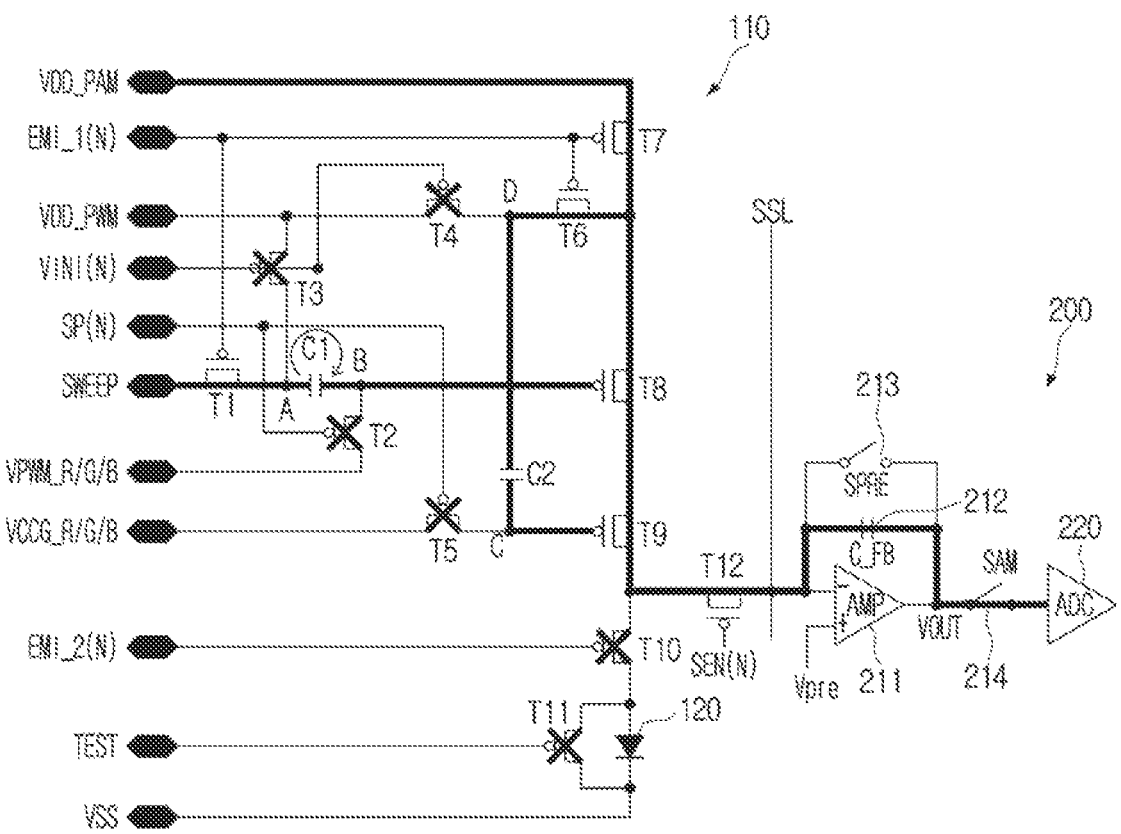

DISPLAY APPARATUS

CROSS-REFERENCE TO RELATED APPLICATIONS

This application is a bypass continuation of International Application No. PCT/KR2022/009292, filed on Jun. 29, 2022, which is based on and claims priority to Korean Patent Application No. 10-2021-0092508, filed on Jul. 14, 2021, in the Korean Intellectual Property Office, and Korean Patent Application No. 10-2022-0031709, filed on Mar. 14, 2022, in the Korean Intellectual Property Office, the disclosures of which are incorporated by reference herein in their entireties.

BACKGROUND

The disclosure relates to a display apparatus and, more specifically, to a display apparatus including a pixel array including self-emitting elements.

In a related art, in a display panel where an inorganic light emitting element such as a red light emitting diode (LED), a green LED, and a blue LED (hereinafter, an LED refers to an inorganic light emitting element) is driven as a sub-pixel, a gray scale of a sub-pixel is represented by a pulse amplitude modulation (PAM) driving method.

In this example, depending on a magnitude of a driving current, a wavelength as well as a gray scale of emitted light may change, resulting in decrease in color reproducibility of an image. FIG. 1 illustrates a wavelength change according to the magnitude of a driving current flowing through a blue LED, a green LED, and a red LED.

Accordingly, there is a need for a method of driving a self-emitting display panel capable of improving color reproducibility. In this regard, a power consumption problem, a brightness uniformity problem, and the like, need to be considered.

In addition, when one modular display panel is configured by combining a plurality of display modules, a consideration for distortion of an image which may occur at a boundary of upper and lower display modules is required.

SUMMARY

Provided is a display apparatus configured to prevent a phenomenon in which a wavelength of light emitted from an inorganic light emitting element changes according to a gray scale, and a driving method thereof.

Provided is also a display apparatus configured to more easily compensate for a stain that might appear in an image due to a difference in the threshold voltage between driving transistors, and more easily correct a color, and a driving method thereof.

Provided is also a display apparatus which includes a display module or a display apparatus which includes a modular display panel composed of a plurality of display modules configured to more easily compensate for a stain of a display panel, and more easily correct a color, and a driving method thereof.

Provided is a display apparatus configured to reduce power consumption consumed in driving a display panel, and a driving method thereof.

Provided is also a display apparatus configured to compensate for an effect of a drop of a driving voltage generated differently for each position of a display panel in a process of setting a data voltage, and a driving method thereof.

Provided is also a display apparatus configured to design a more optimized driving circuit, and configured to stably and efficiently drive an inorganic light emitting element, and a driving method thereof.

Provided is also a display apparatus configured to remove distortion of an image which may occur at a boundary of upper and lower display modules when a modular display panel is configured by combining a plurality of display modules, and a driving method thereof.

According to an aspect of an embodiment, there is a display apparatus including a modular display panel including a plurality of display modules disposed in a matrix form, a sensing unit, a correction unit, and a timing controller, wherein each of the plurality of display modules includes a display panel including a pixel array in which pixels respectively composed of a plurality of inorganic light emitting elements are arranged in a plurality of row lines, and sub-pixel circuits respectively corresponding to inorganic light emitting elements of the pixel array, and a driver configured to drive the sub-pixel circuits in an order of the row lines based on a start signal provided from the timing controller so that the inorganic light emitting elements of the pixel array emit light in the order of the row lines based on an image data voltage, wherein the sensing unit is configured to sense a current flowing in a driving transistor included in the sub-pixel circuits based on a specific voltage, and output sensing data corresponding to the sensed current, the correction unit is configured to correct the image data voltage applied to the sub-pixel circuits based on the sensing data, and the timing controller is configured to provide a first start signal to a driver of a first display module among the plurality of display modules so that the inorganic light emitting elements of the first display module sequentially emit light from a first row line to a last row line, and provide a second start signal to a driver of a second display module so that the inorganic light emitting elements of the second display module disposed adjacent to a bottom of the first display module emit light in the order of the row lines following an emission order of the inorganic light emitting elements included in the last row line of the first display module.

The driver may be configured to, based on the start signal being provided, provide a gate signal in the order of the row lines to the sub-pixel circuits to drive the sub-pixel circuits in the order of the row lines, and the gate signal may include a scan signal configured to set the image data voltage to the sub-pixel circuits and an emission signal configured to allow the inorganic light emitting elements of the pixel array to emit light based on the set image data voltage.

The sub-pixel circuits may be configured to be driven in an order of a data setting section and a plurality of light emitting sections for each row line with respect to one image frame, and the driver may provide the scan signal to the sub-pixel circuits of a corresponding row line during the data setting section of each row line, and apply the emission signal to the sub-pixel circuits of the corresponding row line during each of the plurality of light emitting sections of each of the row lines.

A first light emitting section among the plurality of light emitting sections may be temporally consecutive with the data setting section, and the plurality of light emitting sections may have a preset time interval from each other.

The image data voltage may include a constant current generator data voltage and a pulse width modulation (PWM) data voltage, and each of the sub-pixel circuits may include a constant current generator circuit which includes a first driving transistor and is configured to provide a constant current to a corresponding inorganic light emitting element based on the constant current generator data voltage, and a PWM circuit which includes a second driving transistor and is configured to control a time during which the constant current is provided to the corresponding inorganic light emitting element based on the PWM data voltage.

The constant current generator circuit may, based on the scan signal, set the constant current generator data voltage to a gate terminal of the first driving transistor, and the PWM circuit may, based on the scan signal, set the PWM data voltage to a gate terminal of the second driving transistor.

The constant current generator circuit may, based on the emission signal, provide a constant current of a magnitude corresponding to the set constant current generator data voltage to the corresponding inorganic light emitting element, and the PWM circuit may, based on the emission signal and a sweep voltage sweeping between two voltages, control the constant current generator circuit such that the constant current flows in the corresponding inorganic light emitting element during a time corresponding to the set PWM data voltage.

The constant current generator circuit may, in each of the plurality of light emitting sections, provide the constant current to the corresponding inorganic light emitting element while a driving voltage is applied to a source terminal of the first driving transistor, and the PWM circuit may, in each of the plurality of light emitting sections, apply the driving voltage to the source terminal of the first driving transistor during a time period in which the second driving transistor is turned on while a voltage of a gate terminal of the second driving transistor changes according to a change of the sweep voltage, and the time period in which the second driving transistor is turned on may change based on a magnitude of the PWM data voltage.

The sweep voltage may be a portion selected based on the emission signal from an input sweep signal in which a voltage linearly varying from a first voltage to a second voltage is continuously repeated, and a same input sweep signal may be applied to the sub-pixel circuits of the display panel.

The sweep voltage may, in each of the plurality of light emitting sections, sweep once between the first voltage and the second voltage, and a start voltage at which the sweep voltage starts sweeping between the first voltage and the second voltage may vary based on a row line.

The sub-pixel circuits may be configured to be driven by a first driving voltage in each of the plurality of light emitting sections, and to be driven by a second driving voltage separate from the first driving voltage in the data setting section.

A drain terminal of the second driving transistor may be connected to a source terminal of the first driving transistor, and the sub-pixel circuits may include a first transistor connected between a drain terminal of the first driving transistor and the sensing unit.

The specific voltage may include a first specific voltage and a second specific voltage respectively applied to gate terminals of the first and second driving transistors in a constant current generator circuit sensing period, and a third specific voltage and a fourth specific voltage respectively applied to the gate terminals of the first and second driving transistors in a PWM circuit sensing period, and the sensing unit may, while the first transistor is turned on in the constant current generator circuit sensing period, sense a first current flowing in the first and second driving transistors based on the first and second specific voltages, and output first sensing data corresponding to the sensed first current, and while the first transistor is turned on in the PWM circuit sensing period, sense a second current flowing in the first and second driving transistors based on the third and fourth specific voltages, and output second sensing data corresponding to the sensed second current.

In the constant current generator circuit sensing period, a turn-on resistance of the first driving transistor based on the first specific voltage may be bigger than a turn-on resistance of the second driving transistor based on the second specific voltage, and a magnitude of the first current may be determined by the first specific voltage, and in the PWM circuit sensing period, a turn-on resistance of the first driving transistor based on the third specific voltage may be smaller than a turn-on resistance of the second driving transistor based on the fourth specific voltage, and the magnitude of the second current may be determined by the fourth specific voltage.

The correction unit may correct the constant current generator data voltage based on the first sensing data, and correct the PWM data voltage based on the second sensing data.

The constant current generator circuit sensing period and the PWM circuit sensing period may be included in a blanking interval.

The driver may, for each image frame, apply the specific voltage to sub-pixel circuits corresponding to at least one row line among the plurality of row lines of the pixel array.

According to the various embodiments of the disclosure as described above, by driving an inorganic light emitting element by PWM driving in an active matrix (AM) manner, a phenomenon in which the wavelength of light emitted from the inorganic light emitting element changes according to a gray scale may be prevented.

In addition, a stain that might appear in an image due to a difference in the threshold voltage between driving transistors may be easily compensated. In addition, the color correction is facilitated.

In addition, in a display apparatus including one display module or a display apparatus including a modular display panel including a plurality of display modules, stain compensation or color correction of the display panel may be facilitated.

In addition, instantaneous peak power consumption may be reduced by driving the display panel such that the inorganic light emitting elements sequentially emit light in the order of row lines.

In addition, the effect of the drop of the driving voltage generated differently for each position of the display panel on the process of setting the data voltage may be compensated.

In addition, a more optimized driving circuit may be designed, and the inorganic light emitting element may be stably and efficiently driven.

In addition, when configuring the modular display panel by combining the plurality of display modules, distortion of an image that may occur at the boundary of the upper and lower display modules may be removed.

BRIEF DESCRIPTION OF THE DRAWINGS

The above and/or other aspects will become apparent and more readily appreciated from the following description of embodiments, taken in conjunction with the accompanying drawings in which:

FIG. 5A is a diagram for illustrating a progressive driving method of a display panel according to an embodiment of the disclosure;

FIG. 5B is a diagram for illustrating a progressive driving method of a display panel according to another embodiment of the disclosure;

FIG. 10A is a diagram for illustrating an operation of a sub-pixel circuit in a data setting section;

FIG. 10B is a diagram for illustrating an operation of a sub-pixel circuit in a light emitting section;

FIG. 10C is a diagram for illustrating an operation of a sub-pixel circuit in a first setting period;

FIG. 10D is a diagram for illustrating operations of a sub-pixel circuit and a sensing unit in a first initialization period;

FIG. 10E is a diagram for illustrating operations of a sub-pixel circuit and a sensing unit in a first sensing period;

FIG. 10F is a diagram for illustrating an operation of a sub-pixel circuit in a second setting period;

FIG. 10G is a diagram for illustrating operations of a sub-pixel circuit and a sensing unit in a second initialization period;

FIG. 10H is a diagram for illustrating operations of a sub-pixel circuit and a sensing unit in a second sensing period;

DETAILED DESCRIPTION

In describing the disclosure, detailed descriptions of related known technologies will be omitted when it is determined that the descriptions may unnecessarily obscure the gist of the disclosure. In addition, overlapping descriptions of the same components will be omitted as far as possible.

The suffix "unit" for components used in the following description is added or interchangeably used only in consideration of the convenience in drafting the specification, and it does not have a distinguished meaning or role by itself.

The terminology used in the disclosure is used to describe embodiments, and is not intended to restrict and/or limit the disclosure. Further, a singular expression of any component used in the disclosure includes a plural expression, except for a case obviously meaning the contrary in the context.

It is to be understood that in the disclosure, terms such as 'include' or 'have' may, for example, be used to designate a presence of a characteristic, a number, a step, an operation, an element, a component, or a combination thereof described in the specification, and not to preclude a presence or a possibility of adding one or more of other characteristics, numbers, steps, operations, elements, components or a combination thereof.

In the disclosure, expressions such as "first", "second", etc. may be used to describe various elements regardless of their order and/or importance and to discriminate one element from other elements, but are not used to limit the elements.

In the disclosure, if it is described that a certain element (e.g.: a first element) is "connected to" another element (e.g.: a second element), it should be understood that the certain element (e.g.: a first element) may be directly connected to the another element (e.g.: a second element), or may be connected to the another element (e.g.: a second element) through still another element (e.g.: a third element).

On the other hand, if it is described that a certain element (e.g.: a first element) is "directly connected to" another element (e.g.: a second element), it may be understood that there is no element (e.g.: a third element) between the certain element (e.g.: a first element) and the another element (e.g.: a second element).

The terms used in the embodiments of the disclosure may be interpreted in a meaning commonly known to those of ordinary skill in the art unless otherwise defined.

Hereinafter, various embodiments of the disclosure will be described in detail with reference to the accompanying drawings.

Figure 1:
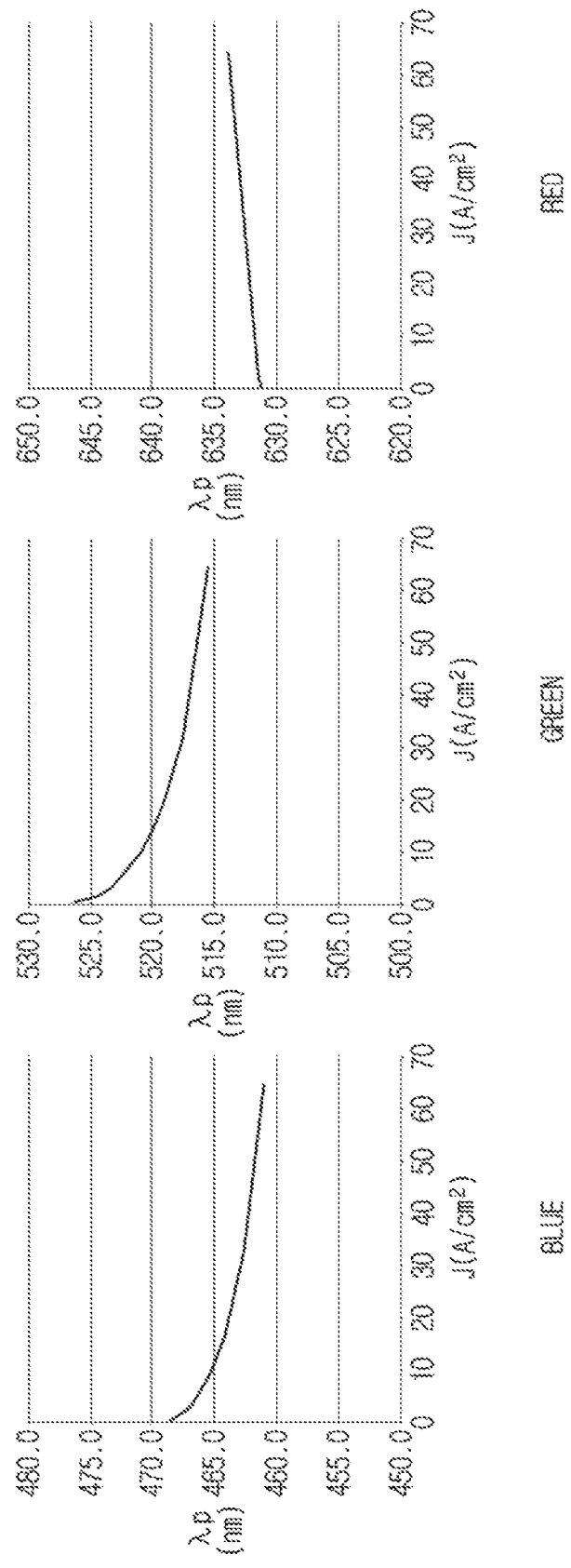
FIG. 1 is a graph illustrating a change in a wavelength according to a magnitude of a driving current flowing through a blue light emitting diode (LED), a green LED, and a red LED.
Figure 2:
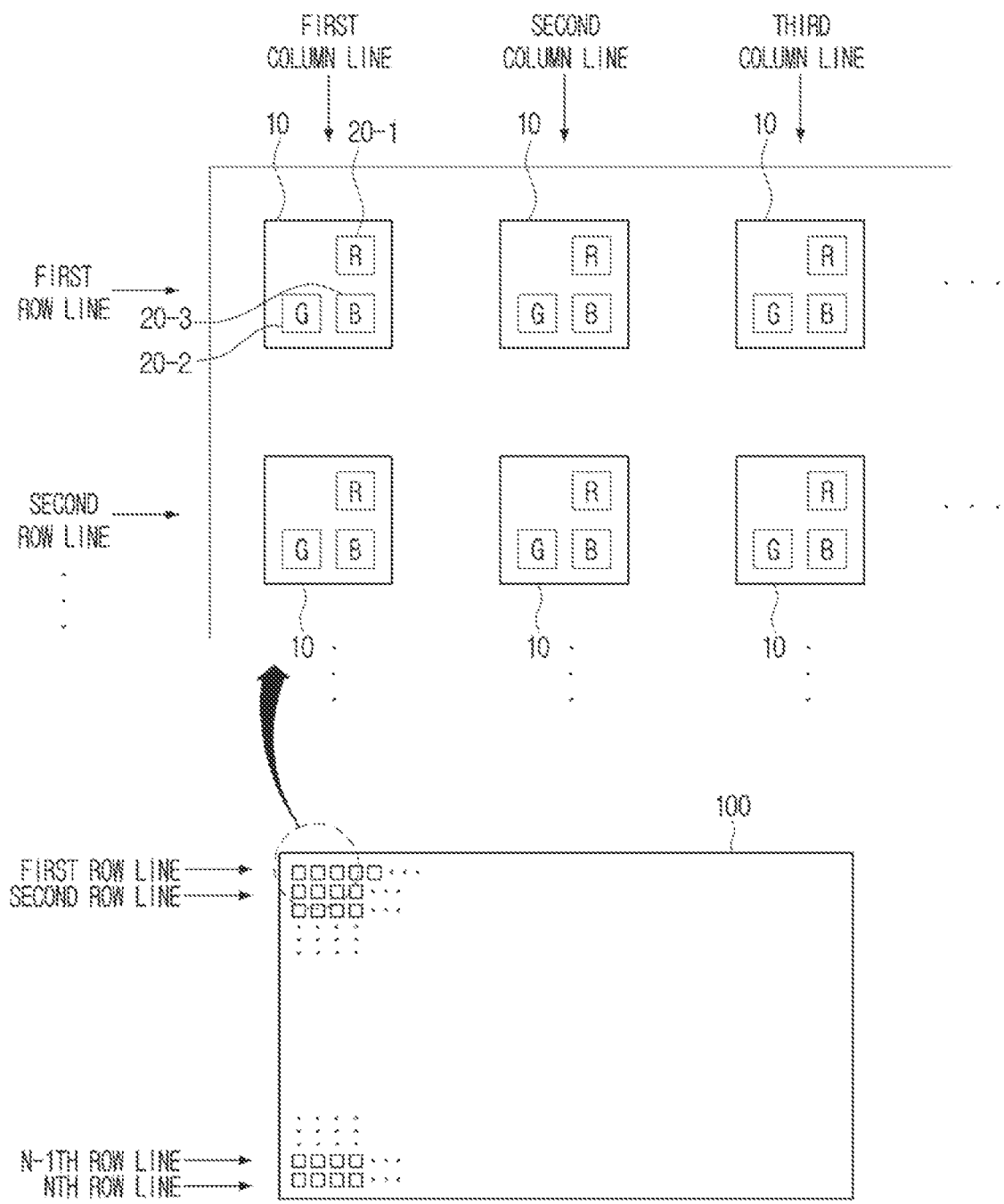
FIG. 2 is a diagram for illustrating a pixel structure of a display panel according to an embodiment of the disclosure.

FIG. 2 is a diagram for illustrating a pixel structure of a display panel according to an embodiment of the disclosure.

Referring to FIG. 2, a display panel 100 includes a plurality of pixels 10 disposed (or arranged) in a matrix form, i.e., a pixel array.

The pixel array includes a plurality of row lines or a plurality of column lines. Depending on cases, the row line may also be called a horizontal line, a scan line, or a gate line, and the column line may also be called a vertical line or a data line.

Depending on cases, terms such as a row line, a column line, a horizontal line, and a vertical line may be used as words to refer to a line formed by pixels on a pixel array, and terms such as a scan line, a gate line, and a data line may be used as words to refer to the actual wiring on the display panel 100 to which data or signals are transmitted.

Each pixel 10 of the pixel array may include three types of sub-pixels including a red (R) sub-pixel 20-1, a green (G) sub-pixel 20-2, and a blue (B) sub-pixel 20-3.

In this case, each pixel 10 may include a plurality of inorganic light emitting elements constituting the sub-pixels 20-1, 20-2, and 20-3.

For example, each pixel 10 may include three types of inorganic light emitting elements, such as an R inorganic light emitting element constituting the R sub-pixel 20-1, a G inorganic light emitting element constituting the G sub-pixel 20-2, and a B inorganic light emitting element constituting the B sub-pixel 20-3.

According to another embodiment, each pixel 10 may include three blue inorganic light emitting elements. In this example, a color filter for implementing R, G, or B colors may be provided on each inorganic light emitting element. In this case, the color filter may be a quantum dot (QD) color filter, but is not limited thereto.

A sub-pixel circuit configured to drive an inorganic light emitting element may be provided on the display panel 100 for each inorganic light emitting element.

In this case, each sub-pixel circuit may provide a driving current to a corresponding inorganic light emitting element based on an image data voltage applied from the outside.

For example, the image data voltage includes a constant current generator (CCG) data voltage and a pulse width modulation (PWM) data voltage. Each sub-pixel circuit may represent a gray scale of an image by providing a driving current of a magnitude corresponding to a constant current generator data voltage to an inorganic light emitting element for a time corresponding to a PWM data voltage. A detailed content in this regard will be described later.

The sub-pixel circuits included in each row line of the display panel 100 may be driven in the order of setting (or programming) an image data voltage and providing a driving current based on the set image data voltage.

In this case, according to an embodiment, the sub-pixel circuits included in each row line of the display panel 100 may be sequentially driven in the order of row lines.

For example, the image data voltage setting operation of the sub-pixel circuits included in one row line (e.g., the first row line) and the image data voltage setting operation of the sub-pixel circuits included in the next row line (e.g., the second row line) may be sequentially performed in the order of row lines. Further, the driving current providing operation of the sub-pixel circuits included in the one row line (e.g., the first row line) and the driving current providing operation of the sub-pixel circuits included in the next row line (e.g., the second row line) may also be sequentially performed in the order of the row lines.

In FIG. 2, an example wherein the sub-pixels 20-1 to 20-3 are arranged in a shape of L of which left and right sides are inverted within one pixel region is suggested. However, embodiments are not limited thereto, and the R, G, and B sub-pixels 20-1 to 20-3 may be arranged in a line inside a pixel region, and may be arranged in various shapes depending on embodiments.

In addition, in FIG. 2, description was made based on an example wherein three types of sub-pixels form one pixel. However, depending on embodiments, four types of sub-pixels such as R, G, B, and white (W) may form one pixel, and any other number of sub-pixels may form one pixel.

Figure 3A:
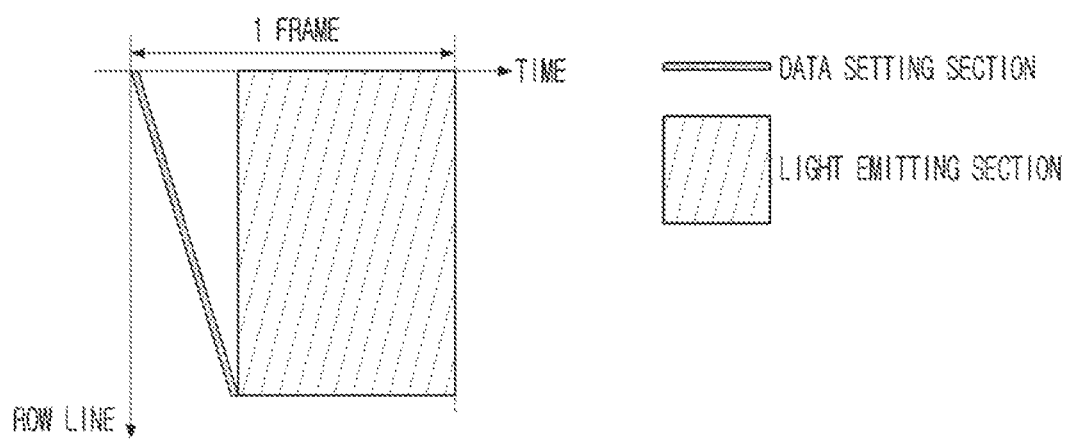
FIG. 3A is a conceptual diagram illustrating a driving method of a related display panel.
Figure 3B:
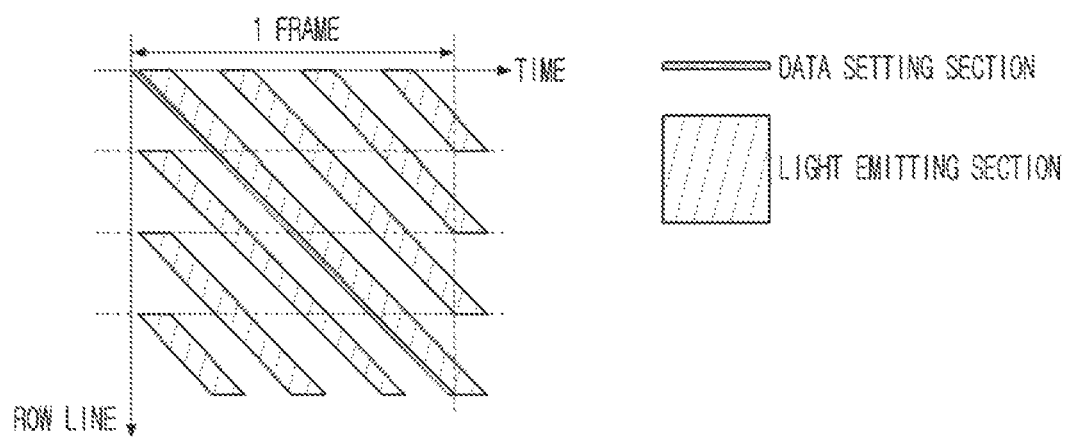
FIG. 3B is a conceptual diagram illustrating a driving method of a display panel according to an embodiment of the disclosure.
Figure 3C:
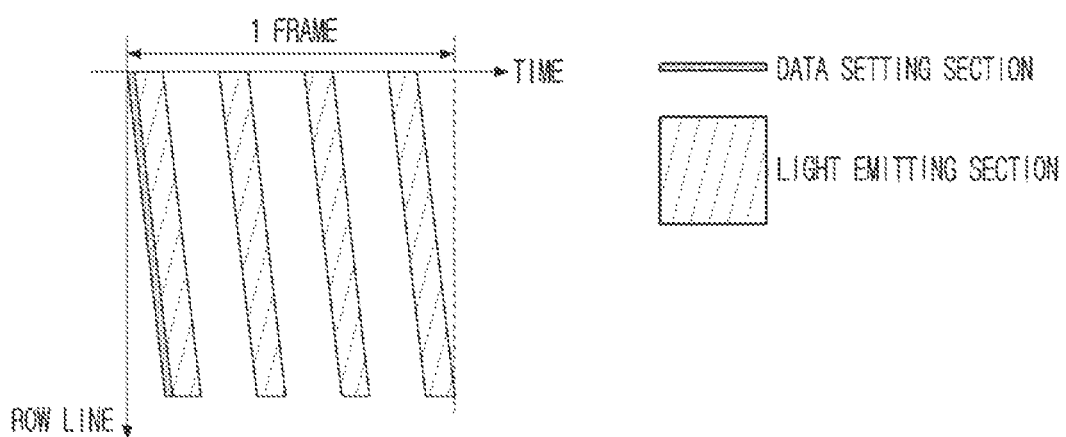
FIG. 3C is a conceptual diagram illustrating a driving method of a display panel according to an embodiment of the disclosure.

FIG. 3A is a conceptual diagram illustrating a driving method of a related display panel, and FIGS. 3B and 3C are conceptual diagrams illustrating a driving method of a display panel according to an embodiment of the disclosure.

FIGS. 3A to 3C illustrate a method of driving a display panel for one image frame time. In FIGS. 3A to 3C, the vertical axis represents the row line of the display panel 100, and the horizontal axis represents time. In addition, the data setting section represents a driving period of the display panel 100 in which the image data voltage is set to the sub-pixel circuits included in each row line, and the light emitting section represents a driving period of the display panel 100 in which the sub-pixel circuits included in each row line provide a driving current to the inorganic light emitting elements based on the image data voltage set in the data setting section. The inorganic light emitting elements emit light according to the driving current in the light emitting section.

According to FIG. 3A, it can be known that in the related art, after the settings of the image data voltage for the entire row lines of the display panel are completed first, the light emitting sections collectively proceed at once.

In this example, the entire row lines of the display panel emit light simultaneously during the light emitting section, and thus a high peak current is required, and accordingly, there is a problem that peak power consumption required for a product increases. When peak power consumption increases, a capacity of a power supply device such as a switched mode power supply (SMPS) installed in a product increases, resulting in an increase in the cost and the volume, which causes restrictions in the design.

According to an embodiment of the disclosure, on the contrary, a data setting section and a light emitting section (specifically, a plurality of light emitting sections) of each row line may sequentially proceed in the order of the row lines.

FIGS. 3B and 3C illustrate two embodiments in which the data setting section and the light emitting section sequentially proceed in the order of the row lines.

Referring to FIGS. 3B and 3C, there is a difference in that, in the embodiment of FIG. 3B, the data setting section proceeds for one frame time, but in the embodiment of FIG. 3C, the data setting section proceeds for a time that is much shorter than one frame time, and in both embodiments, both the data setting section and the light emitting section sequentially proceed in the order of the row lines.

Hereinafter, a driving method in which a data setting section and a light emitting section sequentially proceed in the order of row lines, as shown in FIG. 3B or FIG. 3C, is referred to as "a progressive driving method" as distinguished from the batch driving method of FIG. 3A.

In the case of the progressive driving method, since the number of row lines which simultaneously emit light is reduced compared to the related art, the required peak current amount may be lowered, and accordingly, peak power consumption may be reduced.

As described above, according to embodiments of the disclosure, the display panel 100 may be driven by an active matrix (AM) method, and each sub-pixel may represent a gray scale of an image in a PWM scheme. Therefore, unlike the related art for representing a gray scale in the PAM method, it is possible to prevent a phenomenon in which the wavelength of the light emitted from the inorganic light emitting element changes according to the gray scale. In addition, instantaneous peak power consumption may be reduced by driving the display panel 100 so that sub-pixels sequentially emit light in the order of row lines.

Figure 4:
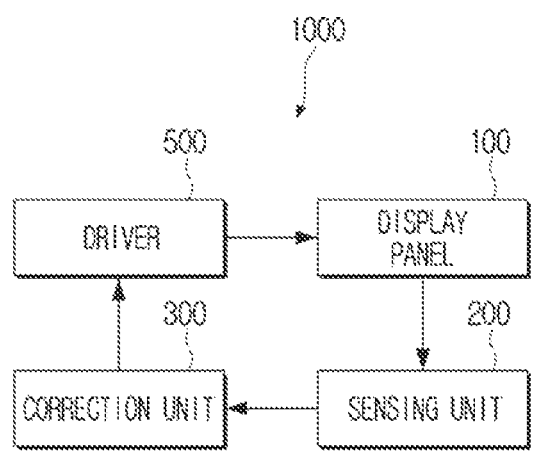
FIG. 4 is a block diagram illustrating a configuration of a display apparatus according to an embodiment of the disclosure.

FIG. 4 is a block diagram illustrating a configuration of a display apparatus according to an embodiment of the disclosure. According to FIG. 4, a display apparatus 1000 includes a display panel 100, a sensing unit 200, a correction unit 300, and a driver 500.

The driver 500 drives the display panel 100. For example, the driver 500 may provide various kinds of control signals, data signals, driving voltages, or the like, to the display panel 100 to drive the display panel 100.

The driver 500 may include a gate driver configured to drive pixels on the pixel array in units of row lines. The gate driver may apply various kinds of gate signals to the entire row lines in the order of the row lines. Accordingly, the display panel 100 may be driven by the progressive driving method as described above.

The gate driver may apply various kinds of gate signals only to some row lines. Accordingly, sensing driving may be performed in the display panel 100. A detailed content regarding sensing driving will be described later.

In addition, the driver 500 may include a data driver (or a source driver) configured to provide an image data voltage (for example, a constant current generator data voltage and a PWM data voltage) and a specific voltage (described below) to each pixel (or each sub-pixel) of the display panel 100.

In addition, the driver 500 may include a DeMUX circuit configured to select each of the plurality of sub-pixels 20-1 to 20-3 included in one pixel 10.

Further, the driver 500 may include a power IC configured to provide various kinds of DC voltages (e.g., a first driving voltage (VDD_PAM) described below, a second driving voltage (VDD_PWM), a ground voltage (VSS), etc.) to each sub-pixel circuit included in the display panel 100.

In addition, the driver 500 may include a level shifter configured to shift levels of various kinds of signals provided by a timing controller (TCON) to a level used in the aforementioned driver (e.g., a gate driver or a data driver) or in the display panel 100.

In this case, the level shifter may, for example, shift levels of various kinds of clock signals or a start signal (VST) provided by the TCON, and provide the signals to the gate driver.

In addition, the level shifter may shift a level of a sweep signal (Sweep) or a test signal (TEST) generated in the TCON and provide the signal to the sub-pixel circuits of the display panel 100. A detailed content regarding a test signal (TEST) or a sweep signal (Sweep) will be described later.

According to an embodiment of the disclosure, at least some of the aforementioned various kinds of components that may be included in the driver 500 may be arranged on a printed circuit board (PCB) separate from the display panel 100, and may be connected to sub-pixel circuits formed on a thin film transistor (TFT) layer of the display panel 100 through a film on glass (FOG) wiring.

According to another embodiment, at least some of the aforementioned various kinds of components may be arranged on a film in a chip on film (COF) form, and may be connected to the sub-pixel circuits formed on the TFT layer of the display panel 100 through the FOG wiring.

According to another embodiment, at least some of the aforementioned various kinds of components may be arranged on a rear surface of a glass substrate (described below) (an opposite side of a surface on which the TFT layer is formed with respect to the glass substrate) of the display panel 100 in a chip on glass (COG) form, and may be connected to the sub-pixel circuits formed on the TFT layer of the display panel 100 through a connection wiring.

According to another embodiment, at least some of the aforementioned various kinds of components may be formed on the TFT layer together with the sub-pixel circuits formed on the TFT layer in the display panel 100 and may be connected to the sub-pixel circuits.

For example, among the aforementioned various kinds of components, the gate driver and the DeMUX circuit may be formed in the TFT layer of the display panel 100, the data driver may be arranged on the rear surface of the glass substrate of the display panel 100 in a COG form, the level shifter may be arranged on a film in a COF form, and the power IC and the TCON may be arranged on a separate external PCB, but the disclosure is not limited thereto.

The driver 500 may drive the display panel 100 by the progressive driving method. For this, the driver 500 may set an image data voltage to the sub-pixel circuits of the display panel 100 in the order of the row lines during the data setting section, and may drive the sub-pixel circuits such that the pixels of the pixel array emit light in the order of the row lines based on the set image data voltage during the light emitting section.

The display panel 100 may include the pixel array as described above in FIG. 2, and may display an image corresponding to the applied image data voltage.

Each sub-pixel circuit included in the display panel 100 may provide a driving current of which magnitude and driving time (or pulse width) are controlled to a corresponding inorganic light emitting element based on the image data voltage.

The inorganic light emitting elements constituting the pixel array may emit light according to a driving current provided from a corresponding sub-pixel circuit, and accordingly, an image may be displayed on the display panel 100.

The sub-pixel circuits providing a driving current to the inorganic light emitting elements include driving transistors. The driving transistors are core components that determine operations of the sub-pixel circuits, and theoretically, electronic characteristics (e.g., threshold voltages (Vth) or mobility (μ)) of the driving transistors should be identical among the sub-pixel circuits of the display panel 100. However, in practice, there may be deviations in the threshold voltages (Vth) and the mobility (μ) of the driving transistors among the respective sub-pixel circuits due to various factors such as process deviations or changes over time. These deviations cause degradation of image quality (in particular, degradation of brightness uniformity), and thus need to be compensated.

In the various embodiments of the disclosure, deviations in the electronic characteristics of the driving transistors are compensated through an external compensation method. An external compensation method is a method of sensing a current flowing in driving transistors, and correcting an image data voltage based on the sensing result, and thereby compensating deviations in the threshold voltages (Vth) and the mobility (μ) of the driving transistors among sub-pixel circuits.

For such an external compensating operation, the display apparatus 1000 includes a sensing unit 200 and a correction unit 300 as shown in FIG. 4.

The sensing unit 200 may include a sensor and is configured to sense a current flowing in a driving transistor included in sub-pixel circuits, and outputting sensing data corresponding to the sensed current. For example, when a current based on a specific voltage flows in a driving transistor, the sensing unit 200 may sense this and convert the current into sensing data, and output the converted sensing data to the correction unit 300. Here, the specific voltage refers to a voltage that is applied to sub-pixel circuits separately from an image data voltage for sensing a current flowing in a driving transistor.

The correction unit 300 may include a processor and is configured to correct an image data voltage applied to sub-pixel circuits based on sensing data output from the sensing unit 200.

The correction unit 300 may correct an image data voltage by acquiring a compensation value for correcting image data based on reference data per voltage, and sensing data output from the sensing unit 200, and correcting the image data based on the acquired compensation value.

Here, the reference data per voltage is data for a reference current value flowing in a driving transistor in case a specific voltage is applied to the driving transistor, and theoretically or experimentally, it may be calculated in advance and stored in advance in a look-up table form, but the disclosure is not limited thereto.

The reference data per voltage may be stored in advance in various kinds of memories inside or outside the correction unit 300, and the correction unit 300 may load the reference data per voltage from the memories when necessary, and use the data.

A specific example wherein the correction unit 300 acquires a compensation value by using the reference data per voltage and the sensing data, and corrects the image data voltage will be described later.

The driver 500 (specifically, the data driver) may apply the image data voltage corrected as above to the display panel 100, and accordingly, deviations in the threshold voltages (Vth) and the mobility (μ) of the driving transistors may be compensated.

FIGS. 5A and 5B are diagrams for illustrating a progressive driving method of the display panel 100 according to the various embodiments of the disclosure. FIG. 5A corresponds to FIG. 3B, and FIG. 5B corresponds to FIG. 3C.

FIG. 5A conceptually illustrates a driving method of the display panel 100 for three consecutive image frames. In FIG. 5A, the vertical axis represents row lines of the display panel 100, and the horizontal axis represents time.

In FIG. 5A, an example wherein the display panel 100 consists of 312 row lines, and four times of light emitting sections 62-1, 62-2, 62-3, and 62-4 proceed based on an image data voltage set in the data setting section 61 is suggested. However, the number of the row lines or the number of times that the light emitting sections proceed are obviously not limited thereto.

For example, referring to FIG. 5A, it can be known that for one image frame, one data setting section 61 and a plurality of light emitting sections 62-1 to 62-4 proceed for each row line.

During the data setting section 61, an image data voltage for the corresponding image frame may be set in the sub-pixel circuits included in a row line. In addition, in each light emitting section 62-1 to 62-4, a driving current may be provided to a corresponding inorganic light emitting element based on the set image data voltage during the data setting section 61.

For this, the driver 500 (in particular, the gate driver) may apply a gate signal for setting an image data voltage (hereinafter, it will be referred to as a scan signal, and it includes, for example, Vini(n) and SP(n) described below) to the sub-pixel circuits of each row line during the data setting section 61.

In addition, the driver 500 may apply a gate signal configured to control a driving current providing operation of the sub-pixel circuits (hereinafter, it will be referred to as an emission signal, and it includes, for example, Emi_1(*n*) and Emi_2(*n*) described below) to the sub-pixel circuits of each row line during each light emitting section 62-1 to 62-4.

Referring to FIG. 5A, it can be known that the data setting section 61 and each light emitting section 62-1 to 62-4 sequentially proceed in the order of the row lines for the entire row lines of the display panel 100.

For this, the driver 500 may apply a scan signal to the sub-pixel circuits from the first row line to the last row line of the display panel 100 in the order of the row lines. In addition, the driver 500 may apply an emission signal to the sub-pixel circuits from the first row line to the last row line of the display panel 100 in the order of the row lines.

According to an embodiment of the disclosure, as shown in FIG. 5A, the first light emitting section 62-1 of each row line may be temporally continuous with the data setting section 61, and the plurality of light emitting sections 62-1 to 62-4 may have a predetermined time interval from each other.

In this case, the number of the light emitting sections performed in each row line for one image frame and the predetermined time interval between the light emitting sections may be set based on the size of the display panel 100 and/or a shutter speed of a camera, etc. However, embodiments are not limited thereto.

In general, a shutter speed of a camera is faster than one image frame time by several times, and thus an image displayed on the display panel 100 captured by a camera may be distorted when the display panel 100 is driven such that one light emitting section proceeds from the first row line to the last row line in the order of the row lines during one image frame time.

Thus, according to an embodiment of the disclosure, the display panel 100 may be driven such that a plurality of light emitting sections proceed at a predetermined time interval during one image frame time, and the predetermined time interval may be set on the basis of the speed of the camera. Accordingly, no matter which moment the display panel 100 is captured, an image displayed on the display panel 100 captured by the camera may not be distorted.

A blanking interval may exist between one image frame time and the next image frame time. A blanking interval may be a time period between consecutive image frame times.

According to the various embodiments of the disclosure, sensing driving may be performed during a blanking interval. Here, the sensing driving means driving the display panel 100 configured to compensate deviations in the electronic characteristics (e.g., the threshold voltages (Vth) and the mobility (μ), etc.) of the driving transistors by the external compensation method, and while the display panel 100 is being sensing-driven, a specific voltage may be applied to the driving transistors, and a current flowing in the driving transistors based on the applied specific voltage may be transmitted to the sensing unit 200.

For this, the driver 500 (in particular, the gate driver) may apply or provide a gate signal for applying a specific voltage to the driving transistors, a gate signal for making a current based on the applied specific voltage flow in the driving transistors, a gate signal for transmitting the current flowing in the driving transistors to the sensing unit 200, etc. to the sub-pixel circuits.

In addition, according to an embodiment of the disclosure, in a blanking interval, a non-light emitting section in which no current flows in the display panel 100 may be included. In a non-light emitting section, an operation such as a failure detection of the display panel 100 may be performed.

For example, whether there is a failure of the display panel 100 may be determined based on whether a current flows in the display panel 100 during a non-light emitting section. As an example, in case the display panel 100 has a failure such as a short occurring in the sub-pixel circuits, a current may flow in the display panel 100 during a non-light emitting section. Accordingly, when a current flows in the display panel 100 during a non-light emitting section, the processor or the timing controller included in the display apparatus may determine that the display panel 100 has a failure.

In addition, according to an embodiment of the disclosure, an operation for discharging a charge remaining in an inorganic light emitting element may be performed during a blanking interval. A detailed content in this regard will be described later.

FIG. 5B is different from FIG. 5A merely in that the data setting sections 61 for the entire 312 row lines proceed for a much shorter time than one frame time, and the description made above in FIG. 5A may be applied to FIG. 5B as it is, and thus an overlapping description will be omitted. The difference between the two embodiments is described below.

Hereinafter, the components of the display apparatus 1000 according to an embodiment of the disclosure and the external compensation method will be described in more detail with reference to FIG. 6.

Figure 6:
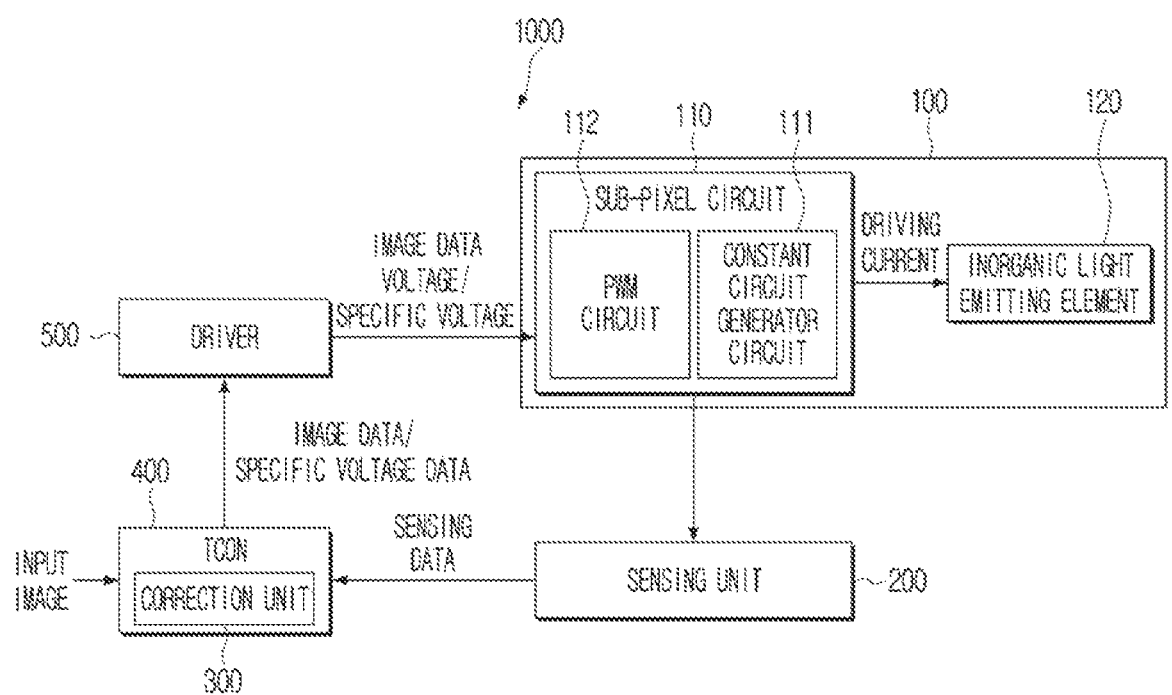
FIG. 6 is a detailed block diagram of a display apparatus according to an embodiment of the disclosure.

FIG. 6 is a detailed block diagram of a display apparatus according to an embodiment of the disclosure. In describing FIG. 6, descriptions regarding contents overlapping with the aforementioned contents will be omitted.

According to FIG. 6, the display apparatus 1000 includes a display panel 100, a sensing unit 200, a correction unit 300, a timing controller 400 (referred to as a TCON hereinafter), and a driver 500.

The TCON 400 controls the overall operations of the display apparatus 1000. In particular, the TCON 400 may perform sensing driving of the display apparatus 1000. In addition, the TCON 400 may perform display driving of the display apparatus 1000.

Here, the sensing driving is a driving that updates a compensation value for compensating deviations in the threshold voltages (Vth) and the mobility (μ) of the driving transistors included in the display panel 100, and the display driving is a driving that displays an image on the display panel 100 based on an image data voltage to which the compensation value is reflected.

When the display driving is performed, the TCON 400 provides image data for an input image to the driver 500. In this case, the image data provided to the driver 500 may be image data for which correction was performed by the correction unit 300.

The correction unit 300 may correct image data for an input image based on a compensation value. In this case, the compensation value may be acquired or calculated by the correction unit 300 through the sensing driving.

As shown in FIG. 6, the correction unit 300 may be implemented as one function module of the TCON 400 that is mounted on the TCON 400. However, embodiments are not limited thereto, and the correction unit 300 may be mounted on a separate processor different from the TCON 400, and it may also be implemented as a separate chip in an application specific integrated circuit (ASIC) or a field-programmable gate array (FPGA) type.

The driver 500 may generate an image data voltage based on image data provided from the TCON 400, and provide or apply the generated image data voltage to the display panel 100. Accordingly, the display panel 100 may display an image based on the image data voltage provided from the driver 500.

When the sensing driving is performed, the TCON 400 may provide specific voltage data for sensing a current flowing in the driving transistor included in the sub-pixel circuit 110 to the driver 500.

The driver 500 may generate a specific voltage corresponding to the specific voltage data and provide the voltage to the display panel 100, and accordingly, a current based on the specific voltage may flow in the driving transistor included in the sub-pixel circuit 110 of the display panel 100.

The sensing unit 200 may sense the current flowing in the driving transistor and output sensing data to the correction unit 300, and the correction unit 300 may acquire or update a compensation value for correcting the image data based on the sensing data output from the sensing unit 200.

Hereinafter, each component illustrated in FIG. 6 will be described in more detail.

The display panel 100 includes an inorganic light emitting element 120 constituting a sub-pixel, and a sub-pixel circuit 110 configured to provide a driving current to the inorganic light emitting element 120. In FIG. 6, only a structure related to one sub-pixel included in the display panel 100 is illustrated for the convenience of explanation, but the sub-pixel circuit 110 and the inorganic light emitting element 120 may be provided for each sub-pixel.

The inorganic light emitting element 120 may be mounted on the sub-pixel circuit 110 so as to be electrically connected to the sub-pixel circuit 110, and may emit light based on the driving current provided from the sub-pixel circuit 110.

The inorganic light emitting element 120 may constitute the sub-pixels 20-1 to 20-3 of the display panel 100, and there may be a plurality of types depending on the color of the emitted light. For example, as the inorganic light emitting element 120, there may be a red (R) inorganic light emitting element emitting red color light, a green (G) inorganic light emitting element emitting green color light, and a blue (B) inorganic light emitting element emitting blue light.

Accordingly, the type of the sub-pixel described above may be determined according to the type of the inorganic light emitting element 120. For example, the R inorganic light emitting element may constitute the R sub-pixel 20-1, the G inorganic light emitting element may constitute the G sub-pixel 20-2, and the B inorganic light emitting element may constitute the B sub-pixel 20-3.

Here, the inorganic light emitting element 120 means a light emitting element that is manufactured using an inorganic material, which is different from an organic light emitting diode (OLED) that is manufactured using an organic material.

In particular, according to an embodiment of the disclosure, the inorganic light emitting element 120 may be a micro light emitting diode (micro LED or μLED) having a size that is less than or equal to 100 micrometers (μm).

A display panel in which each sub-pixel is implemented with a micro LED is called a micro LED display panel. A micro LED display panel is one of flat display panels, and consists of a plurality of inorganic LEDs, each of which is less than or equal to 100 micrometers. A micro LED display panel may provide better contrast, response time, and energy efficiency compared to a liquid crystal display (LCD) panel requiring a backlight.

Both of an organic LED (OLED) and a micro LED have good energy efficiency, but a micro LED provides better performance than an OLED in terms of the brightness, light emission efficiency, and lifespan. In particular, for an OLED, a fluorescent organic compound is used, and due to the characteristic of this organic compound, an OLED is weak against a burn-in phenomenon, and is less appropriate for PWM driving than a micro LED which is an inorganic light emitting element.

The inorganic light emitting element 120 may represent gray scale values of different brightness according to the magnitude of the driving current provided from the sub-pixel circuit 110 or the pulse width of the driving current. Here, the pulse width of the driving current may be called a duty ratio of the driving current or a duration of the driving current.

For example, the inorganic light emitting element 120 may express a brighter gray scale value as the magnitude of the driving current is bigger. In addition, the inorganic light emitting element 120 may express a brighter gray scale value as the pulse width of the driving current is longer (i.e., as the duty ratio of the driving current is higher or the duration of the driving current is longer).

The sub-pixel circuit 110 provides a driving current to the inorganic light emitting element 120 during the display driving. For example, the sub-pixel circuit 110 may provide a driving current of which magnitude and duration are controlled to the inorganic light emitting element 120 based on an image data voltage (i.e., a constant current generator data voltage and a PWM data voltage) applied from the driver 500.

For example, the sub-pixel circuit 110 may drive the inorganic light emitting element 120 by the pulse amplitude modulation (PAM) method and/or the pulse width modulation (PWM) method, and control the brightness of the light emitted by the inorganic light emitting element 120.

For this, the sub-pixel circuit 110 may include a constant current generator circuit 111 configured to provide a constant current having a regular magnitude based on a constant current generator data voltage to the inorganic light emitting element 120, and a PWM circuit 112 configured to control the time during which the constant current flows in the inorganic light emitting element 120 based on a PWM data voltage. Here, the constant current provided to the inorganic light emitting element 120 becomes the driving current.

The constant current generator circuit 111 and the PWM circuit 112 respectively include a driving transistor. Hereinafter, for the convenience of explanation, the driving transistor included in the constant current generator circuit 111 will be referred to as a first driving transistor, and the driving transistor included in the PWM circuit 112 will be referred to as a second driving transistor.

As the first driving transistor and the second driving transistor are separate driving transistors, the electronic characteristics of the first driving transistor and the electronic characteristics of the second driving transistor should be respectively compensated.

Thus, according to an embodiment of the disclosure, deviations in the electronic characteristics of the first and second driving transistors may be respectively compensated by correcting the constant current generator data voltage based on a current flowing in the first driving transistor, and correcting the PWM data voltage based on a current flowing in the second driving transistor.

However, as it will be described below, the first driving transistor and the second driving transistor are serially connected, and accordingly, when the sensing driving is performed, the same current flows in the first driving transistor and the second driving transistor.

Thus, according to an embodiment of the disclosure, a sensing driving period may include a constant current generator circuit sensing period and a PWM circuit sensing period. Here, the constant current generator circuit sensing period refers to a sensing driving period for sensing a first current determined based on a specific voltage applied to the first driving transistor, and the PWM circuit sensing period refers to a sensing driving period for sensing a second current determined based on a specific voltage applied to the second driving transistor.

For example, during the constant current generator circuit sensing period, the first current flowing in the first and second driving transistors may be transmitted to the sensing unit 200, and during the PWM circuit sensing period, the second current flowing in the first and second driving transistors may be transmitted to the sensing unit 200.

Accordingly, the sensing unit 200 may respectively sense the first and second currents, and respectively output first sensing data corresponding to the first current and second sensing data corresponding to the second current to the correction unit 300. For this, the sensing unit 200 may include a current detector and an analog to digital converter (ADC). Here, the current detector may be implemented by using a current integrator including an operational amplifier (OP-AMP) and a capacitor, but the disclosure is not limited thereto.

The correction unit 300 may correct an image data voltage applied to the sub-pixel circuit 110 based on the sensing data.

For example, the correction unit 300 may identify a first reference data value corresponding to a first specific voltage (the reference numeral 94 in FIG. 9B) described below in the reference data per voltage, compare the identified first reference data value and the first sensing data value output from the sensing unit 200, and calculate or acquire a first compensation value for correcting the constant current generator data voltage.

In addition, the correction unit 300 may identify a second reference data value corresponding to a fourth specific voltage (the reference numeral 91 in FIG. 9B) described below in the reference data per voltage, compare the identified second reference data value and the second sensing data value output from the sensing unit 200, and calculate or acquire a second compensation value for correcting the PWM data voltage.

The first and second compensation values acquired as above may be stored or updated in a memory inside or outside the correction unit 300, as described above, and they may be used in correcting the image data voltage when the display driving is performed afterwards.

For example, the correction unit 300 may correct image data to be provided to the driver 500 (in particular, the data driver) by using the compensation values, and thereby correct the image data voltage applied to the sub-pixel circuit 110. As the data driver provides the image data voltage to the sub-pixel circuit 110 based on the input image data, the correction unit 300 may correct the image data voltage applied to the sub-pixel circuit 110 by correcting the image data value.

For example, the correction unit 300 may correct the constant current generator data value in the image data based on the first compensation value. In addition, the correction unit 300 may correct the PWM data value in the image data based on the second compensation value. Further, the correction unit 300 may provide the corrected constant current generator data value and the corrected PWM data value to the TCON 400.

Accordingly, the TCON 400 may provide the corrected constant current generator data and the corrected PWM data to the driver 500 when the display driving is performed, and the constant current generator data voltage and the PWM data voltage applied to the sub-pixel circuit 110 may thereby be corrected respectively.

The driver 500 (in particular, the gate driver) may provide a control signal configured to drive the display to the sub-pixel circuits 110 of the entire row lines of the display panel 100 in the order of the row lines during the driving period of the display for one image frame. In this case, the control signal configured to drive the display may include the aforementioned scan signal and emission signal.

In addition, the driver 500 (in particular, the gate driver) may provide a control signal for the sensing driving to the sub-pixel circuits 110 of some row lines of the display panel 100 during a sensing driving period for one image frame. Here, the control signal for the sensing driving is a signal for setting a specific voltage to the sub-pixel circuits 110 of some row lines, and transmitting a current flowing in the driving transistors included in the respective sub-pixel circuits 110 of some row lines based on the set specific voltage to the sensing unit 200, and it may include a gate signal for applying a specific voltage to the driving transistors, a gate signal for making a current based on the applied specific voltage flow in the driving transistors, and a gate signal for transmitting the current flowing in the driving transistors to the sensing unit 200 as described above.

The driver 500 may include a data driver configured to provide an image data voltage (i.e., a constant current generator data voltage, a PWM data voltage) and a specific voltage (i.e., first to fourth specific voltages described below) to the sub-pixel circuits.

In this case, according to an embodiment of the disclosure, the constant current generator data voltage, the third specific voltage 92 described below, and the first specific voltage 94 described below may be applied from a first data driver, and the PWM data voltage, the fourth specific voltage 91 described below, and the second specific voltage 93 described below may be applied from a second data driver separate from the first data driver. According to another embodiment of the disclosure, all of the image data voltages and the specific voltages may be provided from one data driver.

The data driver may include a digital to analog converter (DAC) configured to convert the image data and the specific voltage data provided from the TCON 400 respectively into an image data voltage and a specific voltage.

Figure 7A:
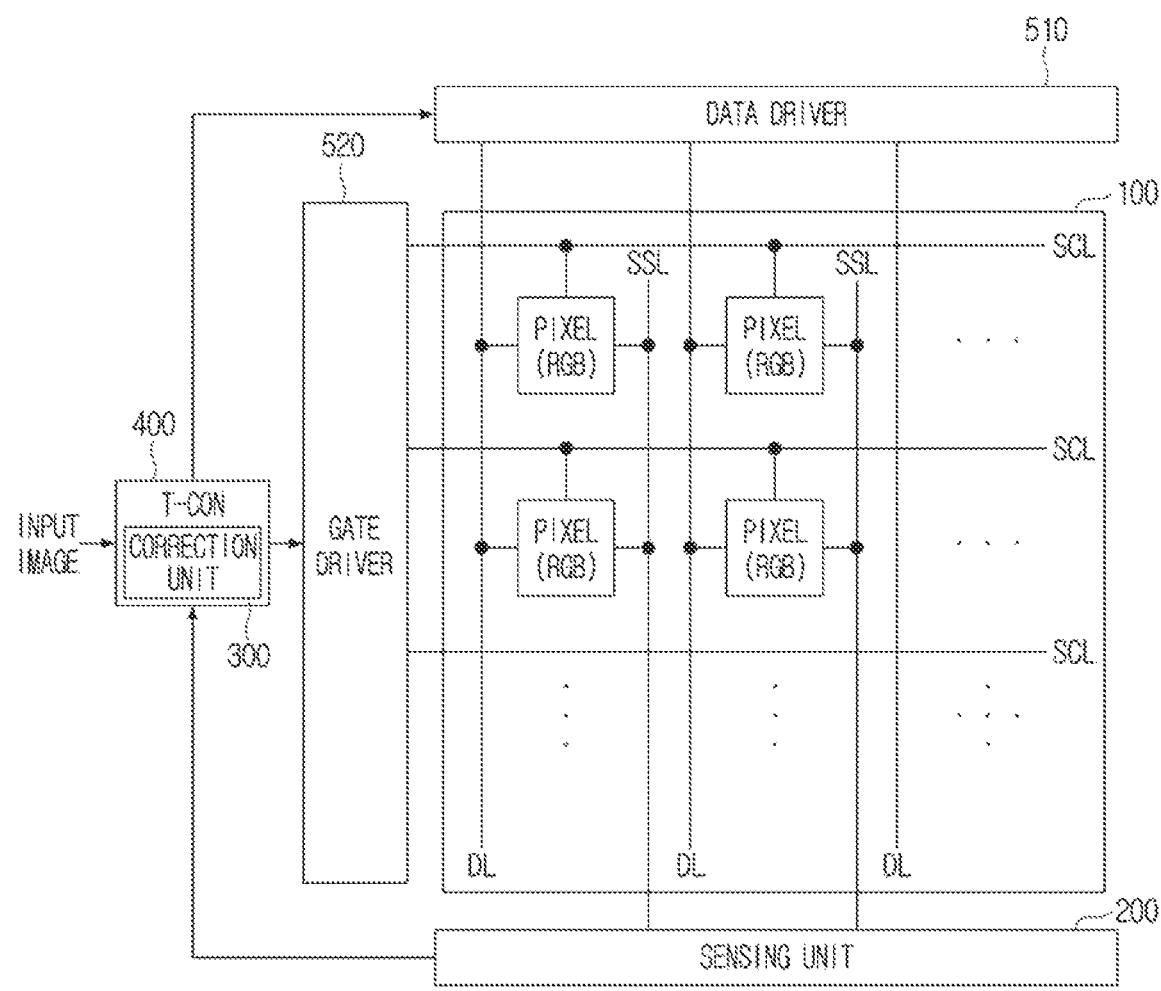
FIG. 7A is a diagram illustrating an implementation example of a sensing unit according to an embodiment of the disclosure.
Figure 7B:
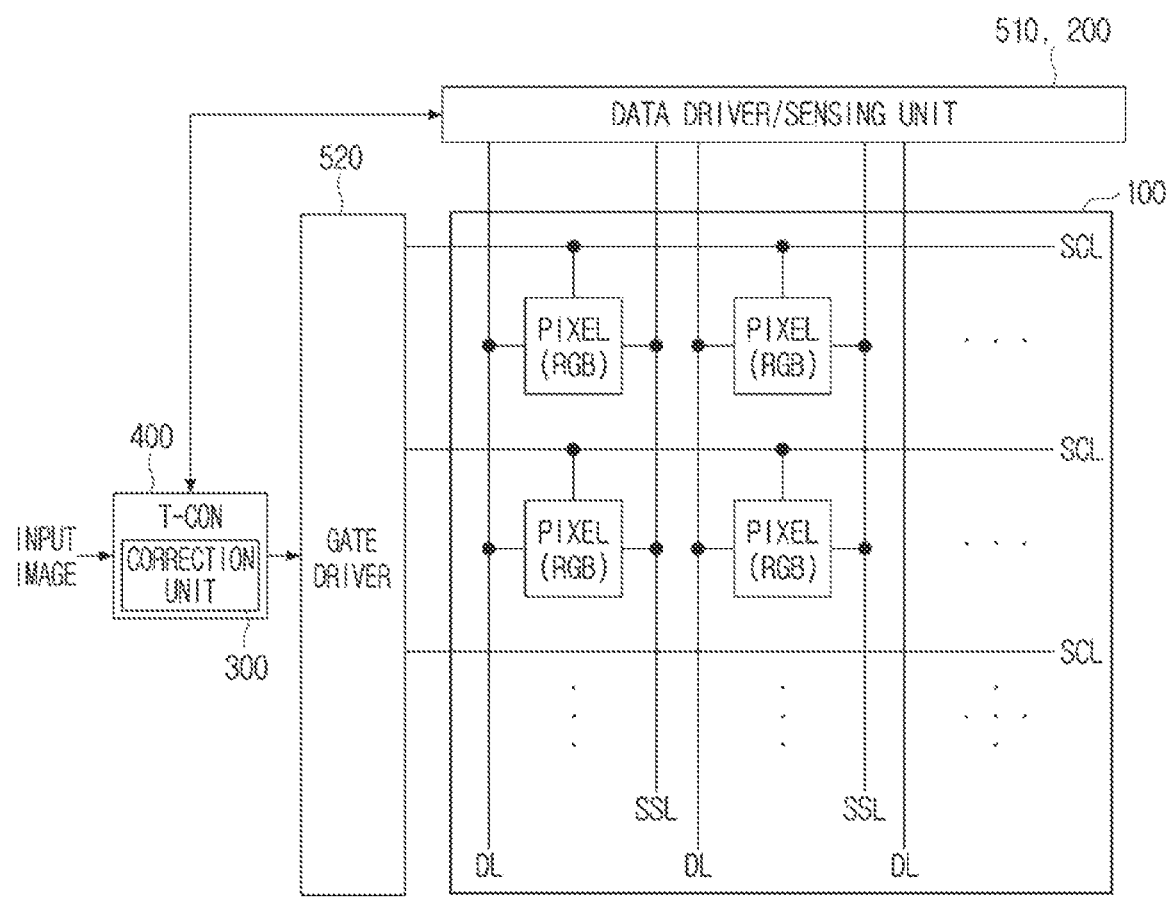
FIG. 7B is a diagram illustrating an implementation example of a sensing unit according to another embodiment of the disclosure.

FIGS. 7A and 7B are diagrams illustrating implementation examples of the sensing unit 200. Referring to FIGS. 7A and 7B, the display panel 100 includes a plurality of pixels disposed in each region wherein a plurality of data lines (DLs) and a plurality of scan liens (SCLs) intersect in a matrix form.

In this case, each pixel may include three sub-pixels such as R, G, and B. In addition, the display panel 100 may include the inorganic light emitting elements 120 of colors corresponding to the sub-pixels, and the sub-pixel circuits 110 provided for each inorganic light emitting element, as described above.

Here, the data line (DL) is a wiring line configured to apply an image data voltage (specifically, a constant current generator data voltage and a PWM data voltage) or a specific voltage (specifically, first to fourth specific voltages described below) applied from the data driver 510 to each sub-pixel circuit 110 of the display panel 100, and the scan line (SCL) is a wiring line configured to apply various kinds of gate signals applied from the gate driver 520 to each sub-pixel circuit 110 of the display panel 100 and driving the pixels (or the sub-pixels) in units of row lines.

Accordingly, an image data voltage or a specific voltage applied from the data driver 510 through the data line (DL) may be applied to the sub-pixel circuits of the row lines selected through a gate signal (e.g., a Vini(n) signal, an SP(n) signal described below) applied from the gate driver 520.

In this case, voltages (an image data voltage and a specific voltage) to be applied to each of R, G, and B sub-pixels included in one pixel may be time division multiplexed and applied to each pixel of the display panel 100. The time division multiplexed voltages may be respectively applied to the corresponding sub-pixel circuits through a DeMUX circuit.

Depending on embodiments, unlike FIGS. 7A and 7B, a separate data line may be provided for each of R, G, and B sub-pixels, and in this case, the voltages (an image data voltage and a specific voltage) to be applied to each of the R, G, and B sub-pixels may be simultaneously applied to the corresponding sub-pixels through the corresponding data lines. In this case, a DeMUX circuit may not be needed.

This is the same for a sensing line (SSL). For example, according to an embodiment of the disclosure, a sensing line (SSL) may be provided for each column line of a pixel, as shown in FIGS. 7A and 7B. In this case, a DeMUX circuit is needed for an operation of the sensing unit 200 for each of R, G, and B sub-pixels.

In addition, unlike the embodiments shown in FIGS. 7A and 7B, in case a sensing line (SSL) is provided in units of column lines of a sub-pixel, a separate DeMUX circuit is not needed for an operation of the sensing unit 200 for each of R, G, and B sub-pixels. However, compared to the embodiments shown in FIGS. 7A and 7B, unit components of the sensing unit 200 described below will be needed three times more.

In FIGS. 7A and 7B, only one scan line (SCL) is illustrated for one row line, for the convenience of illustration. However, the actual number of the scan lines may vary in any way depending on the driving method of the pixel circuits 110 included in the display panel 100 or implementation examples. This is also the same for the data line (DL). For example, the number of the data lines (DLs) is also not limited to what is illustrated, and the number may vary in any way depending on the number of the data drivers.

The first and second currents flowing in the first and second driving transistors based on specific voltages as described above may be transmitted to the sensing unit 200 through the sensing line (SSL). Accordingly, the sensing unit 200 may sense each of the first and second currents, and respectively output the first sensing data corresponding to the first current and the second sensing data corresponding to the second current to the correction unit 300.

In this case, according to an embodiment of the disclosure, the sensing unit 200 may be implemented as a separate integrated circuit (IC) from the data driver 510 as shown in FIG. 7A, or it may be implemented as one IC together with the data driver 510 as shown in FIG. 7B.

The correction unit 300 may correct the constant current generator data voltage based on the first sensing data output from the sensing unit 200, and correct the PWM data voltage based on the second sensing data, as described above.

In FIGS. 7A and 7B, an example wherein the first and second currents are transmitted to the sensing unit 200 through a separate sensing line (SSL) from the data line (DL) was suggested. However, embodiments are not limited thereto. For example, in case the data driver 510 and the sensing unit 200 are implemented as one IC as in FIG. 7B, an embodiment wherein the first and second currents are transmitted to the sensing unit 200 through the data line (DL) without the sensing line (SSL) may be possible.

Figure 8:
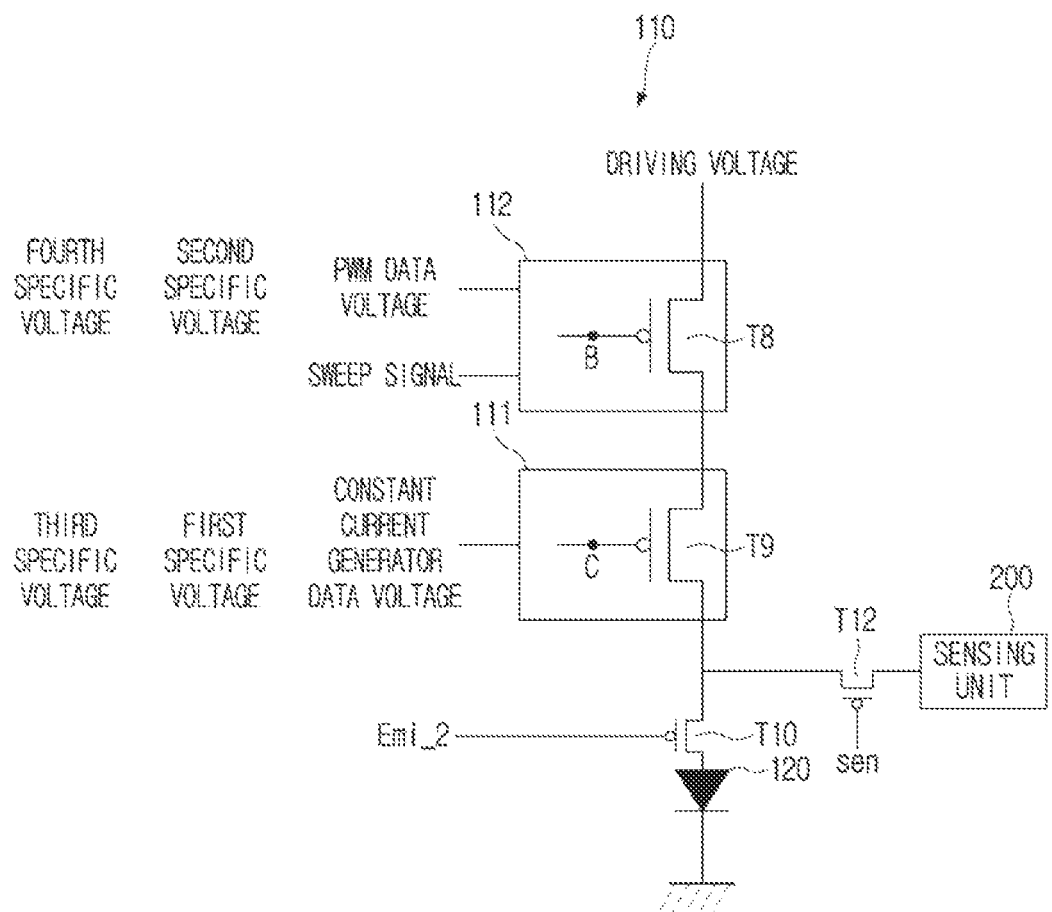
FIG. 8 is a schematic block diagram of a sub-pixel circuit according to an embodiment of the disclosure.

FIG. 8 is a schematic block diagram of the sub-pixel circuit 110 according to an embodiment of the disclosure. According to FIG. 8, the sub-pixel circuit 110 includes a constant current generator circuit 111, a PWM circuit 112, a transistor T10, and a transistor T12.

The constant current generator circuit 111 includes a first driving transistor T9, and it may provide a constant current to the inorganic light emitting element 120 based on a constant current generator data voltage applied to a display driving period.

For example, when a driving voltage is applied through the second driving transistor T8 of the PWM circuit 112 in a light emitting section, the constant current generator circuit 111 may apply the driving voltage to the inorganic light emitting element 120 through the first driving transistor T9. Accordingly, a constant current may flow in the inorganic light emitting element 120.

In this case, the magnitude of the constant current may vary depending on the magnitude of the constant current generator data voltage applied to the constant current generator circuit 111. For example, the constant current generator circuit 111 is configured to perform PAM driving of the inorganic light emitting element 120. Accordingly, depending on cases, the constant current generator data voltage may be referred to as a PAM data voltage, and the constant current generator circuit 111 may be referred to as a PAM circuit, respectively.

However, according to an embodiment of the disclosure, a same constant current generator data voltage may be applied to all of the constant current generator circuits 111 of the display panel 100, and in this example, the constant current generator circuits 111 may provide a constant current of a constant magnitude (or a same magnitude) to all of the inorganic light emitting elements 120 of the display panel 100.

The "constant current generator circuit" and "constant current generator data voltage" only indicate that, when the same PAM data voltage is applied to all PAM circuits 111 of the display panel 100 as described above, the PAM circuits operate as a constant current generator, and the capability of the components is not limited by the names.

The PWM circuit 112 includes the second driving transistor, and it may control the time during which a constant current is provided to the inorganic light emitting element 120 based on a PWM data voltage and a sweep signal (specifically, a sweep voltage) applied to a display driving period.

For example, the PWM circuit 112 may control the time during which a constant current flows to the inorganic light emitting element 120 by applying a driving voltage to the constant current generator circuit 111 (specifically, a source terminal of the first driving transistor) only during the time period in which the second driving transistor is turned on in a light emitting section.

As described above, the constant current generator circuit 111 provides a constant current to the inorganic light emitting element 120 by applying the driving voltage applied through the second driving transistor of the PWM circuit 112 to the inorganic light emitting element 120.

In this case, the driving voltage is provided to the constant current generator circuit 111 from the PWM circuit 112 only while the second driving transistor is turned on in the light emitting section. In addition, the time period in which the second driving transistor is turned on in the light emitting section is determined on the basis of the PWM data voltage and the sweep voltage as described below.

Accordingly, the PWM circuit 112 may control the time during which the constant current is provided to the inorganic light emitting element 120 based on the PWM data voltage and the sweep voltage.

Here, the sweep voltage is a voltage signal that sweeps between two different voltages once. In addition, the sweep voltage may be a part selected based on an emission signal Emi_1(n), which will be described below, in a sweep signal in which a voltage linearly changing from a first voltage to a second voltage is continuously repeated. In addition, the sweep signal is a global signal applied to all of the sub-pixel circuits 110 of the display panel 100 identically, and the change rate of the sweep voltage according to time is constant.

In a light emitting section in a display driving period, the transistor T10 gets in a turned-on state by a control signal Emi_2. Accordingly, in the light emitting section, a driving voltage may be applied to the light emitting element 120, and a constant current may flow to the light emitting element 120. In contrast, during the display driving period, the transistor T12 maintains a turned-off state by a control signal Sen. Accordingly, during the display driving period, a constant current is not transmitted to the sensing unit 200.

In a sensing driving period, the transistor T10 gets in a turned-off state by the control signal Emi_2, and the transistor T12 gets in a turned-on state by the control signal Sen. Accordingly, a current flowing in the driving transistors T8, T9 may be transmitted to the sensing unit 200.

For example, in a constant current generator circuit sensing period in a sensing period, the first specific voltage may be applied to the constant current generator circuit 111 (specifically, a gate terminal of the first driving transistor T9), and the second specific voltage may be applied to the PWM circuit 112 (specifically, a gate terminal of the second driving transistor T8).

Accordingly, the first and second driving transistors (T9, T8) are turned on, and the first current may flow in the second driving transistor T8 and the first driving transistor T9, and may be transmitted to the sensing unit 200 through the transistor T12 in a turned-on state.

In this case, the first current may be determined based on the first specific voltage applied to the gate terminal of the first driving transistor T9.

For example, a turn-on resistance of a transistor may be expressed as in Equation 1 below.

$$R_{on} = \frac{W}{L} \times \frac{C_i \times \mu_{eff}}{(V_{SQ} - V_{TH})} \qquad \text{[Equation 1]}$$

Here, Ron is a turn-on resistance of a transistor, and represents a resistance value that the transistor has in a turned-on state, W represents the width of a channel of the transistor, L represents the length of the channel of the transistor, $C_i$ represents the capacitance of an insulator layer that exists between a gate electrode layer and a channel layer of the transistor, $\mu_{eff}$ represents the effective mobility of the channel layer of the transistor, $V_{SG}$ represents a voltage between a source terminal and a gate terminal of the transistor, and $V_{TH}$ represents a threshold voltage of the transistor.

In the above formula, W, L, $C_i$, $\mu_{eff}$, and $V_{TH}$ have fixed values, and the turn-on resistance of the transistor may be adjusted according to the voltage between the source terminal and the gate terminal.

In particular, driving voltages are applied to the source terminals of the first driving transistor T9 and the second driving transistor T8, and ultimately, the turn-on resistances of the first driving transistor T9 and the second driving transistor T8 may be determined based on the voltages applied to the gate terminals, i.e., the specific voltages.

In this case, according to an embodiment of the disclosure, the first and second specific voltages may have predetermined values so that the turn-on resistance value of the second driving transistor T8 has a smaller value than the turn-on resistance value of the first driving transistor T9.

For example, the first and second specific voltage values may be determined so that the turn-on resistance value of the second driving transistor T8 has a value smaller than 1 percent of the turn-on resistance value of the first driving transistor T9, but embodiments are not limited thereto.

As described above, in case the turn-on resistance value of the second driving transistor T8 is smaller than the turn-on resistance value of the first driving transistor T9 to the extent that it can be ignored, it may be deemed that the first current value flowing in the first and second driving transistors T9, T8 in a constant current generator circuit sensing period is determined by the turn-on resistance value of the first driving transistor T9.

In a PWM circuit sensing period in a sensing period, the third specific voltage may be applied to the constant current generator circuit 111 (specifically, the gate terminal of the first driving transistor T9), and the fourth specific voltage may be applied to the PWM circuit 112 (specifically, the gate terminal of the second driving transistor T8).

Accordingly, the first and second driving transistors T9, T8 are turned on, and the second current may flow in the second driving transistor T8 and the first driving transistor T9, and may be transmitted to the sensing unit 200 through the transistor T12 in a turned-on state.

In this case, the second current may be determined based on the fourth specific voltage applied to the gate terminal of the second driving transistor T8.

For example, according to an embodiment of the disclosure, the third and fourth specific voltages may have predetermined values so that the turn-on resistance value of the first driving transistor T9 has a smaller value than the turn-on resistance value of the second driving transistor T8.

For example, the third and fourth specific voltage values may be determined so that the turn-on resistance value of the first driving transistor T9 has a value smaller than 1 percent of the turn-on resistance value of the second driving transistor T8, but embodiments are not limited thereto.

As described above, in case the turn-on resistance value of the first driving transistor T9 is smaller than the turn-on resistance value of the second driving transistor T8 to the extent that it can be ignored, it may be deemed that the second current value flowing in the first and second driving transistors T9, T8 in a PWM circuit sensing period is determined by the turn-on resistance value of the second driving transistor T8.

When the first and second currents are transmitted, the sensing unit 200 may sense each of the first and second currents, and respectively output the first sensing data corresponding to the first current and the second sensing data corresponding to the second current to the correction unit 300.

Accordingly, the correction unit 300 may correct an image data voltage applied to the sub-pixel circuit 110 based on the sensing data.

Figure 9A:
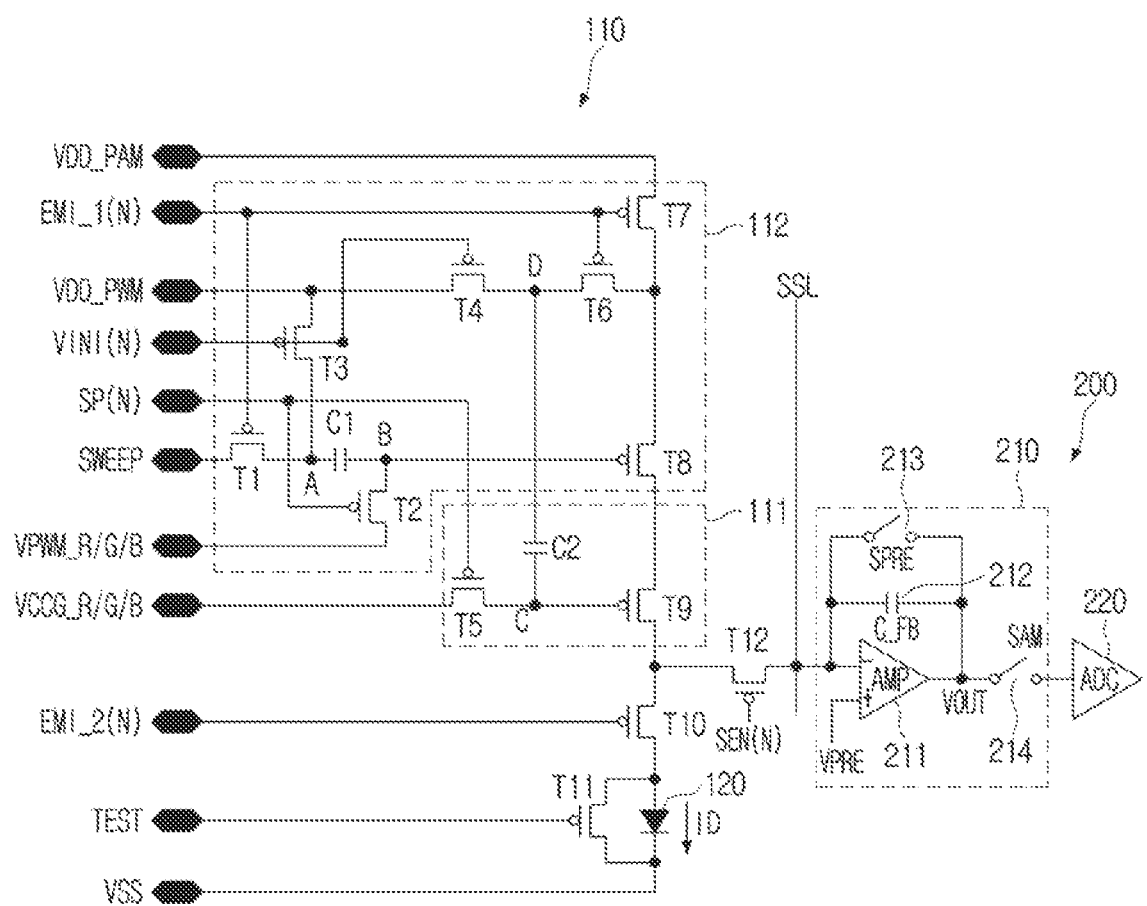
FIG. 9A is a detailed circuit diagram of a sub-pixel circuit and a sensing unit according to an embodiment of the disclosure.

FIG. 9A is a detailed circuit diagram of the sub-pixel circuit 110 and the sensing unit 200 according to an embodiment of the disclosure. FIG. 9A specifically illustrates a circuit related to one sub-pixel, i.e., one organic light emitting element 120, a sub-pixel circuit 110 configured to drive the inorganic light emitting element 120, and unit components of the sensing unit 200 configured to sense a current flowing in the driving transistors T8, T9 included in the sub-pixel circuit 110.

According to FIG. 9A, the sub-pixel circuit 110 may include a constant current generator circuit 111, a PWM circuit 112, a transistor T10, a transistor T11, and a transistor T12.

The constant current generator circuit 111 includes a first driving transistor T9, a capacitor C2, and a transistor T5, as shown in FIG. 9A.

The transistor T5 is controlled to be turned on/turned off according to a control signal SP(n), and while the transistor T5 is turned on, it may apply a constant current generator data voltage or a specific voltage applied through a data signal line VCCG_R/G/B to the gate terminal (i.e., the C node) of the first driving transistor T9.

One end of the capacitor C2 is connected to the gate terminal (i.e., the C node) of the first driving transistor T9, and the other end is commonly connected to the drain terminal of the transistor T4 and the drain terminal of the transistor T6.

The first driving transistor T9 is serially connected with the second driving transistor T8. That is, the source terminal of the first driving transistor T9 is connected to the drain terminal of the second driving transistor T8.

In addition, the drain terminal of the first driving transistor T9 is commonly connected to the source terminal of the transistor T10 and the source terminal of the transistor T12. In addition, the gate terminal of the first driving transistor T9 is commonly connected to one end of the capacitor C2 and the drain terminal of the transistor T5.

The PWM circuit 112 includes six transistors T1 to T4, T6, T7, a second driving transistor T8, and a capacitor C1, as shown in FIG. 9A.

The transistor T1 is controlled to be turned on/turned off according to a control signal Emi_1(n), and while the transistor T1 is turned on, it may apply a sweep signal to one end (i.e., the A node) of the capacitor C1.

The transistor T2 is controlled to be turned on/turned off according to a control signal SP(n), and while the transistor T2 is turned on, it may apply a PWM data voltage or a specific voltage applied through a data signal line VPWM_R/G/B to the gate terminal (i.e., the B node) of the second driving transistor T8.

The transistor T3 is controlled to be turned on/turned off according to a control signal Vini(n), and while the transistor T3 is turned on, it may apply a second driving voltage VDD_PWM to the A node.

The transistor T4 is controlled to be turned on/turned off according to a control signal Vini(n), and while the transistor T4 is turned on, it may apply the second driving voltage VDD_PWM to the other end (i.e., the D node) of the capacitor C2.

The transistor T7 is controlled to be turned on/turned off according to a control signal Emi_1(n), and while the transistor T7 is turned on, it may apply a first driving voltage VDD_PAM to the source terminal of the second driving transistor T8.

The transistor T6 is controlled to be turned on/turned off according to a control signal Emi_1(n), and while the transistor T6 is turned on, it may apply the first driving voltage VDD_PAM to the other end of the capacitor C2.

One end of the capacitor C1 is connected to the drain terminal (i.e., the A node) of the transistor T1, and the other end is connected to the gate terminal (i.e., the B node) of the second driving transistor T8.

The second driving transistor T8 is serially connected with the first driving transistor T9. For example, the drain terminal of the second driving transistor T8 is connected to the source terminal of the first driving transistor T9.

In addition, the source terminal of the second driving transistor T8 is commonly connected to the source terminal of the transistor T6 and the drain terminal of the transistor T7. In addition, the gate terminal of the second driving transistor T8 is commonly connected to the other end of the capacitor C1 and the drain terminal of the transistor T2.

The source terminal of the transistor T10 is connected to the drain terminal of the first driving transistor T9, and its drain terminal is connected to the anode terminal of the inorganic light emitting element 120. The transistor T10 may be controlled to be turned on/turned off according to a control signal Emi_2(n), and electronically connect/separate the constant current generator circuit 111 and the inorganic light emitting element 120.

The transistor T11 is connected between the anode terminal and the cathode terminal of the inorganic light emitting element 120. The transistor T11 may be used for different uses respectively before and after the inorganic light emitting element 120 is mounted on the TFT layer and electronically connected with the sub-pixel circuit 120.

For example, before the inorganic light emitting element 120 and the sub-pixel circuit 110 are electronically connected with each other, the transistor T11 may be turned on according to a TEST signal to check whether the sub-pixel circuit 110 is abnormal. After the inorganic light emitting element 120 and the sub-pixel circuit 110 are connected with each other, the transistor T11 may be turned on according to a TEST signal to discharge the charge remaining in the junction capacitance of the inorganic light emitting element 120.

Here, the TEST signal is a control signal provided from the TCON through the level shifter to control on/off of the transistor T11, and is a global signal applied identically to all of the sub-pixel circuits 110 of the display panel 100.

The source terminal of the transistor T12 is connected to the drain terminal of the first driving transistor T9, and its drain terminal is connected to the sensing unit 200. The transistor T12 may be turned on according to a control signal Sen(n) while the sensing driving is performed, and transmit the aforementioned first and second currents to the sensing unit 200 through the sensing line (SSL).

The cathode terminal of the inorganic light emitting element 120 is connected to a ground voltage (VSS) terminal.

According to FIG. 9A, the unit components of the sensing unit 200 includes a current integrator 210 and an analog to digital converter (ADC) 220. The current integrator 210 may include an amp 211, an integration capacitor 212, a first switch 213, and a second switch 214.

The amp 211 may include an inversion input terminal (−) that is connected to the sensing line (SSL) and receives input of the aforementioned first and second currents, a non-inversion input terminal (+) that receives input of a reference voltage (Vpre), and an output terminal (Vout).

The integration capacitor 212 may be connected between the inversion input terminal (−) and the output terminal (Vout) of the amp 211, and the first switch 213 may be connected to both ends of the integration capacitor 212. Both ends of the second switch 214 may be respectively connected to the output terminal (Vout) of the amp 211 and the input end of the ADC 220, and the second switch 214 may be switched according to a control signal Sam.

The unit components of the sensing unit 200 shown in FIG. 9A may be provided for each sensing line (SSL). For example, in case a sensing line is provided for each column line of a pixel in the display panel 100 including 550 pixel column lines, the sensing unit 200 may include 550 of the unit components. As another example, in case a sensing line is provided for each column line of R, G, and B sub-pixels in the display panel 100 including 550 pixel column lines, the sensing unit 200 may include 1650(=550*3) of the unit components.

Figure 9B:
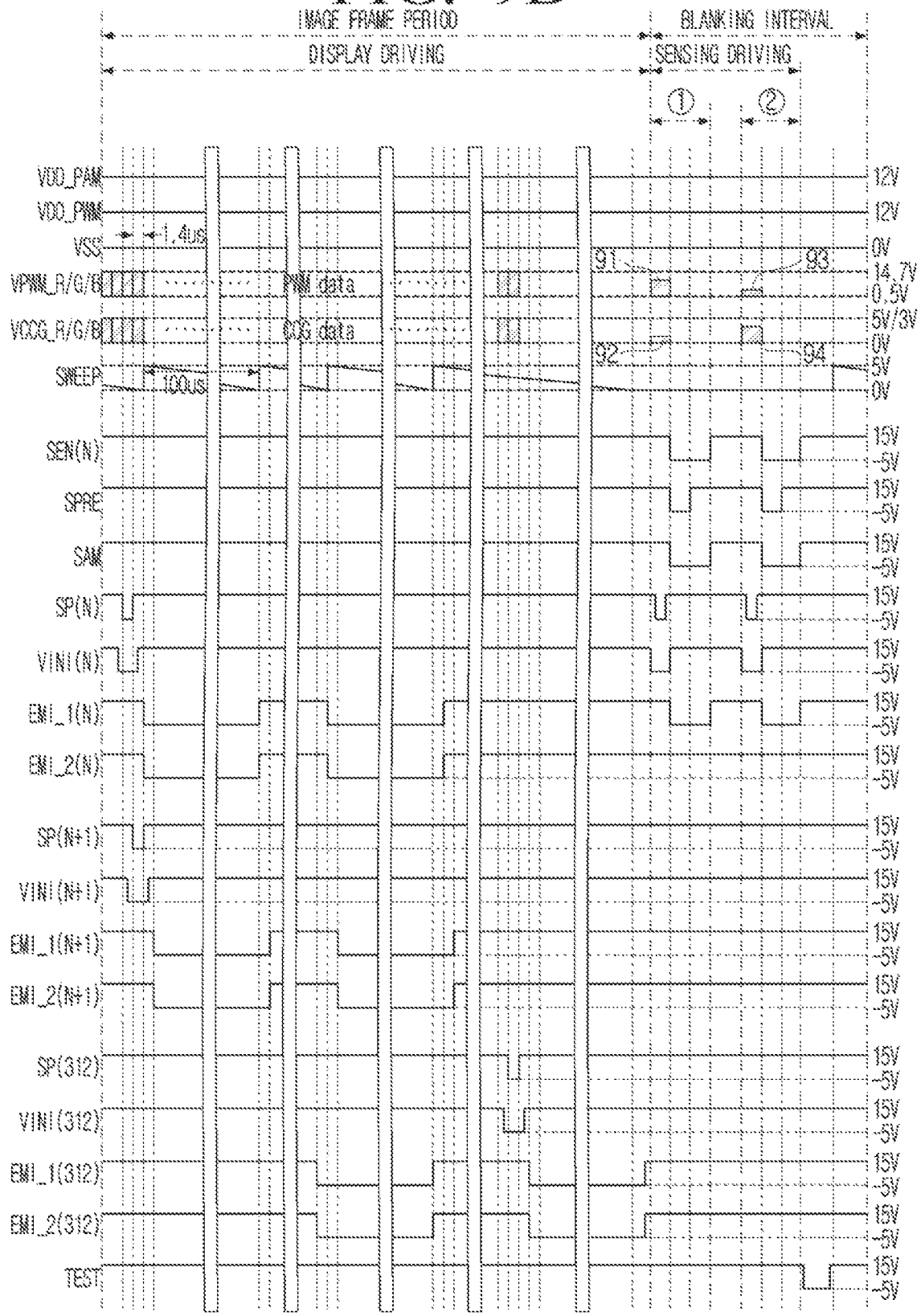
FIG. 9B is a driving timing diagram of the sub-pixel circuit and the sensing unit illustrated in FIG. 9A.

FIG. 9B is a driving timing diagram of the sub-pixel circuit 110 and the sensing unit 200 illustrated in FIG. 9A. For example, FIG. 9B illustrates various kinds of driving signals applied to the sub-pixel circuits 110 of the display panel 100 during one image frame period and a blanking interval. In FIG. 9B, an example wherein the display panel 100 includes 312 row lines is suggested.

Referring to FIG. 9B, VDD_PAM refers to a first driving voltage (e.g., +12[V]), VDD_PWM refers to a second driving voltage (e.g., +12[V]), and VSS refers to a ground voltage (e.g., 0[V]). The first driving voltage (VDD_PAM) and the second driving voltage (VDD_PWM) may be applied from the power IC to the sub-pixel circuits 110 through separate wirings. Accordingly, they do not influence each other. In addition, the first driving voltage (VDD_PAM) and the second driving voltage (VDD_PWM) may be voltages of the same magnitude, but embodiments are not limited thereto.

VPWM_R/G/B refers to a data signal line to which a PWM data voltage and a specific voltage are applied, or a signal applied through the line. For example, in a display driving period, a PWM data voltage (PWM data) may be applied from the data driver to the PWM circuit 112 through VPWM_R/G/B. In a sensing driving period, a specific voltage (specifically, the aforementioned fourth specific voltage 91, second specific voltage 93) may be applied from the data driver to the PWM circuit 112 through VPWM_R/G/B. A voltage applied through a VPWM_R/G/B signal may have, for example, a value between +0.5[V] and +14.7[V] as shown in FIG. 9B, but embodiments are not limited thereto.

In this case, according to an embodiment of the disclosure, PWM data voltages for each of R, G, and B sub-pixels constituting one pixel may be time division multiplexed and applied from the data driver. As such, the time division multiplexed PWM data voltages may be respectively applied to a corresponding sub-pixel through a DeMux circuit.

The sub-pixel circuit 110 illustrated in FIG. 9A illustrates the sub-pixel circuit 110 corresponding to any one sub-pixel (e.g., an R sub-pixel) among R, G, and B sub-pixels. Accordingly, in the sub-pixel circuit 110 of FIG. 9A, only the PWM data voltage (e.g., VPWM_R) for the R sub-pixel among the time division multiplexed PWM data voltages may be selected and applied through a DeMux circuit.

VCCG_R/G/B refers to a data signal line to which a constant current generator data voltage and a specific voltage are applied, or a signal applied through the line. For example, in a display driving period, a constant current generator data voltage (CCG data) may be applied from the data driver to the constant current generator circuit 111 through VCCG_R/G/B. In a sensing driving period, a specific voltage (specifically, the aforementioned third specific voltage 92, first specific voltage 94) may be applied from the data driver to the constant current generator circuit 111 through VCCG_R/G/B. A voltage applied through a VCCG_R/G/B signal may have, for example, a value between 0[V] and +5[V] as shown in FIG. 9B. According to another embodiment, the voltage may have a value between 0[V] and +3[V] as shown in FIG. 9B. However, embodiments are not limited thereto.

In this case, according to an embodiment of the disclosure, a constant current generator data voltage of the same magnitude may be applied to the constant current generator circuits 111 of the display panel 100 for each type of the sub-pixels. Depending on embodiments, the same constant current generator data voltage may be applied to all of the constant current generator circuits 111 regardless of the types of the sub-pixels. Accordingly, the magnitude of the driving current becomes identical for each type of the sub-pixels or all sub-pixels, and thus the problem of wavelength variation of the LED according to the change in the magnitude of the driving current may be solved.

The same constant current generator data voltage is applied to one display panel 100, but it is obvious that constant current generator data voltages of different magnitudes may be applied to different display panels. Accordingly, in case one relatively large display apparatus is constituted as a plurality of display panels are connected, the deviation in the brightness or the deviation in the colors among the display panels may be compensated through adjustment of the constant current generator data voltages.

It has been described that the same constant current generator data voltage is applied to the constant current generator circuits 111 for the convenience of explanation, from the aspect of solving the problem of wavelength variation of the LED and expressing a gray scale of an image. However, as described above, there may be deviations in the threshold voltages and the mobility among the first driving transistors T9, and in the various embodiments of the disclosure, these deviations are compensated through the external compensation method, and accordingly, a constant current generator data voltage of which value was corrected through sensing driving may be applied to the actual constant current generator circuits 111.

Vini(n) refers to a gate signal for applying the second driving voltage (VDD_PWM) to one end (i.e., the A node) of the capacitor C1 and the other end (i.e., the D node) of the capacitor C2. The second driving voltage (VDD_PWM) applied to the A node and the D node becomes a reference potential when an image data voltage or a specific voltage is set to the gate terminal (i.e., the B node) of the second driving transistor T8 and the gate terminal (i.e., the C node) of the first driving transistor T9.

SP(n) refers to a gate signal for applying an image data voltage and a specific voltage to the gate terminal (i.e., the B node) of the second driving transistor T8 and the gate terminal (i.e., the C node) of the first driving transistor T9.

Emi_1(n) refers to a gate signal for applying the first driving voltage (VDD_PAM) to the source terminal and the D node of the second driving transistor T8, and applying a sweep voltage to the A node.

Emi_2(n) refers to a gate signal for turning on the transistor T10 in a light emitting section.

Sen(n) refers to a gate signal for turning on the transistor T12 in a sensing period.

In the above control signals (i.e., gate signals), (n) refers to the $n^{th}$ row line. Accordingly, each of Vini(n), SP(n), Emi_1(n), Emi_2(n), and Sen(n) is applied identically to the sub-pixel circuits 110 included in the $n^{th}$ row line. Accordingly, the display panel 100 may be driven for each row line (or scan line or gate line).

Sweep refers to a sweep signal or a line to which a sweep signal is applied. A sweep signal may be generated in the TCON, and applied identically to all of the sub-pixel circuits 110 of the display panel 100 through the level shifter. For example, to all of the sub-pixel circuits 110 of the display panel 100, the same sweep signal may be applied. In this case, the sweep signal may have a form in which a voltage linearly changing from the first voltage (e.g., +5[V]) to the second voltage (e.g., 0[V]) is continuously repeated.

As described above, a gate signal may be applied separately for each row line from the gate driver to drive the pixels of the pixel array in the units of the row lines. As such, signals applied separately for each row line may be referred to as local signals. On the contrary, a sweep signal is applied identically to all row lines of the display panel, and thus it may be referred to as a global signal distinguished from the aforementioned local signal.

To the A node, a portion of a sweep signal is applied while the transistor T1 is turned on according to a control signal Emi_1(n). As such, a portion of a sweep signal selectively applied to the A node may be the aforementioned sweep voltage.

In this case, the transistors T1 of the display panel 100 are turned on in the order of the row lines according to Emi_1(n), and accordingly, apart from the sweep signal being a global signal applied identically to all of the row lines, the waveform of the sweep voltage applied to the A node of the sub-pixel circuits 110 may vary according to the row lines. A more detailed content in this regard will be described later.

Spre and Sam are control signals related to sensing driving, and operations of the sensing unit 200 according to each control signal will be described later.

Referring to FIG. 9B, it can be known that in the display panel 100, display driving is performed within an image frame period, and sensing driving is performed within a blanking interval.

In a display driving period, the aforementioned data setting section and light emitting section proceed.

As described above, according to an embodiment of the disclosure, for one image frame, one data setting section and a plurality of light emitting sections may proceed for each row line. For this, referring to FIG. 9B, it can be known that during a display driving period, scan signals (SP, Vini) for a data setting operation are applied once for each row line, and emission signals (Emi_1, Emi_2) for a light emitting operation are applied multiple times for each row line.

For example, a time section in which SP, Vini signals of a low level are applied becomes a data setting section of the corresponding row line, and a time section in which Emi signals of a low level are applied becomes a light emitting section of the corresponding row line.

As described above, according to an embodiment of the disclosure, a data setting section and a light emitting section may proceed in the order of the row lines. For this, referring to FIG. 9B, it can be known that each of the gate signals (SP, Vini, Emi_1, Emi_2) is sequentially applied in the order of the row lines.

For example, an SP(n) signal of a low level and an SP(n+1) signal of a low level are applied with a difference as much as 1H time (1.4 μs in the example of FIG. 9B) from each other. This is the same for the remaining gate signals (i.e., Vini(n) and Vini(n+1), Emi_1(n) and Emi_1(n+1), Emi_2(n) and Emi_2(n+1)).

In a sensing driving period, sensing driving for the sub-pixel circuits 110 included in some row lines (the $n^{th}$ row line in the example of FIG. 9B) of the display panel is performed.

Referring to FIG. 9B, a sensing driving period (or a sensing period) may include a PWM circuit sensing period (①) and a constant current generator circuit sensing period (②).

During the PWM circuit sensing period (①), the second current flowing in the second driving transistor T8 and the first driving transistor T9 is transmitted to the sensing unit 200 based on the fourth specific voltage 91 and the third specific voltage 92.

During the constant current generator circuit sensing period (②), the first current flowing in the second driving transistor T8 and the first driving transistor T9 is transmitted to the sensing unit 200 based on the second specific voltage 93 and the first specific voltage 94.

Accordingly, the sensing unit 200 may respectively output the second sensing data and the first sensing data based on the second and first currents.

In this case, according to an embodiment of the disclosure, the sensing driving may be performed within a blanking interval as shown in FIG. 9B. The blanking interval refers to a time interval in which effective image data is not input into the display panel 100.

However, embodiments are not limited thereto. For example, the sensing driving may be performed during a booting period, a power-off period, or a screen-off period, etc. of the display apparatus 1000. Here, the booting period may mean a period after the system power was applied until the screen is turned on, the power-off period may mean a period after the screen was turned off until the system power is released, and the screen-off period may mean a period wherein the system power is being applied, but the screen is turned off.

Even if emission of the inorganic light emitting element 120 ended, the charge may remain in the inorganic light emitting element 120 (specifically, in the junction capacitance of the inorganic light emitting element 120). Due to this, a problem that the inorganic light emitting element 120 slightly emits light even though the light emitting section ended may be caused, and this may particularly become a problem when expressing a low gray scale (e.g., black).

Thus, according to an embodiment of the disclosure, a TEST signal of a low level (e.g., −5[V]) may be applied to the sub-pixel circuits 110 within a blanking interval after the display driving and the sensing driving are completed, as shown in FIG. 9B. In this case, the TEST signal may be a global signal that is applied simultaneously to all of the sub-pixel circuits 110 of the display panel 100. Accordingly, the charges that remained in all of the inorganic light emitting elements 120 of the display panel 100 are completely discharged to the ground voltage (VSS) terminal through the turned-on transistor T11, and the aforementioned problem may be solved.

According to another embodiment, unlike what is shown in FIG. 9B, an example wherein the charges that remained in the inorganic light emitting elements 120 are discharged to the ground voltage (VSS) terminal by immediately applying a local signal TEST(n) of a low level consecutively after the light emitting section of each row line ended may be possible.

Hereinafter, detailed operations of the sub-pixel circuit 110 and the sensing unit 200 in FIG. 9A will be described in detail with reference to FIGS. 10A to 10H.

FIG. 10A is a diagram for illustrating an operation of the sub-pixel circuit 110 in a data setting section in a display driving period.

When a data setting section starts, the transistor T3 and the transistor T4 are turned on according to a Vini(n) signal, and the second driving voltage (VDD_PWM) is applied to the A node through the turned-on transistor T3, and the second driving voltage (VDD_PWM) is applied to the D node through the turned-on transistor T4.

In a state wherein the second driving voltage (VDD_PWM) is applied to the A node and the D node, when the transistor T2 and the transistor T5 are turned on according to an SP(n) signal, a PWM data voltage is applied to the B node through the turned-on transistor T2, and a constant current generator data voltage is applied to the C node through the turned-on transistor T5.

Accordingly, in the data setting section, a PWM data voltage may be set to the gate terminal (i.e., the B node) of the second driving transistor T8, and a constant current generator data voltage may be set to the gate terminal (i.e., the C node) of the first driving transistor T9.

FIG. 10B is a diagram for illustrating an operation of the sub-pixel circuit 110 in a light emitting section in a display driving period.

In a light emitting section, the transistor T1, the transistor T6, and the transistor T7 are turned on according to Emi_1 (n), and the transistor T10 is turned on according to Emi_2 (n).

When the second driving transistor T8 and the first driving transistor T9 are turned on while the transistor T7 and the transistor T10 are turned on, the first driving voltage (VDD_PAM) is applied to the anode terminal of the inorganic light emitting element 120. Accordingly, a potential difference exceeding a forward voltage (Vf) is generated at both ends of the inorganic light emitting element 120, and a driving current (i.e., a constant current) flows through the inorganic light emitting element 120 to make the inorganic light emitting element 120 emit light.

In this case, the first driving transistor T9 is turned on when the first driving voltage (VDD_PAM) is applied to the source terminal. For example, in case the threshold voltage of the first driving transistor T9 is −2.2[V], while a constant current generator data voltage (e.g., +5[V]) is applied to the gate terminal, if the first driving voltage (VDD_PAM) (e.g., +12[V]) is applied to the source terminal, the first driving transistor T9 is turned on. This is because a voltage smaller than the threshold voltage (i.e., −7[V]) is applied between the gate terminal and the source terminal of the first driving transistor T9 which is a PMOS TFT.

The first driving voltage (VDD_PAM) is applied to the source terminal of the first driving transistor T9 as the second driving transistor T8 is turned on, and thus the first driving transistor T9 is turned on together as the second driving transistor T8 is turned on.

As a result, it can be shown that, whether the first driving voltage (VDD_PAM) is to be applied to the anode terminal of the inorganic light emitting element 120 depends on the on/off operations of the second driving transistor T8.

As the second driving transistor T8 is also a PMOS TFT, the second driving transistor T8 is turned on when a voltage smaller than the threshold voltage is applied between the gate terminal and the source terminal. For example, the second driving transistor T8 is turned on when the voltage of the gate terminal is smaller than the sum of the voltage of the source terminal and the threshold voltage. For example, when the first driving voltage (VDD_PAM) applied to the source terminal is +12[V] and the threshold voltage of the second driving transistor T8 is −2.2[V], the second driving transistor T8 is turned on when a voltage smaller than +9.8[V] is applied to the gate terminal.

In this regard, VPWM+Vsweep−VDD_PWM is applied to the gate terminal (the B node) of the second driving transistor T8 during a light emitting section.

Specifically, referring to FIG. 10B, while the second driving voltage (VDD_PWM) is applied to the A node, and the PWM data voltage (VPWM) is applied to the B node, if the transistor T1 is turned on according to an Emi_1(n) signal, a portion of a sweep signal is applied to the A node while the transistor T1 is turned on. In this case, the portion of the sweep signal becomes a sweep voltage (Vsweep).

When the sweep voltage (Vsweep) is applied to the A node, the sweep voltage (Vsweep) is coupled to the B node through the capacitor C1. For example, when the sweep voltage (Vsweep) is applied to the A node, the voltage of the A node changes from VDD_PWM to Vsweep. In this case, the voltage difference between both ends of the capacitor C1 must be constantly maintained, and thus the voltage of the B node changes as much as the voltage variation of the A node (i.e., Vsweep−VDD_PWM). Accordingly, the voltage of the B node becomes VPWM+Vsweep−VDD_PWM.

In this case, the PWM data voltage (VPWM) and the second driving voltage (VDD_PWM) have fixed values, whereas the sweep voltage (Vsweep) has, for example, a value that varies linearly between +5[V] and +0[V].

Accordingly, during a light emitting section, the voltage of the B node changes according to the change of the sweep voltage (Vsweep), and the second driving transistor T8 is turned on in a time period in which the changed voltage (VPWM+Vsweep−VDD_PWM) of the B node (i.e., the gate terminal) becomes lower than the sum of the voltage of the source terminal (i.e., VDD_PAM) and the threshold voltage.

As the change rate of the sweep voltage according to time is constant, the time period in which the second driving transistor T8 is turned on in the light emitting section varies according to the voltage of the B node at the time point when the light emitting section starts. In this case, the voltage of the B node at the time point when the light emitting section starts varies according to the VPWM value (i.e., the PWM data voltage value), and thus a gray scale of an image may be expressed through the PWM data voltage.

The PWM operation of the sub-pixel circuit 110 as above will be described in more detail with reference to FIGS. 11A-11C.

There is a resistance component in the display panel 100. Accordingly, when a driving current flows in a light emitting section, an IR drop occurs, which causes a drop in the driving voltage. Since the driving voltage also becomes a reference value when the constant current generator data voltage is set, the drop of the driving voltage interferes with the accurate setting of the constant current generator data voltage.

For example, in the various embodiments of the disclosure, a data setting section and light emitting sections proceed in the order of row lines as described above, and accordingly, while the sub-pixel circuits of some row lines of the display panel 100 operate in the light emitting section, the sub-pixel circuits of other row lines operate in the data setting section.

Accordingly, when the same driving voltage applied through one wire is applied to the constant current generator circuits 111 of the display panel 100 regardless of the driving period of the display panel 100, the drop of the driving voltage due to the sub-pixel circuits operating in the light emitting section affects the constant current generator data voltage setting operation of the sub-pixel circuits operating in the data setting section.

In order to overcome the problem as above, in the various embodiments of the disclosure, a separate driving voltage applied through separate wiring is applied to the constant current generator circuits 111 in the data setting section and the light emitting section, respectively.

In this regard, referring to FIG. 10B, it can be known that in the light emitting section, the driving voltage applied to the constant current generator circuits 111 is changed from the second driving voltage (VDD_PWM) to the first driving voltage (VDD_PAM).

For example, as described above in FIG. 10A, in the data setting section, the second driving voltage (VDD_PWM) is applied to the other end (i.e., the D node) of the capacitor C2 according to a Vini(n) signal. However, referring to FIG. 10B, it can be known that the first driving voltage (VDD_PAM) is applied to the D node through the transistor T7 and the transistor T6 turned on according to an Emi_1(n) signal.

As described above, in the light emitting section, a voltage drop may occur in the first driving voltage (VDD_PAM) due to the IR drop generated while the driving current flows to the inorganic light emitting element 120. However, even if a voltage drop occurs in the first driving voltage (VDD_PAM), the voltage difference between both ends (i.e., the D node and the C node) of the capacitor C2 is maintained as set in the data setting section, and thus there is no problem.

Therefore, according to the embodiments of the disclosure, in the data setting section, an accurate constant current generator data voltage may be set to the constant current generator circuits 111 regardless of the voltage drop of the first driving voltage (VDD_PAM) by applying the constant current generator data voltage to the C node based on the second driving voltage (VDD_PWM) without a voltage drop, separately from the first driving voltage (VDD_PAM).

In addition, in the light emitting section, the first driving voltage (VDD_PAM) that may have a voltage drop is used, but the constant current generator circuits 111 may operate accurately according to the voltage set in the data setting section, since the voltage difference between both ends of the capacitor C2 is maintained regardless of the voltage drop of the first driving voltage (VDD_PAM), as described above.

Referring to FIG. 10B, in each of the light emitting sections afterwards, an Emi_1(n) signal and an Emi_2(n) signal are respectively applied identically, as described above. Accordingly, in each of the light emitting sections afterwards, the inorganic light emitting elements 120 of the nth row line emit light identically as described above, based on the image data voltage set in the data setting section in FIG. 10A.

FIGS. 10C to 10E are diagrams for illustrating operations of the sub-pixel circuits 110 in a PWM circuit sensing period (①) in a sensing period.

Hereinafter, description will be made by referring to a period in which a specific voltage is set to the gate terminals of the second driving transistor T9 and the first driving transistor T8 in the PWM circuit sensing period (①) as a first setting period, a period in which a first switch 213 is turned on as a first initialization period, and a period in which the first switch 213 is turned off as a first sensing period.

FIG. 10C is a diagram for illustrating an operation of the sub-pixel circuits 110 in the first setting period in the PWM circuit sensing period (①).

In the first setting period, a fourth specific voltage 91 is applied to the data signal line VPWM_R/G/B from a second data driver, and a third specific voltage 92 is applied to the data signal line VCCG_R/G/B from a first data driver.

In this case, the transistor T3 and the transistor T4 are turned on according to a Vini(n) signal. Accordingly, the second driving voltage (VDD_PWM) is applied to the A node through the turned-on transistor T3, and the second driving voltage (VDD_PWM) is applied to the D node through the turned-on transistor T4.

While the second driving voltage (VDD_PWM) is applied to the A node and the D node, if the transistor T2 and the transistor T5 are turned on according to an SP(n) signal, the fourth specific voltage 91 is applied to the B node through the turned-on transistor T2, and the third specific voltage 92 is applied to the C node through the turned-on transistor T5.

Accordingly, in the first setting period, the fourth specific voltage 91 may be set to the gate terminal (i.e., the B node) of the second driving transistor T8, and the third specific voltage 92 may be set to the gate terminal (i.e., the C node) of the first driving transistor T9.

In the first initialization period and the first sensing period, the transistor T12 is turned on according to an Sen(n) signal, and the second current flowing in the second and first driving transistors T8, T9 is transmitted to the sensing unit 200 through the turned-on transistor T12.

In this case, as described above, for the third specific voltage 92 and the fourth specific voltage 91, a voltage value is used, which makes the turn-on resistance value of the first driving transistor T9 have a smaller value than the turn-on resistance value of the second driving transistor T8 to the extent that it can be ignored. Thus, the second current value may be determined based on the fourth specific voltage 91 applied to the gate terminal of the second driving transistor T8.

In the first initialization period and the first sensing period, a sweep signal (Sweep) is applied to the A node according to an Emi_1(n) signal, but the sweep signal maintains 0[V] in a blanking interval, and thus the voltage of the B node is maintained as the fourth specific voltage 91.

The transistor T10 is in a turned-off state according to Emi_2(n), and thus the second current does not flow to the inorganic light emitting elements 120.

FIG. 10D is a diagram for illustrating operations of the sub-pixel circuits 110 and the sensing unit 200 in the first initialization period in the PWM circuit sensing period (①).

In the first initialization period, the first switch 213 is in a turned-on state according to a control signal Spre, and accordingly, a reference voltage (Vpre) input into the non-inversion input terminal (+) of the amp 211 is maintained in the output terminal (Vout) of the amp 211.

FIG. 10E is a diagram for illustrating operations of the sub-pixel circuits 110 and the sensing unit 200 in the first sensing period in the PWM circuit sensing period (①).

In the first sensing period, the first switch 213 is turned off, and thus the amp 211 operates as a current integrator and integrates the second current. In this case, the voltage difference at both ends of the integration capacitor 212 becomes bigger as the sensing time passes, i.e., as the amount of the accumulated charges increases, by the second current introduced into the inversion input terminal (−) of the amp 211 in the first sensing period.

Because of the virtual ground characteristic of the amp 211, the voltage of the inversion input terminal (−) is maintained as the reference voltage (Vpre) regardless of the increase of the voltage difference of the integration capacitor 212 in the first sensing period, and thus the voltage of the output terminal (Vout) of the amp 211 becomes lower correspondingly to the voltage difference at both ends of the integration capacitor 212.

According to such a principle, in the first sensing period, the second current introduced into the sensing unit 200 is accumulated as an integration value Vpsen which is a voltage value through the integration capacitor 212. As the gradient of the voltage drop of the output terminal (Vout) of the amp 211 increases as the second current is bigger, the size of the integration value Vpsen becomes smaller as the second current is bigger.

The integration value Vpsen is input into the ADC 220 while the second switch 214 is maintained in a turned-on state in the first sensing period, and it is converted into the second sensing data at the ADC 220, and is then output to the correction unit 300.

Accordingly, the correction unit 300 may identify a second reference data value corresponding to the fourth specific voltage 91 in the reference data per voltage stored in the memory, compare the identified reference data value and the second sensing data value output from the sensing unit 200, and calculate or acquire a second compensation value for correcting the PWM data voltage.

In addition, the correction unit 300 may store or update the acquired second compensation value in the memory. Afterwards, when the display driving is performed, the correction unit 300 may correct the PWM data voltage to be applied to the sub-pixel circuits 110 based on the second compensation value.

FIGS. 10F to 10H are diagrams for illustrating operations of the sub-pixel circuits 110 in a constant current generator circuit sensing period (②) in a sensing period.

Hereinafter, description will be made by referring to a period in which a specific voltage is set to the gate terminals of the second driving transistor T9 and the first driving transistor T8 in the constant current generator circuit sensing period (②) as a second setting period, a period in which the first switch 213 is turned on as a second initialization period, and a period in which the first switch 213 is turned off as a second sensing period.

FIG. 10F is a diagram for illustrating an operation of the sub-pixel circuits 110 in the second setting period in the constant current generator circuit sensing period (②).

In the second setting period, a second specific voltage 93 is applied to the data signal line VPWM_R/G/B from the second data driver, and a first specific voltage 94 is applied to the data signal line VCCG_R/G/B from the first data driver.

In this case, the transistor T3 and the transistor T4 are turned on according to a Vini(n) signal. Accordingly, the second driving voltage (VDD_PWM) is applied to the A node through the turned-on transistor T3, and the second driving voltage (VDD_PWM) is applied to the D node through the turned-on transistor T4.

While the second driving voltage (VDD_PWM) is applied to the A node and the D node, if the transistor T2 and the transistor T5 are turned on according to an SP(n) signal, the second specific voltage 93 is applied to the B node through the turned-on transistor T2, and the first specific voltage 94 is applied to the C node through the turned-on transistor T5.

Accordingly, in the second setting period, the second specific voltage 93 may be set to the gate terminal (i.e., the B node) of the second driving transistor T8, and the first specific voltage 94 may be set to the gate terminal (i.e., the C node) of the first driving transistor T9.

In the second initialization period and the second sensing period, the transistor T12 is turned on according to an Sen(n) signal, and the first current flowing in the second and first driving transistors T8, T9 is transmitted to the sensing unit 200 through the turned-on transistor T12.

In this case, as described above, for the first specific voltage 94 and the second specific voltage 93, a voltage value is used, which makes the turn-on resistance value of the second driving transistor T8 have a smaller value than the turn-on resistance value of the first driving transistor T9 to the extent that it can be ignored. Thus, the first current value may be determined based on the first specific voltage 94 applied to the gate terminal of the first driving transistor T9.

In the second initialization period and the second sensing period, a sweep signal (Sweep) is applied to the A node according to an Emi_1(n) signal, but the sweep signal maintains 0[V] in a blanking interval, and thus the voltage of the B node is maintained as the second specific voltage 93.

The transistor T10 is in a turned-off state according to Emi_2(n), and thus the first current does not flow to the inorganic light emitting elements 120.

FIG. 10G is a diagram for illustrating operations of the sub-pixel circuits 110 and the sensing unit 200 in the second initialization period in the constant current generator circuit sensing period (②).

In the second sensing period, the first switch 213 is in a turned-on state according to a control signal Spre, and accordingly, a reference voltage (Vpre) input into the non-inversion input terminal (+) of the amp 211 is maintained in the output terminal (Vout) of the amp 211.

FIG. 10H is a diagram for illustrating operations of the sub-pixel circuits 110 and the sensing unit 200 in the second sensing period.

In the second sensing period, the first switch 213 is turned off, and thus the amp 211 operates as a current integrator and integrates the first current. In this case, the voltage difference at both ends of the integration capacitor 212 becomes bigger as the sensing time passes, i.e., as the amount of the accumulated charges increases, by the first current introduced into the inversion input terminal (−) of the amp 211 in the second sensing period.

Because of the virtual ground characteristic of the amp 211, the voltage of the inversion input terminal (−) is maintained as the reference voltage (Vpre) regardless of the increase of the voltage difference of the integration capacitor 212 in the second sensing period, and thus the voltage of the output terminal (Vout) of the amp 211 becomes lower correspondingly to the voltage difference at both ends of the integration capacitor 212.

According to such a principle, in the second sensing period, the first current introduced into the sensing unit 200 is accumulated as an integration value Vcsen which is a voltage value through the integration capacitor 212. As the gradient of the voltage drop of the output terminal (Vout) of the amp 211 increases as the first current increases, the size of the integration value Vcsen decreases as the first current increases.

The integration value Vcsen is input into the ADC 220 while the second switch 214 is maintained in a turned-on state in the second sensing period, and it is converted into the first sensing data at the ADC 220, and is then output to the correction unit 300.

Accordingly, the correction unit 300 may identify a first reference data value corresponding to the first specific voltage 94 in the reference data per voltage stored in the memory, compare the identified reference data value and the first sensing data value output from the sensing unit 200, and calculate or acquire a first compensation value for correcting the constant current generator data voltage.

In addition, the correction unit 300 may store or update the acquired first compensation value in the memory. Afterwards, when the display driving is performed, the correction unit 300 may correct the constant current generator data voltage to be applied to the sub-pixel circuits 110 based on the first compensation value.

In the various embodiments of the disclosure, the aforementioned sensing driving may be performed for some row lines of the display panel 100 per image frame. For example, for one image frame, the aforementioned display driving is performed sequentially for the entire row lines of the display panel 100 in the order of the row lines, but on the contrary, the sensing driving may be performed for some row lines of the display panel 100.

For example, according to an embodiment of the disclosure, the aforementioned sensing driving may be performed for one row line per image frame. Here, the one row line for which the sensing driving will be performed may be determined randomly so that it does not overlap while the driving for continuous image frames in a number corresponding to the number of the entire row lines proceeds. In this case, when the sensing driving for the continuous image frames in the number corresponding to the number of the entire row lines is completed, the sensing driving for the entire row lines is completed.

For example, in case the number of the entire row lines of the display panel 100 is 312, when the display driving and the sensing driving for the 312 continuous image frames are completed, the sensing driving for the entire 312 row lines is completed.

In addition, according to another embodiment of the disclosure, the aforementioned sensing driving may be performed for a plurality of row lines per image frame. In this case, the plurality of row lines for which the sensing driving will be performed may be determined randomly so that they do not overlap.

For example, in case the number of the entire row lines of the display panel 100 is 312, and sensing driving is performed for three row lines per image frame, three row lines for which the sensing driving will be performed may be determined for each image frame, so that the sensing driving for the entire 312 row lines is completed when the display driving and the sensing driving for 104 continuous image frames are completed.

According to another embodiment of the disclosure, sensing driving may be performed sequentially in the order of row lines, unlike what is described above.

For example, in case the display panel 100 consists of 312 row lines, and sensing driving for one row line is performed per image frame, the sub-pixel circuits of the first row line may be sensing-driven after the first image frame is displayed, and the sub-pixel circuits included in the second row line may be sensing-driven after the second image frame is displayed. In such a manner, the sub-pixel circuits of the $312^{th}$ row line may be sensing-driven after the $312^{th}$ image frame is displayed, and accordingly, the sensing driving of the sub-pixel circuits included in the entire row lines included in the display panel 100 may be completed once.

In case the display panel 100 consists of 312 row lines, and sensing driving for three row lines is performed per image frame, the sub-pixel circuits of the first to third row lines may be sensing-driven after the first image frame is displayed, and the sub-pixel circuits included in the fourth to sixth row lines may be sensing-driven after the second image frame is displayed. In such a manner, the sub-pixel circuits of the $310^{th}$ to $312^{th}$ row lines may be sensing-driven after the $104^{th}$ image frame is displayed, and accordingly, the sensing driving of the sub-pixel circuits included in the entire row lines included in the display panel 100 may be completed once.

In the above description, an example wherein sensing driving proceeds in the order of the PWM circuit sensing period (①) and the constant current generator circuit sensing period (②) was suggested. However, embodiments are not limited thereto, and it is obvious that, depending on embodiments, the constant current generator circuit sensing period (②) may proceed first, and the PWM circuit sensing period (①) may proceed afterwards.

In addition, in the above description, an example wherein sensing driving proceeds after display driving was suggested. However, embodiments are not limited thereto, and the sensing driving may proceed first, and display driving may proceed afterwards depending on embodiments.

Figure 11A:
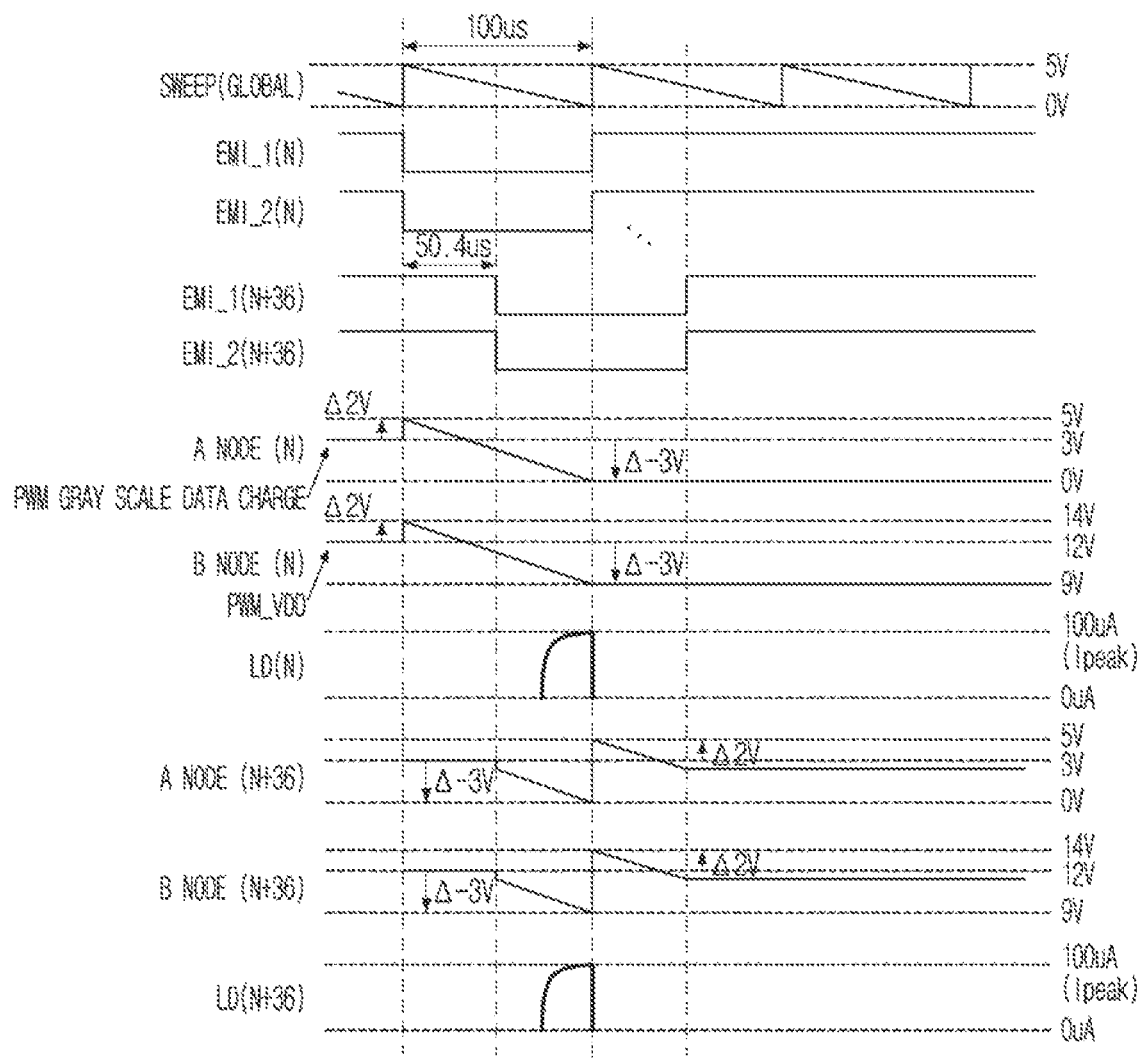
FIG. 11A is a diagram for illustrating a PWM operation of a sub-pixel circuit according to an embodiment of the disclosure in case a PWM data voltage belonging to a low gray scale is applied.
Figure 11B:
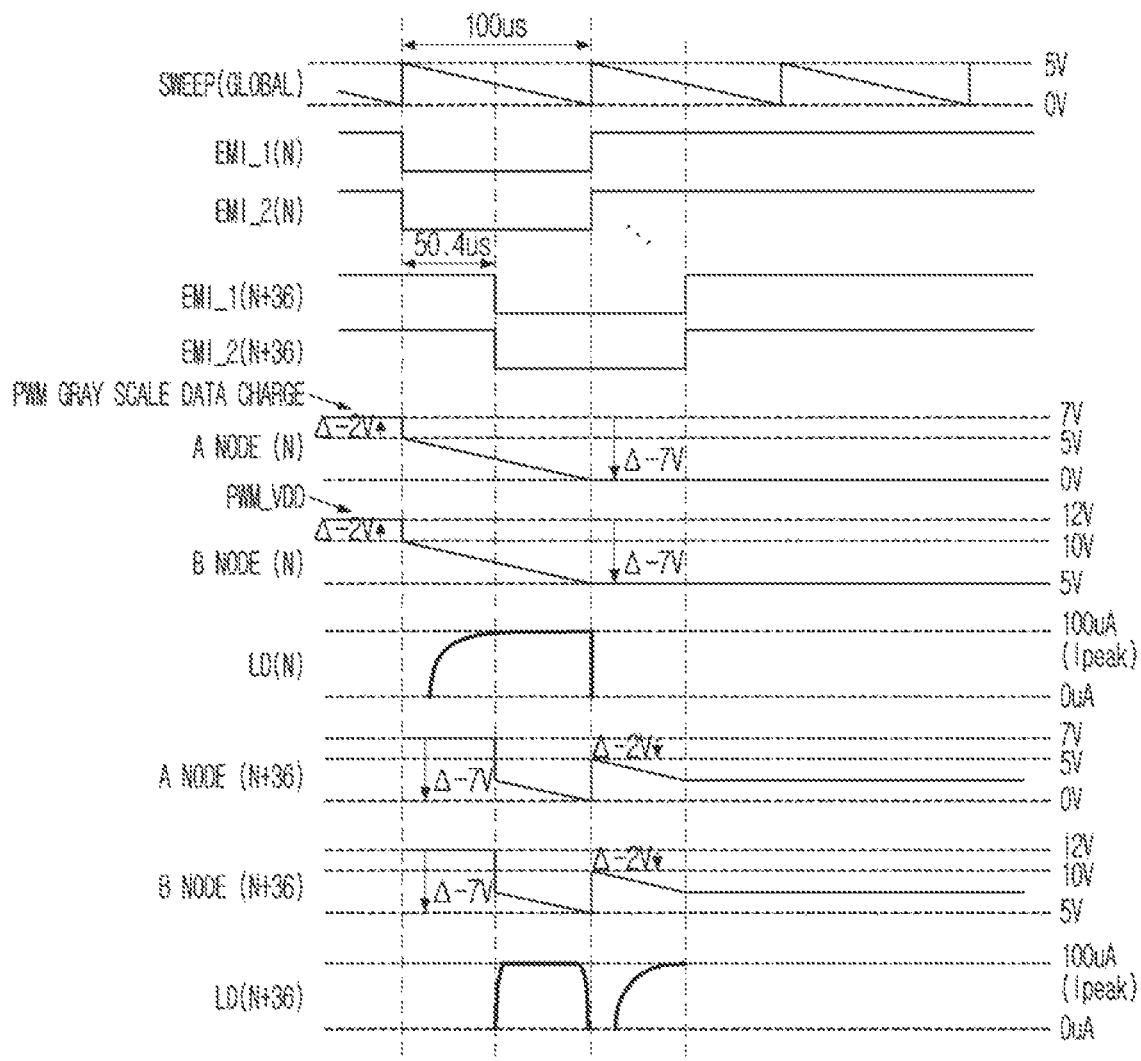
FIG. 11B is a diagram for illustrating a PWM operation of a sub-pixel circuit according to an embodiment of the disclosure in case a PWM data voltage belonging to a medium gray scale is applied.
Figure 11C:
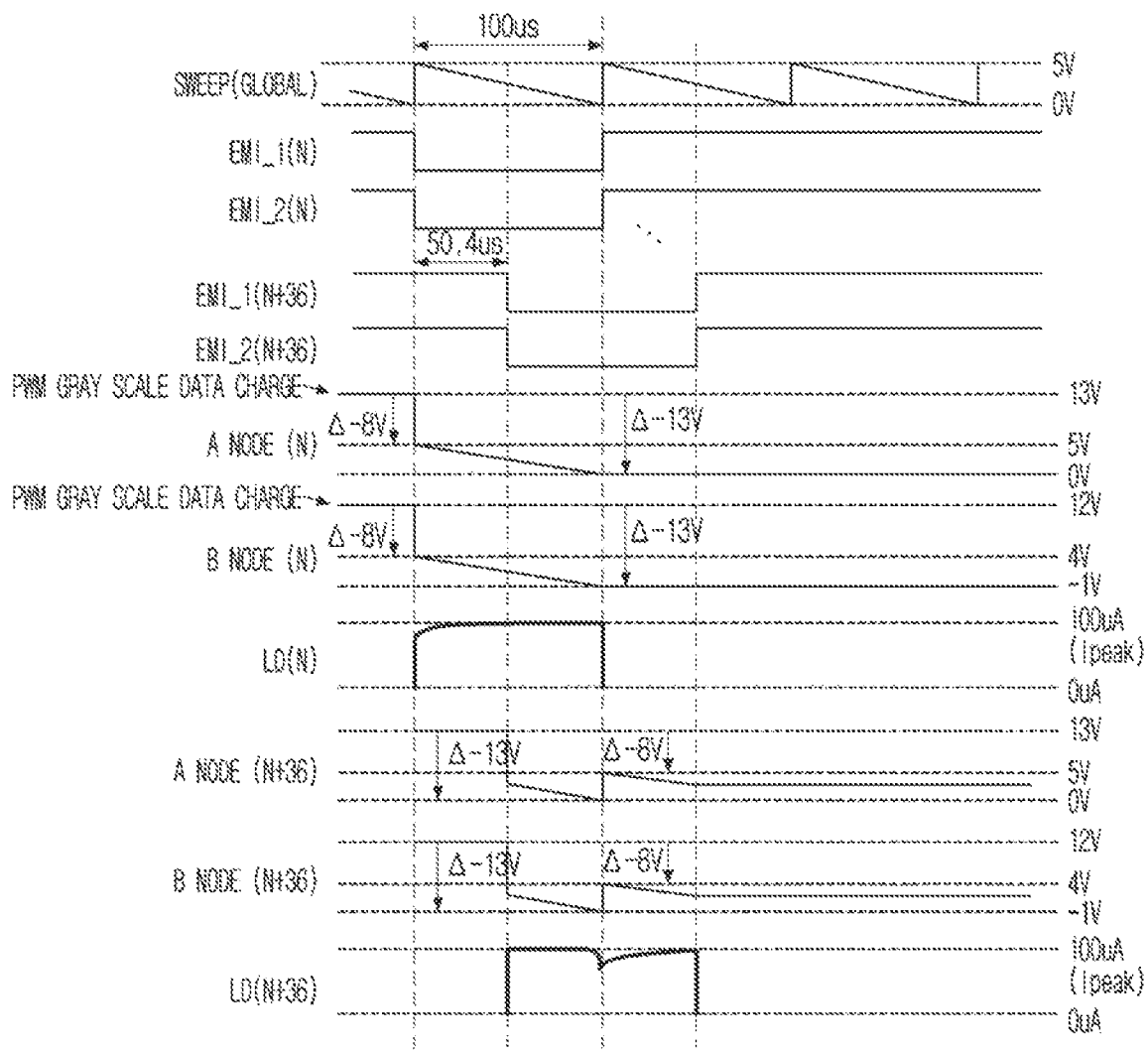
FIG. 11C is a diagram for illustrating a PWM operation of a sub-pixel circuit according to an embodiment of the disclosure in case a PWM data voltage belonging to a high gray scale is applied.

FIGS. 11A to 11C are diagrams for illustrating a PWM operation of a sub-pixel circuit having the configuration shown in FIG. 9A. In FIGS. 11A to 11C, an example wherein a PWM data voltage belonging to a low gray scale is +3[V], a PWM data voltage belonging to a medium gray level is +7 [V], and a PWM data voltage belonging to a high gray level is +13[V] is suggested, but the PWM data voltage belonging to each gray scale is obviously not limited thereto.

FIGS. 11A to 11C show the voltage change at the A node, the voltage change at the B node, and the change of the driving current Id in case a PWM data voltage is applied to the sub-pixel circuits 110 included in the $n^{th}$ row line and the $(n+36)^{th}$ row line, respectively.

In the embodiments shown in FIGS. 11A to 11C, an example wherein the threshold voltage of the second driving transistor is −2.2[V], and the first driving current (VDD_PAM) and the second driving current (VDD_PWM) are +12[V] is suggested. In addition, an example of a sweep signal (Sweep(global)) having a shape in which a voltage linearly changing from +5 [V] to 0[V] during 100 μs is continuously repeated is suggested. Here, (global) is an expression which emphasizes that the sweep signal is a global signal that is commonly applied to all row lines.

FIG. 11A illustrates a case wherein a PWM data voltage corresponding to a low gray scale (e.g., +3[V]) is applied to the sub-pixel circuits 110 included in the $n^{th}$ row line and the $(n+36)^{th}$ row line, respectively.

First, an operation of the sub-pixel circuit 110 included in the $n^{th}$ row line will be described.

During a data setting section, +3[V] (i.e., the PWM data voltage) is applied to the A node(n) of the sub-pixel circuit 110 included in the $n^{th}$ row line according to an SP(n) signal, and +12[V] (i.e., the second driving voltage (VDD_PWM)) is applied to the B node(n) according to a Vini(n) signal.

After the data setting section, when a light emitting section starts, a portion of a sweep signal (Sweep(Global)), i.e., a sweep voltage (i.e., a voltage that linearly changes from +5[V] to 0[V]) is applied to the A node(n) according to an Emi_1($n$) signal as illustrated.

Since the voltage variation of the A node(n) according to the sweep voltage is coupled to the B node(n) as it is through the capacitor C1, the voltage of the B node(n) changes from +14[V] to +9[V] while the voltage of the A node(n) changes from +5[V] to 0[V].

In this case, the second driving transistor T8 is turned on in a time period in which the voltage of the gate terminal (the B node) becomes lower than the sum of the voltage of the source terminal (VDD_PAM, i.e., +12[V]) and the threshold voltage (i.e., −2.2[V]), as described above.

For example, the second driving transistor T8 is turned on in a time period in which the voltage of the B node(n) is lower than +9.8[V] (i.e., a time period in which the voltage of the B node(n) changes from +9.8[V] to +9[V]), and a driving current flows in the inorganic light emitting elements 120 in the time period in which the second driving transistor T8 is turned on. The Id (n) shows a change in the driving current.

Next, an operation of the sub-pixel circuit 110 included in the $(n+36)^{th}$ row line will be described.

During a data setting section, +3[V] (i.e., the PWM data voltage) is applied to the A node(n+36) of the sub-pixel circuit 110 included in the $(n+36)^{th}$ row line according to an SP(n+36) signal, and +12[V] (i.e., the second driving voltage (VDD_PWM)) is applied to the B node(n+36) according to a Vini(n+36) signal.

After the data setting section, when a light emitting section starts, a portion of a sweep signal (Sweep(Global)), i.e., a sweep voltage (i.e., a voltage that linearly changes from +2.5[V] to 0[V], and from +5[V] to +2.5[V]) is applied to the A node(n+36) according to an Emi_1($n$+36) signal as illustrated.

For example, as described above, in the various embodiments of the disclosure, a light emitting section sequentially proceeds in the order of row lines. Thus, if a light emitting section sequentially proceeds at an interval of 1H time (e.g., 1.4 μs), an Emi_1($n$+36) signal has the same waveform as a waveform in case an Emi_1($n$) signal is delayed by 50.4 μs, as illustrated.

Accordingly, the sweep voltage applied to the A node(n+36) of the sub-pixel circuit 110 included in the $(n+36)^{th}$ row line may have a waveform that linearly changes from +2.5[V] to 0[V], and then linearly changes from +5[V] to +2.5[V] again, as illustrated.

For example, it can be known that all sweep voltages sweep once between +5 [V] and 0[V], but a start voltage that starts to sweep may vary according to row lines.

The voltage variation of the A node(n+36) according to the sweep voltage is coupled to the B node(n+36) as it is through the capacitor C1, and thus the voltage of the B node(n+36) changes from +11.5[V] to +9[V] while the voltage of the A node(n+36) changes from +2.5[V] to 0[V], and while the voltage of the A node(n+36) changes from +5[V] to +2.5[V], the voltage of the B node(n+36) changes from +14[V] to +11.5[V].

In this case, as described above, the second driving transistor T8 is turned on in a time period in which the voltage of the B node(n+36) is lower than +9.8[V] (i.e., a time period in which the voltage of the B node(n+36) varies from +9.8[V] to +9[V]), and a driving current flows in the inorganic light emitting elements 120 in the time period in which the second driving transistor T8 is turned on. The Id (n+36) shows a change in the driving current.

FIG. 11B illustrates a case wherein a PWM data voltage belonging to a medium gray scale (e.g., +7[V]) is applied to the sub-pixel circuits 110 included in the n$^{th}$ row line and the (n+36)$^{th}$ row line, respectively.

First, an operation of the sub-pixel circuit 110 included in the n$^{th}$ row line will be described.

During a data setting section, +7[V] (i.e., the PWM data voltage) is applied to the A node(n) of the sub-pixel circuit 110 included in the n$^{th}$ row line according to an SP(n) signal, and +12[V] (i.e., the second driving voltage (VDD_PWM)) is applied to the B node(n) according to a Vini(n) signal.

After the data setting section, when a light emitting section starts, a portion of a sweep signal (Sweep(Global)), i.e., a sweep voltage (i.e., a voltage that linearly changes from +5[V] to 0[V]) is applied to the A node(n) according to an Emi_1(*n*) signal as illustrated.

Since the voltage variation of the A node(n) according to the sweep voltage is coupled to the B node(n) as it is through the capacitor C1, the voltage of the B node(n) changes from +10[V] to +5[V] while the voltage of the A node(n) changes from +5[V] to 0[V].

In this case, the second driving transistor T8 is turned on in a time period in which the voltage of the B node(n) is lower than +9.8[V] (i.e., a time period in which the voltage of the B node(n) changes from +9.8[V] to +5[V]), and a driving current flows in the inorganic light emitting elements 120 in the time period in which the second driving transistor T8 is turned on. The Id (n) shows this.

Next, an operation of the sub-pixel circuit 110 included in the (n+36)$^{th}$ row line will be described.

During a data setting section, +7[V] is applied to the A node(n+36) of the sub-pixel circuit 110 included in the (n+36)$^{th}$ row line according to an SP(n+36) signal, and +12[V] is applied to the B node(n+36) according to a Vini(n+36) signal.

After the data setting section, when a light emitting section starts, a portion of a sweep signal (Sweep(Global)), i.e., a sweep voltage (i.e., a voltage that linearly changes from +2.5[V] to 0[V], and from +5[V] to +2.5[V]) is applied to the A node(n+36) according to an Emi_1(*n*+36) signal as illustrated.

Since the voltage variation of the A node(n+36) according to the sweep voltage is coupled to the B node(n+36) as it is through the capacitor C1, the voltage of the B node(n+36) changes from +7.5[V] to +5[V] while the voltage of the A node(n+36) changes from +2.5[V] to 0[V], and while the voltage of the A node(n+36) changes from +5[V] to +2.5[V], the voltage of the B node(n+36) changes from +10[V] to +7.5[V].

In this case, as described above, the second driving transistor T8 is turned on in a time period in which the voltage of the B node(n+36) is lower than +9.8[V] (i.e., a time period in which the voltage of the B node(n+36) varies from +7.5[V] to +5[V] and a time period in which the voltage varies from +9.8[V] to +7.5[V]), and a driving current flows in the inorganic light emitting elements 120 in the time period in which the second driving transistor T8 is turned on. The Id (n+36) shows this.

Referring to FIG. 11B, it can be known that the waveforms of the Id(n) and the Id(n+36) are different for the same PWM data voltage (+7[V]). However, since the integration value of the driving current, that is, the brightness of the inorganic light emitting elements 120, is the same, it is not problematic.

FIG. 11C illustrates a case wherein a PWM data voltage belonging to a high gray scale (e.g., +13[V]) is applied to the sub-pixel circuits 110 included in the n$^{th}$ row line and the (n+36)$^{th}$ row line, respectively.

First, an operation of the sub-pixel circuit 110 included in the n$^{th}$ row line will be described.

During a data setting section, +13[V] (i.e., the PWM data voltage) is applied to the A node(n) of the sub-pixel circuit 110 included in the n$^{th}$ row line according to an SP(n) signal, and +12[V] is applied to the B node(n) according to a Vini(n) signal.

After the data setting section, when a light emitting section starts, a portion of a sweep signal (Sweep(Global)), i.e., a sweep voltage (i.e., a voltage that linearly changes from +5[V] to 0[V]) is applied to the A node(n) according to an Emi_1(*n*) signal as illustrated.

Since the voltage variation of the A node(n) according to the sweep voltage is coupled to the B node(n) as it is through the capacitor C1, the voltage of the B node(n) changes from +4[V] to −1[V] while the voltage of the A node(n) changes from +5[V] to 0[V].

In this case, the second driving transistor T8 is turned on in a time period in which the voltage of the B node(n) is lower than +9.8[V] (i.e., a time period in which the voltage of the B node(n) changes from +4[V] to −1[V]), and a driving current flows in the inorganic light emitting elements 120 in the time period in which the second driving transistor T8 is turned on. The Id (n) shows this.

Next, an operation of the sub-pixel circuit 110 included in the (n+36)$^{th}$ row line will be described.

During a data setting section, +13[V] (i.e., the PWM data voltage) is applied to the A node(n+36) of the sub-pixel circuit 110 included in the (n+36)$^{th}$ row line according to an SP(n+36) signal, and +12[V] is applied to the B node(n+36) according to a Vini(n+36) signal.

After the data setting section, when a light emitting section starts, a portion of a sweep signal (Sweep(Global)), i.e., a sweep voltage (i.e., a voltage that linearly changes from +2.5[V] to 0[V], and from +5[V] to +2.5[V]) is applied to the A node(n+36) according to an Emi_1(*n*+36) signal as illustrated.

Since the voltage variation of the A node(n+36) according to the sweep voltage is coupled to the B node(n+36) as it is through the capacitor C1, the voltage of the B node(n+36) changes from +1.5[V] to −1[V] while the voltage of the A node(n+36) changes from +2.5[V] to 0[V], and while the voltage of the A node(n+36) changes from +5[V] to +2.5[V], the voltage of the B node(n+36) changes from +4[V] to +1.5[V].

In this case, as described above, the second driving transistor T8 is turned on in a time period in which the voltage of the B node(n+36) is lower than +9.8[V] (i.e., a time period in which the voltage of the B node(n+36) varies from +1.5[V] to −1[V] and a time period in which the voltage varies from +4[V] to +1.5[V]), and a driving current flows in the inorganic light emitting elements 120 in the time period in which the second driving transistor T8 is turned on. The Id (n+36) shows this.

Referring to FIG. 11C, it can be known that the waveforms of the Id(n) and the Id(n+36) are different for the same PWM data voltage (+13[V]). However, since the integration value of the driving current, that is, the brightness of the inorganic light emitting elements 120, is the same, it is not problematic.

Figure 12:
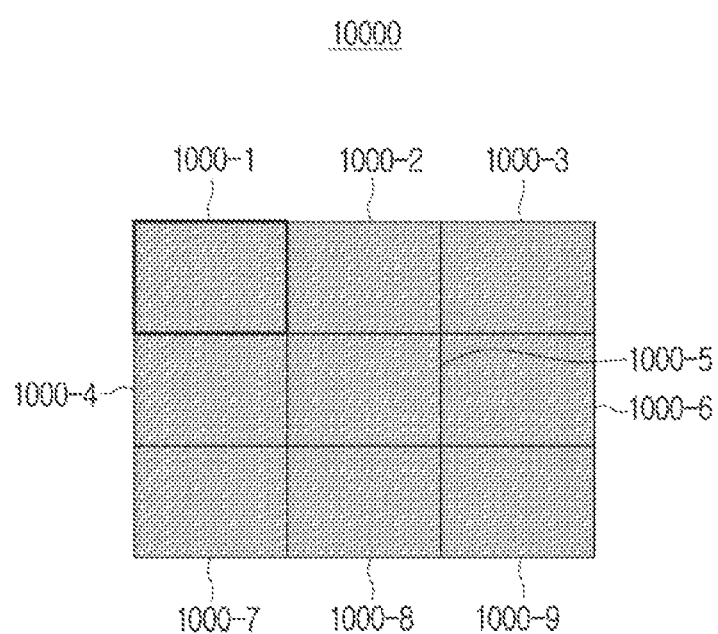
FIG. 12 is a diagram for schematically illustrating a configuration of a display apparatus according to an embodiment of the disclosure.

FIG. 12 is a diagram for schematically illustrating a configuration of a display apparatus according to an embodiment of the disclosure. According to FIG. 12, a display apparatus 10000 may include nine display modules 1000-1 to 1000-9. In this case, each of the display modules 1000-1 to 1000-9 may include the display panel 100, the sensing unit 200, and at least some of the various kinds of components which may be included in the driver 500 of the aforementioned display apparatus 1000.

The display apparatus 10000 may include the aforementioned correction unit 300 and TCON 400. In this case, as described above, the correction unit 300 may be one function module included in the TCON 400, or it may be included in the display apparatus 10000 as a separate component.

The display modules 1000-1 to 1000-9 may be assembled or arranged in a matrix form, as illustrated, to constitute one modular display panel. FIG. 12 illustrates an example wherein the display apparatus 10000 includes nine display modules, but embodiments are not limited thereto, and a display apparatus having any different sizes or different resolutions may be implemented by combining display modules in different numbers.

The configuration and the driving method of each of the display modules 1000-1 to 1000-9 may be as described above with reference to FIGS. 4 to 11C. In particular, according to what is described above, each of the display modules 1000-1 to 1000-9 may be driven by a progressive driving method.

For example, when displaying an image frame on a modular display panel, each of the display modules 1000-1 to 1000-9 may be driven by the driving method as shown in FIG. 5A, and may also be driven as shown in FIG. 5B.

In the case of the display module driving method as shown in FIG. 5A, since the data setting section for one image frame proceeds during one image frame period, the data setting section of each display module should simultaneously proceed together when one image frame is displayed on the modular display panel.

The driving method of the modular display panel in which the data setting section of each display module constituting the modular display panel simultaneously proceeds, as described above, may be referred to as "a simultaneous scan method".

In the case of the display module driving method as shown in FIG. 5B, the data setting section for one image frame proceeds for a much shorter time than one image frame period, and accordingly, when displaying one image frame on the modular display panel, the data setting section of each display module may continuously proceed following the progression order of the data setting section of the display module disposed adjacently above or below the corresponding display module.

The driving method of the modular display panel in which the data setting section of each display module constituting the modular display panel continuously proceeds following the progression order of the data setting section of the display module disposed adjacently above or below the corresponding display module, as described above, may be referred to as "a high speed continuous scan method". Here, "high speed" may indicate that a data setting section proceeds at a high speed compared to the driving method of the display module shown in FIG. 5A.

Figure 13A:
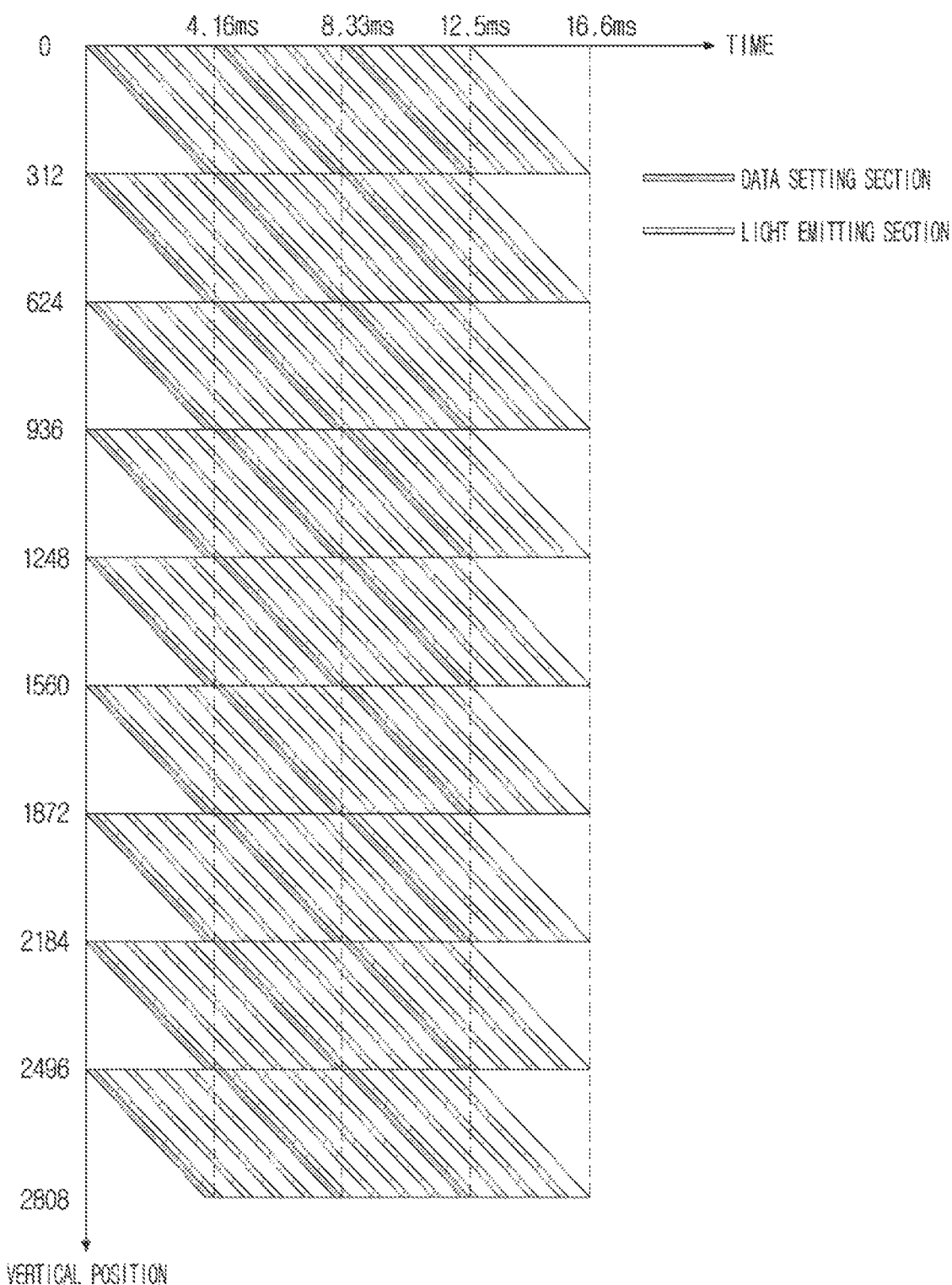
FIG. 13A is a diagram illustrating a manner in which a data setting section and a light emitting section proceed when a modular display panel is driven by a simultaneous scan method.
Figure 13B:
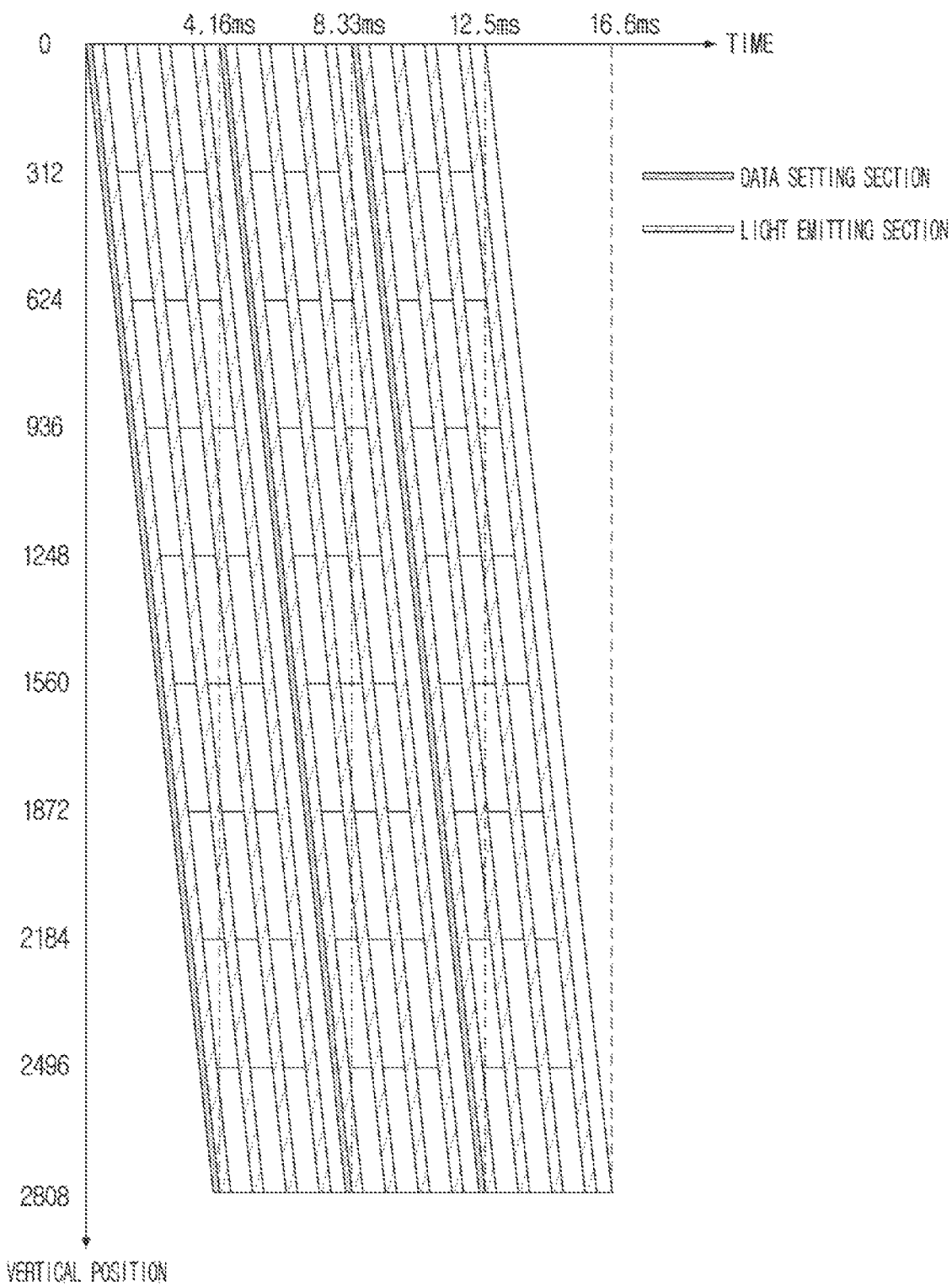
FIG. 13B is a diagram illustrating a manner in which a data setting section and a light emitting section proceed when a modular display panel is driven by a high speed continuous scan mode.

FIGS. 13A and 13B illustrate manners in which a data setting section and a light emitting section proceed when a modular display panel is driven by a simultaneous scan method and a high speed continuous scan method, respectively.

In FIGS. 13A and 13B, an example wherein nine display modules included in the same column line in a module display panel in which 81 display modules are arranged in a 9*9 matrix form display three consecutive image frames during four image frame periods is suggested. In addition, in FIGS. 13A and 13B, an example wherein, for one image frame, one data setting section and four light emitting sections proceed for each row line is suggested. Further, in FIGS. 13A and 13B, an example wherein the size of each display module constituting the modular display panel is 12.7 inches, the resolution is 550*312, and the scan rate is 240 Hz is suggested.

Since the resolution of each display module is 550*312, each display module includes 312 row lines. Accordingly, the 9*9 modular display panel includes 2808 row lines, and the vertical position axes in FIGS. 13A and 13B represent the same. The scan rate of each display module is 240 Hz, and thus one image frame time is about 4.16 ms. Accordingly, referring to the time axes in FIGS. 13A and 13B, it can be known that the driving method of the display modules during four image frame periods is illustrated.

Here, in the case of the simultaneous scan method, the data setting section of each display module proceeds simultaneously, as described above. Referring to FIG. 13A, with respect to one image frame, the data setting section for the first row line of each of the nine display modules proceeds simultaneously, and the data setting section for the second row line of each of the nine display modules proceeds simultaneously, and it can be known that, in such a manner, the data setting section proceeds simultaneously up to the $312^{th}$ row line of each of the nine display modules.

A light emitting section proceeds in a predefined method after a data setting section proceeds (that is, as described above, the first light emitting section among the plurality of light emitting sections is temporally continuous with a data setting section, and each of the light emitting sections proceeds at a predetermined time interval with each other), and thus each light emitting section of each display module also simultaneously proceeds in the simultaneous scan method.

In the case of driving the modular display panel by the simultaneous scan method as described above, the light emitting section discontinuously proceeds at the boundary of the upper and lower display modules adjacent to each other, for the same image frame.

For example, referring to FIG. 13A, when the display modules from the display module disposed uppermost to the display module disposed lowermost are referred to as the first to ninth display modules, it can be known that, in the case of the $313^{th}$ row line (the first row line of the second display module), for example, four light emitting sections proceed for the first image frame during a time from 0 to 4.16 ms, but in the case of the $312^{th}$ row line (the last row line of the first display module), a light emitting section does not proceed even once for the first image frame during the same time. In the case of the $312^{th}$ low line, four light emitting sections may proceed for the first image frame during a time from 4.16 ms to 8.33 ms, but in the case of the $313^{th}$ row line, four light emitting sections may proceed for the second image frame during the same time.

Accordingly, when a moving object (e.g., a vertical line moving left or right) is displayed on the modular display panel by the simultaneous scan method, distortion of the image may be viewed at the boundary of the adjacent upper and lower display modules.

In this case, in the case of a still image being displayed, since the same image frame is repeated, distortion is not visible at the boundary of the upper and lower modules. In the case of the left and right display modules adjacent to each other (e.g., nine display modules included in the same row line in the 9*9 modular display panel), the light emitting section of the same row line of each display module proceeds at the same time, and thus the aforementioned distortion phenomenon is not generated even if a moving object is displayed.

In the case of the high speed continuous scan method, a data setting section may proceed for a time that is much shorter than one frame time in each display module, as described above. Therefore, according to an embodiment of the disclosure, by using the high speed continuous scan method, a modular display panel may be driven such that during one frame time, data setting sections sequentially proceed in a continuous manner from the first row line of the display module disposed uppermost to the last row line of the display module disposed lowermost.

For example, when the display modules from the display module disposed uppermost to the display module disposed lowermost, among the display modules included in the same column line of the 9*9 modular display panel, are referred to as the first to ninth display modules, as illustrated in FIG. 13B, the data setting section may proceed continuously from the first row line (the first row line of the first display module) to the $2808^{th}$ row line (the last row line of the ninth display module) for one frame time.

A light emitting section proceeds in a predefined method after a data setting section proceeds (as described above, the first light emitting section among the plurality of light emitting sections is temporally continuous with a data setting section, and each of the light emitting sections proceeds at a predetermined time interval with each other), and thus each light emitting section of each display module may also proceed continuously from the first row line to the $2808^{th}$ row line.

In the case of driving the modular display panel in the high speed continuous scan method as described above, unlike in the simultaneous scan method, the light emitting section may continuously proceed even at the boundary between the upper and lower display modules adjacent to each other. Accordingly, even when a moving object (e.g., a vertical line moving left or right) is displayed on the modular display panel, distortion of the image does not occur at the boundary between the upper and lower display modules adjacent to each other.

Hereinafter, a method of driving a modular display panel according to an embodiment of the disclosure will be described with reference to FIGS. 14 to 15B.

Figure 14:
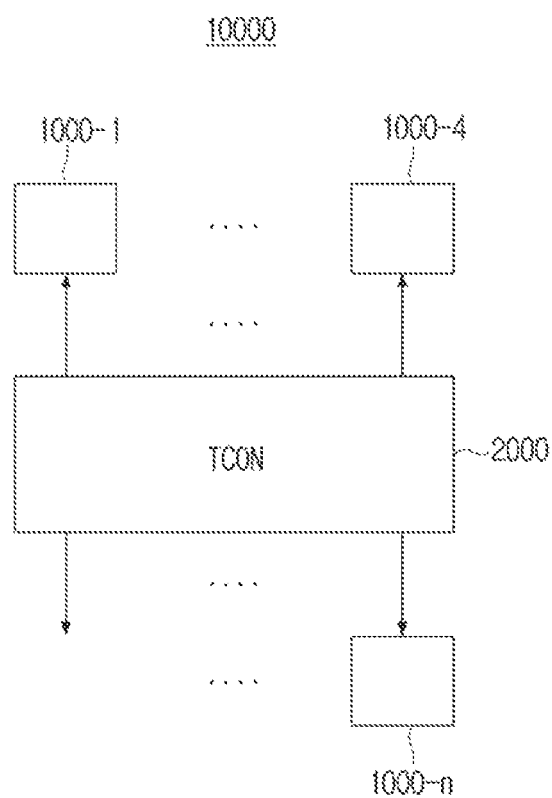
FIG. 14 is a block diagram of a display apparatus according to an embodiment of the disclosure.

FIG. 14 is a block diagram of a display apparatus according to an embodiment of the disclosure. According to FIG. 14, the display apparatus 10000 may include a plurality of display modules 1000-1 to 1000-$n$, a correction unit (not shown), and a timing controller (TCON) 2000.

In this case, the plurality of display modules 1000-1 to 1000-$n$ may be coupled or assembled in a matrix form to constitute one modular display panel, for example, as shown in FIG. 12.

Each of the display modules 1000-1 to 1000-$n$ may include the aforementioned display panel 100. Here, the display panel 100 may include a pixel array in which pixels composed of a plurality of inorganic light emitting elements are arranged in a plurality of row lines, and sub-pixel circuits respectively corresponding to the inorganic light emitting elements of the pixel array. In addition, each of the display modules 1000-1 to 1000-$n$ may include at least some of the various kinds of components that may be included in the aforementioned driver 500, and the sensing unit 200.

Each of the display modules 1000-1 to 1000-$n$ may include a gate driver configured to drive the sub-pixel circuits in the order of row lines based on various kinds of signals (e.g., a clock signal, a start signal (VST), etc.) provided by the TCON 2000. Accordingly, in each of the display modules 1000-1 to 1000-$n$, the inorganic light emitting elements of the pixel array may emit light in the order of the row lines.

Figure 15A:
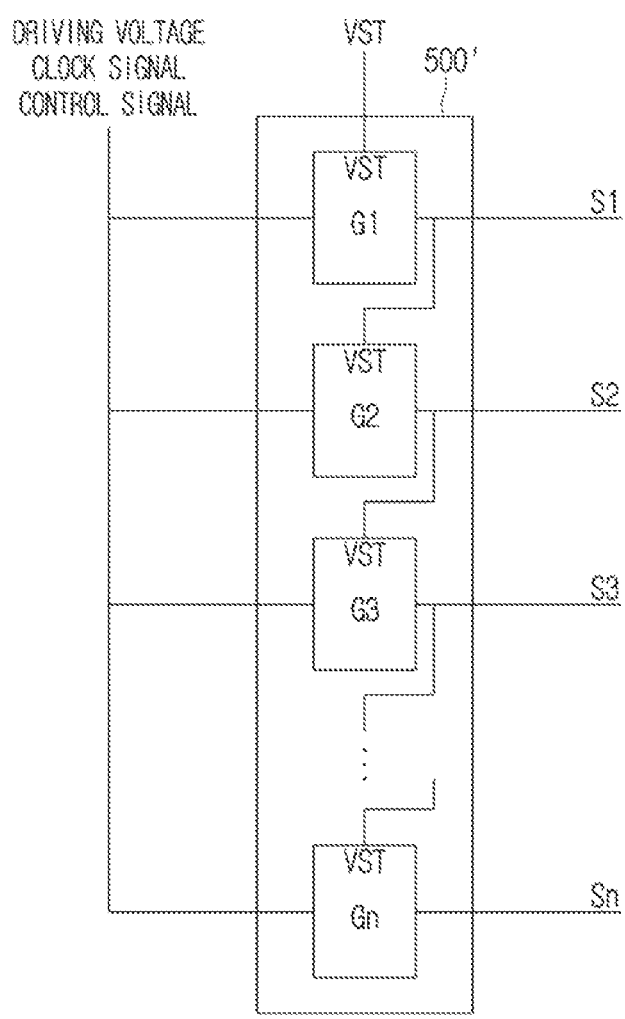
FIG. 15A is a block diagram for illustrating a method of driving a gate driver according to an embodiment of the disclosure.

FIG. 15A is a block diagram for illustrating a method of driving a gate driver according to an embodiment of the disclosure. According to FIG. 15A, the gate driver 500' may include unit circuits G1 to Gn respectively corresponding to row lines, and each of the unit circuits G1 to Gn may receive a driving voltage, a clock signal, a control signal, and a start signal VST to output gate signals S1 to Sn respectively corresponding to the row lines.

In this case, a unit circuit may receive an output signal of a unit circuit corresponding to the previous row line as a start signal. For example, as illustrated, G2 may receive an output signal S1 of G1 as a start signal, and G3 may receive an output signal S2 of G2 as a start signal up to Gn. The unit circuit G1 corresponding to the first row line does not have a previous row line, and thus the unit circuit G1 may be provided with a start signal VST separately from the TCON 2000.

Accordingly, the gate driver 500' may sequentially output the gate signals S1 to Sn in the order of the row lines based on the start signal VST provided by the TCON 2000.

The gate driver 500' may be a scan driver that provides a scan signal in the order of the row lines to the sub-pixel circuits such that an image data voltage is set in the order of the row lines to the sub-pixel circuits. As described above, the scan signals include SP(n) and Vini(n), and thus each of the display modules 1000-1 to 1000-$n$ may include at least one scan driver 500' configured to provide each scan signal (SP(n), Vini(n)).

Accordingly, for example, the scan driver 500' configured to provide an SP(n) signal may provide a scan signal SP(n) in the order of the row lines based on a start signal provided by the TCON 2000 during a display driving period. In addition, the scan driver 500' configured to provide a Vini(n) signal may provide a scan signal Vini(n) in the order of the row lines based on a start signal provided by the TCON 2000 during a display driving period.

The gate driver 500' may be an emission driver that provides an emission signal in the order of the row lines to the sub-pixel circuits such that the inorganic light emitting elements of the pixel array emit light in the order of the row lines based on the image data voltage set according to the scan signals. As described above, the emission signals include Emi_1(n) and Emi_2(n), and thus each of the display modules 1000-1 to 1000-n may include at least one emission driver 500' configured to provide the emission signals Emi_1 (n) and Emi_2(n).

Accordingly, for example, the emission driver 500' configured to provide an Emi_1(n) signal may provide an emission signal Emi_1(n) in the order of the row lines based on a start signal provided by the TCON 2000 during a display driving period. In addition, the emission driver 500' configured to provide an Emi_2(n) signal may provide an emission signal Emi_2(n) in the order of the row lines based on a start signal provided by the TCON 2000 during a display driving period.

The aforementioned scan drivers and emission drivers may apply gate signals for sensing driving (e.g., Sen(n), SP(n), Vini(n), Emi_1(n), Emi_2(n)) to some row lines during a sensing driving period, as illustrated in FIGS. 10C to 10H.

The TCON 2000 controls the overall operations of the display apparatus 10000. In particular, according to an embodiment of the disclosure, the TCON 2000 may drive the modular display panel by the high speed continuous scan method. Hereinafter, for the convenience of explanation, explanation will be made by suggesting the 3*3 modular display panel illustrated in FIG. 12 as an example. FIG. 15B illustrates the display modules 1000-1, 1000-4, and 1000-7 disposed in the first column line among the plurality of display modules 1000-1 to 1000-9.

For example, the TCON 2000 may control the driver 500 of each of the display modules 1000-1, 1000-4, and 1000-7 so that the inorganic light emitting elements of the display modules 1000-1, 1000-4, and 1000-7 arranged in the first column line among the plurality of display modules 1000-1 to 1000-9 arranged in a matrix form sequentially emit light in the order of the row lines from the first row line of the display module 1000-1 disposed uppermost to the last row line of the display module 1000-7 disposed lowermost.

As described above, the gate driver 500' of each display module outputs a gate signal in the order of the row lines based on a start signal VST provided by the TCON 2000, and thus the TCON 2000 may control the timing of providing the start signal to control the driving timing of each display module.

Figure 15B:
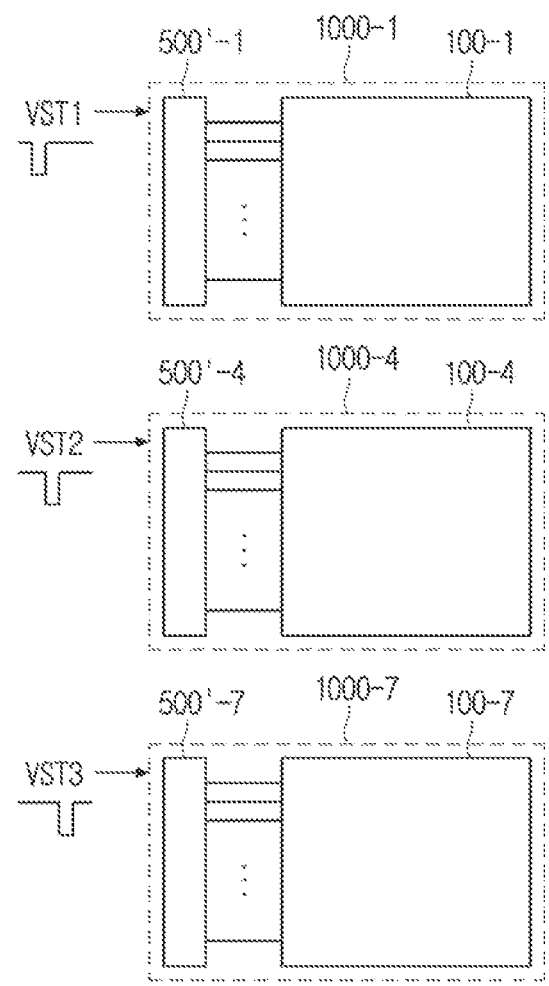
FIG. 15B is a diagram illustrating display modules disposed in a first column line of the plurality of display modules in FIG. 12.

Referring to FIG. 15B, the TCON 2000 may provide a first start signal VST1 to a gate driver 500'-1 of the first display module 1000-1 so that the inorganic light emitting elements of the first display module 1000-1 among the display modules 1000-1, 1000-4, and 1000-7 arranged in the first column line sequentially emit light from the first row line to the last row line.

When the first start signal VST1 is provided, the scan drivers and the emission driver of the first display module 1000-1 may provide scan signals and emission signals in the order of the row lines to the sub-pixel circuits included in the display panel 100-1.

In addition, the TCON 2000 may provide a second start signal VST2 to a gate driver 500'-4 of the second display module 1000-4 so that the inorganic light emitting elements of the second display module 1000-4 disposed adjacent to the lower portion of the first display module 1000-1 emit light in the order of the row lines following the light emission order of the inorganic light emitting elements included in the last row line of the first display module 1000-1.

For example, the TCON 2000 may provide the second start signal VST2 to the gate driver 500'-4 of the second display module 1000-4 so that the sub-pixel circuits included in the first row line of the second display module 1000-4 are driven following the driving order of the sub-pixel circuits included in the last row line of the first display module 1000-1.

When the second start signal VST2 is provided, the scan drivers and the emission driver of the second display module 1000-4 may provide scan signals and emission signals in the order of the row lines to the sub-pixel circuits included in the display panel 100-4.

In addition, the TCON 2000 may provide a third start signal VST3 to a gate driver 500'-7 of the third display module 1000-7 so that the inorganic light emitting elements of the third display module 1000-7 disposed adjacent to the lower portion of the second display module 1000-4 emit light in the order of the row lines following the light emission order of the inorganic light emitting elements included in the last row line of the second display module 1000-4.

For example, the TCON 2000 may provide the third start signal VST3 to the gate driver 500'-7 of the third display module 1000-7 so that the sub-pixel circuits included in the first row line of the third display module 1000-7 are driven following the driving order of the sub-pixel circuits included in the last row line of the second display module 1000-4.

When the third start signal VST3 is provided, the scan drivers and the emission driver of the third display module 1000-7 may provide scan signals and emission signals in the order of the row lines to the sub-pixel circuits included in the display panel 100-7.

So far, operations of the display modules 1000-1, 1000-4, and 1000-7 arranged in the first column line have been explained, but the same explanation can be applied to the display modules 1000-2, 1000-5, and 1000-8 arranged in the second column line or the display modules 1000-3, 1000-6, and 1000-9 arranged in the third column line.

By driving the modular display panel by the high speed scan method as described above, it is possible to fundamentally eliminate the problem that image distortion is visible at the boundary between the upper and lower display modules when the modular display panel is driven by the simultaneous scan method.

In FIG. 14, an example wherein the plurality of display modules 1000-1 to 1000-n included in the display apparatus 10000 are controlled by one timing controller 2000 is suggested, but embodiments are not limited thereto. Depending on embodiments, the display apparatus 10000 may include at least one timing controller for controlling the plurality of display modules 1000-1 to 1000-n.

Figure 16A:
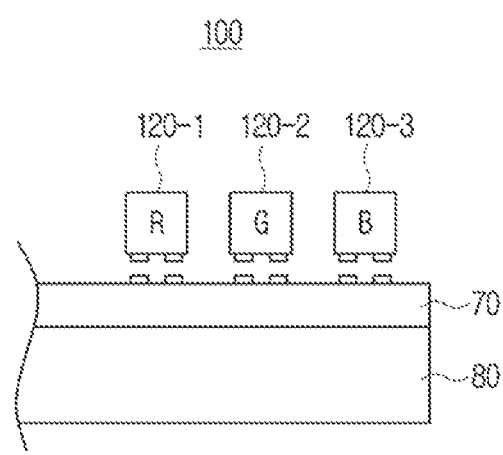
FIG. 16A is a cross-sectional view of a display panel according to an embodiment of the disclosure.

FIG. 16A is a cross-sectional view of the display panel 100 according to an embodiment of the disclosure. In FIG. 16A, only one pixel included in the display panel 100 is illustrated, for the convenience of explanation.

According to FIG. 16A, the display panel 100 may include a glass substrate 80, a TFT layer 70, and inorganic light emitting elements R, G, B (120-1, 120-2, and 120-3). In this case, the aforementioned sub-pixel circuit 100 may be implemented as a thin film transistor (TFT), and may be included in the TFT layer 70 on the glass substrate 80.

Each of the inorganic light emitting elements R, G, and B (120-1, 120-2, and 120-3) may be mounted on the TFT layer 70 so as to be electrically connected to the corresponding sub-pixel circuit 110 to form the sub-pixel described above.

The sub-pixel circuit 110 configured to provide a driving current to the inorganic light emitting elements 120-1, 120-2, and 120-3 may exist for each of the inorganic light emitting elements 120-1, 120-2, and 120-3, and each of the inorganic light emitting elements 120-1, 120-2, and 120-3 may be mounted or arranged on the TFT layer 70 to be electrically connected to the corresponding sub-pixel circuit 110.

FIG. 16A illustrates an example wherein the inorganic light emitting elements R, G, and B (120-1, 120-2, and 120-3) are flip-chip type micro LEDs. However, embodiments are not limited thereto, and depending on embodiments, the inorganic light emitting elements R, G, and B (120-1, 120-2, and 120-3) may be lateral type or vertical type micro LEDs.

Figure 16B:
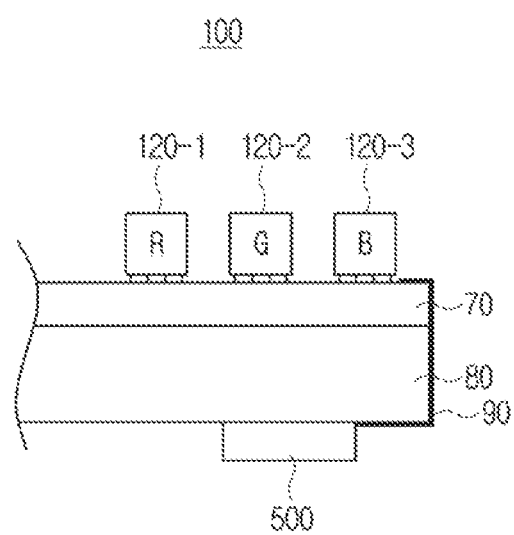
FIG. 16B is a cross-sectional view of a display panel according to an embodiment of the disclosure.

FIG. 16B is a cross-sectional view of the display panel 100 according to an embodiment of the disclosure.

According to FIG. 16B, the display panel 100 may include a TFT layer 70 formed on one surface of the glass substrate 80, inorganic light emitting elements R, G, and B (120-1, 120-2, and 120-3) mounted on the TFT layer 70, a driver 500, sub-pixel circuits 110 formed on the TFT layer 70, and a connection wiring 90 for electrically connecting the sub-pixel circuits 110 formed on the TFT layer 70 and the driver 500.

As described above, according to an embodiment of the disclosure, at least some of the aforementioned various kinds of components, which may be included in the driver 500, may be disposed on the rear surface of the glass substrate 80, and may be connected to the sub-pixel circuits 110 formed on the TFT layer 70 through the connection wiring 90.

Referring to FIG. 16B, it can be known that the sub-pixel circuits 110 included in the TFT layer 70 are electrically connected to the driver 500 (specifically, at least some of the aforementioned various kinds of components) through the connection wiring 90 formed at the edge (or side) of the TFT panel (hereinafter, the TFT layer 70 and the glass substrate 80 in combination will be called a TFT panel).

The reason why the sub-pixel circuits 110 and the driver 500 are connected through the connection wiring 90 formed in the edge area of the display panel 100 is that a problem such as cracks may occur in the glass substrate 80 due to the temperature difference between the process of manufacturing the TFT panels 70 and 80 and the process of filling the holes with a conductive material, when the sub-pixel circuits 110 and the driver 500 are connected by forming a hole penetrating the glass substrate 80.

Figure 16C:
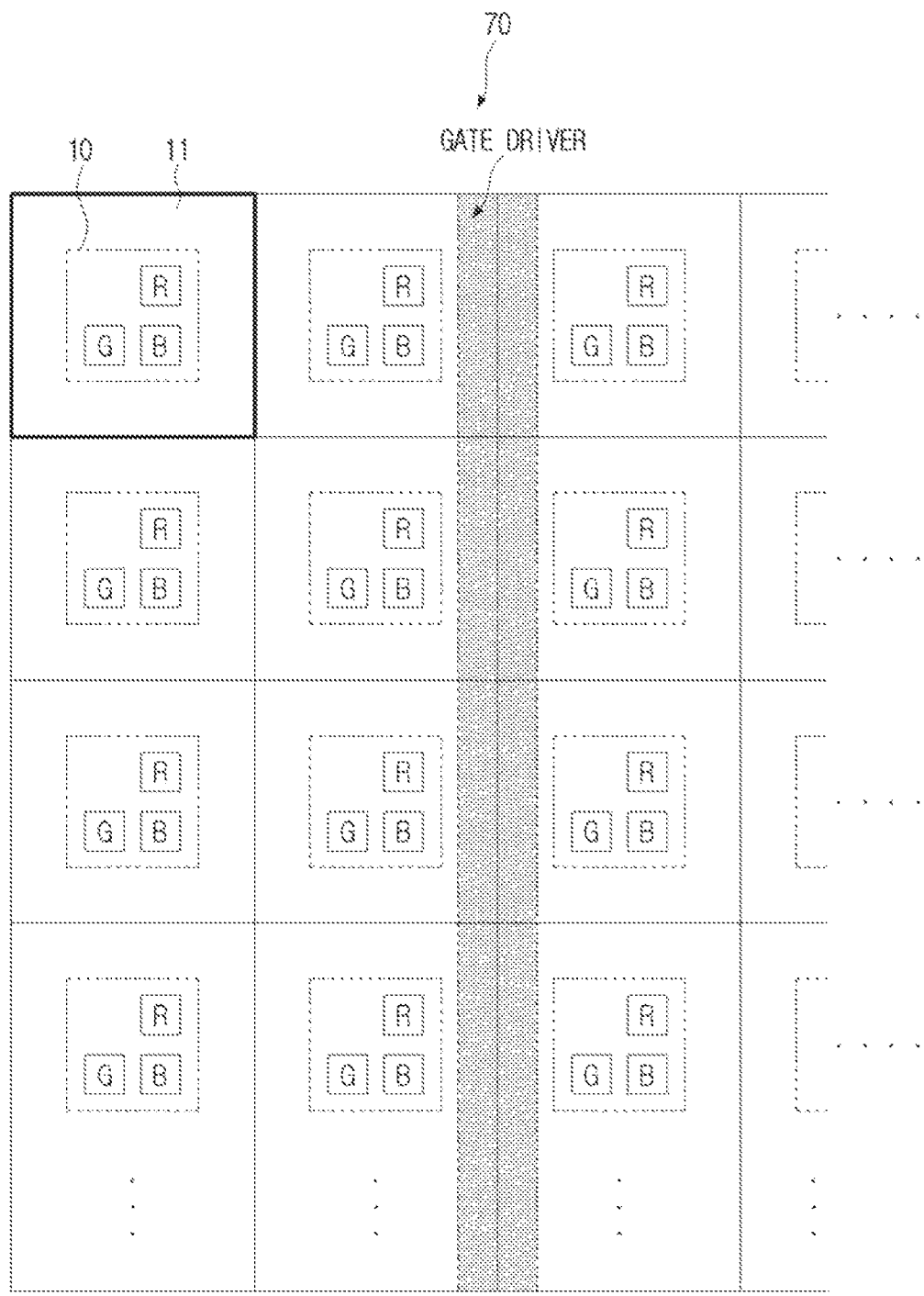
FIG. 16C is a plan view of a TFT layer according to an embodiment of the disclosure.

As described above, according to another embodiment of the disclosure, at least some of the various kinds of components that may be included in the driver 500 may be formed on the TFT layer along with the sub-pixel circuits to be connected to the sub-pixel circuits. FIG. 16C illustrates such an embodiment.

FIG. 16C is a plan view of the TFT layer 70 according to an embodiment of the disclosure. Referring to FIG. 16C, a remaining region 11 other than a region occupied by one pixel 10 (there are sub-pixel circuits 110 corresponding to each of the R, G, and B sub-pixels included in the pixel 10 in this region) is present in the TFT layer 70, and some of the aforementioned various kinds of components may be formed in the remaining region 11.

FIG. 16C illustrates an example in which the aforementioned gate driver is implemented in the remaining region 11 of the TFT layer 70. The structure in which the gate driver is formed in the TFT layer 70 as such may be referred to as a gate in panel (GIP) structure, but the name is not limited thereto. In addition, the position of the gate driver formed in the TFT layer 70 is not limited to that shown in FIG. 16C.

FIG. 16C is only an example, and the components that may be included in the remaining region 11 of the TFT layer 70 are not limited to the gate driver. Depending on embodiments, the TFT layer 70 may further include a DeMUX circuit configured to select each of R, G, and B sub-pixels, and an electro static discharge (ESD) protection circuit for protecting the sub-pixel circuits 110 from static electricity, or the like.

In the above description, an example in which the substrate on which the TFT layer 70 is formed is the glass substrate 80 was suggested, but embodiments are not limited thereto. For example, the TFT layer 70 may be formed on a synthetic resin substrate. In this case, the sub-pixel circuits 100 and the driver 500 of the TFT layer 70 may be connected through a hole penetrating the synthetic resin substrate.

In the above description, an example in which the sub-pixel circuits 110 are implemented on the TFT layer 70 was described. However, embodiments are not limited thereto. For example, according to another embodiment of the disclosure, when the sub-pixel circuits 110 are implemented, the sub-pixel circuits 110 may be implemented as pixel circuit chips in the form of ultra-small micro-ICs in units of sub-pixels or pixels without using the TFT layer 70, and the pixel circuit chips may be mounted on the substrate. In this example, the position where the sub-pixel circuit chips are mounted may be, for example, the periphery of the corresponding inorganic light emitting elements 120, but is not limited thereto.

In addition, in the above description, an example in which the gate driver is formed in the TFT layer 70 was suggested, but embodiments are not limited thereto. For example, according to another embodiment of the disclosure, the gate driver may be implemented as a gate driver chip in the form of an ultra-small micro-IC, and may be mounted on the TFT layer 70.

In addition, in the aforementioned various embodiments of the disclosure, the TFT constituting the TFT layer (or TFT panel) is not limited to a specific structure or type. That is, the TFT recited in the various examples of the disclosure may be implemented as a low temperature poly silicon (LTPS) TFT, an oxide TFT, a poly silicon or a-silicon TFT, an organic TFT, a graphene TFT, or the like, and may be applied only with a P-type (or N-type) MOSFET in an Si-wafer CMOS process.

According to the various embodiments of the disclosure as described above, by driving an inorganic light emitting element by PWM driving in an active matrix (AM) manner, a phenomenon in which the wavelength of light emitted from the inorganic light emitting element changes according to a gray scale may be prevented. In addition, a stain that may appear in an image due to the difference in the threshold voltage between the driving transistors may be easily compensated. In addition, color correction may be facilitated. Further, in a display apparatus including one display module or a display apparatus including a modular display panel including a plurality of display modules, stain compensation or color correction of the display panel may be facilitated. In addition, instantaneous peak power consumption may be reduced by driving the display panel such that the inorganic light emitting elements sequentially emit light in the order of row lines. Further, the effect exerted by the drop of the driving voltage which is generated differently for each position of the display panel on the process of setting the data voltage may be compensated. In addition, a more optimized driving circuit may be designed, and the inorganic light emitting elements may be stably and efficiently driven. Further, when configuring the modular display panel by combining a plurality of display modules, distortion of an image that may occur at the boundary of the upper and lower display modules may be removed.

The descriptions above are merely illustrative of the technical idea of the disclosure, and a person skilled in the art to which the disclosure belongs will be able to perform various modifications and variations without departing from the essential characteristics of the disclosure. For example, a case in which a sub-pixel circuit is implemented with a PMOS TFT was described above, but a person skilled in the art will be able to perform a modification of implementing a sub-pixel circuit with an NMOS TFT or a CMOS TFT.

In addition, embodiments according to the disclosure are not for limiting the technical idea of the disclosure but for explaining the technical idea to a person skilled in the art, and the scope of the technical idea of the disclosure is not limited by the embodiments. Accordingly, the scope of the disclosure should be construed by the appended claims, and all technical ideas in an equivalent range to the scope of the disclosure should be construed as being included within the scope of the disclosure.

What is claimed is:

1. A display apparatus comprising:
   a modular display panel comprising a plurality of display modules disposed in a matrix form;
   a sensing unit;
   a correction unit; and
   a timing controller,
   wherein each of the plurality of display modules comprises:
   a display panel comprising a pixel array in which pixels respectively composed of a plurality of inorganic light emitting elements are arranged in a plurality of row lines, and sub-pixel circuits respectively corresponding to inorganic light emitting elements of the pixel array; and
   a driver configured to drive the sub-pixel circuits in an order of the row lines based on a start signal provided from the timing controller so that the inorganic light emitting elements of the pixel array emit light in the order of the row lines based on an image data voltage,
   wherein the sensing unit is configured to:
   sense a current flowing in a driving transistor included in the sub-pixel circuits based on a specific voltage, and output sensing data corresponding to the sensed current,
   the correction unit is configured to:
   correct the image data voltage applied to the sub-pixel circuits based on the sensing data, and
   the timing controller is configured to:
   provide a first start signal to a driver of a first display module among the plurality of display modules so that the inorganic light emitting elements of the first display module sequentially emit light from a first row line to a last row line, and
   provide a second start signal to a driver of a second display module so that the inorganic light emitting elements of the second display module disposed adjacent to a bottom of the first display module emit light in the order of the row lines following an emission order of the inorganic light emitting elements included in the last row line of the first display module.

2. The display apparatus of claim 1, wherein the driver is configured to, based on the start signal being provided, provide a gate signal in the order of the row lines to the sub-pixel circuits to drive the sub-pixel circuits in the order of the row lines, and
   wherein the gate signal comprises a scan signal configured to set the image data voltage to the sub-pixel circuits and an emission signal configured to allow the inorganic light emitting elements of the pixel array to emit light based on the set image data voltage.

3. The display apparatus of claim 2, wherein the sub-pixel circuits are configured to be driven in an order of a data setting section and a plurality of light emitting sections for each row line with respect to one image frame, and
   wherein the driver is configured to:
   provide the scan signal to the sub-pixel circuits of a corresponding row line during the data setting section of each row line, and
   apply the emission signal to the sub-pixel circuits of the corresponding row line during each of the plurality of light emitting sections of each of the row lines.

4. The display apparatus of claim 3, wherein a first light emitting section among the plurality of light emitting sections is temporally consecutive with the data setting section, and
   wherein the plurality of light emitting sections have a preset time interval from each other.

5. The display apparatus of claim 3, wherein the image data voltage comprises a constant current generator data voltage and a pulse width modulation (PWM) data voltage, and
   wherein each of the sub-pixel circuits comprises:
   a constant current generator circuit which comprises a first driving transistor and is configured to provide a constant current to a corresponding inorganic light emitting element based on the constant current generator data voltage; and
   a PWM circuit which comprises a second driving transistor and is configured to control a time during which the constant current is provided to the corresponding inorganic light emitting element based on the PWM data voltage.

6. The display apparatus of claim 5, wherein the constant current generator circuit is configured to, based on the scan signal, set the constant current generator data voltage to a gate terminal of the first driving transistor, and
   wherein the PWM circuit is configured to, based on the scan signal, set the PWM data voltage to a gate terminal of the second driving transistor.

7. The display apparatus of claim 6, wherein the constant current generator circuit is configured to, based on the emission signal, provide a constant current of a magnitude corresponding to the set constant current generator data voltage to the corresponding inorganic light emitting element, and
   wherein the PWM circuit is configured to, based on the emission signal and a sweep voltage sweeping between two voltages, control the constant current generator circuit such that the constant current flows in the corresponding inorganic light emitting element during a time corresponding to the set PWM data voltage.

8. The display apparatus of claim 7, wherein the constant current generator circuit is configured to, in each of the plurality of light emitting sections, provide the constant current to the corresponding inorganic light emitting element while a driving voltage is applied to a source terminal of the first driving transistor,
   wherein the PWM circuit is configured to, in each of the plurality of light emitting sections, apply the driving voltage to the source terminal of the first driving transistor during a time period in which the second driving transistor is turned on while a voltage of a gate terminal of the second driving transistor changes according to a change of the sweep voltage, and wherein the time period in which the second driving transistor is turned on changes based on a magnitude of the PWM data voltage.

9. The display apparatus of claim 8, wherein the sweep voltage is a portion selected based on the emission signal from an input sweep signal in which a voltage linearly varying from a first voltage to a second voltage is continuously repeated, and wherein a same input sweep signal is applied to the sub-pixel circuits of the display panel.

10. The display apparatus of claim 9, wherein the sweep voltage, in each of the plurality of light emitting sections, sweeps once between the first voltage and the second voltage, and wherein a start voltage at which the sweep voltage starts sweeping between the first voltage and the second voltage varies based on a row line.

11. The display apparatus of claim 5, wherein a drain terminal of the second driving transistor is connected to a source terminal of the first driving transistor, and wherein the sub-pixel circuits comprise a first transistor connected between a drain terminal of the first driving transistor and the sensing unit.

12. The display apparatus of claim 11, wherein the specific voltage comprises a first specific voltage and a second specific voltage respectively applied to gate terminals of the first and second driving transistors in a constant current generator circuit sensing period, and a third specific voltage and a fourth specific voltage respectively applied to the gate terminals of the first and second driving transistors in a PWM circuit sensing period, and wherein the sensing unit is configured to:

while the first transistor is turned on in the constant current generator circuit sensing period, sense a first current flowing in the first and second driving transistors based on the first and second specific voltages, and output first sensing data corresponding to the sensed first current, and while the first transistor is turned on in the PWM circuit sensing period, sense a second current flowing in the first and second driving transistors based on the third and fourth specific voltages, and output second sensing data corresponding to the sensed second current.

13. The display apparatus of claim 12, wherein, in the constant current generator circuit sensing period, a turn-on resistance of the first driving transistor based on the first specific voltage is bigger than a turn-on resistance of the second driving transistor based on the second specific voltage, and a magnitude of the first current is determined by the first specific voltage, and wherein, in the PWM circuit sensing period, a turn-on resistance of the first driving transistor based on the third specific voltage is smaller than a turn-on resistance of the second driving transistor based on the fourth specific voltage, and the magnitude of the second current is determined by the fourth specific voltage.

14. The display apparatus of claim 12, wherein the correction unit is configured to correct the constant current generator data voltage based on the first sensing data, and correct the PWM data voltage based on the second sensing data.

15. The display apparatus of claim 12, wherein the constant current generator circuit sensing period and the PWM circuit sensing period are included in a blanking interval.

16. The display apparatus of claim 3, wherein the sub-pixel circuits are configured to be driven by a first driving voltage in each of the plurality of light emitting sections, and to be driven by a second driving voltage separate from the first driving voltage in the data setting section.

17. The display apparatus of claim 1, wherein the driver is configured to, for each image frame, apply the specific voltage to sub-pixel circuits corresponding to at least one row line among the plurality of row lines of the pixel array.

\* \* \* \* \*